(12) United States Patent
Stein et al.

(10) Patent No.: US 11,378,583 B2
(45) Date of Patent: Jul. 5, 2022

(54) AUTOMATED CLINICAL ANALYZER SYSTEM AND METHOD

(71) Applicant: Siemens Healthcare Diagnostics Inc., Tarrytown, NY (US)

(72) Inventors: David Stein, Succasunna, NJ (US); Roy Barr, Delaware, NJ (US); Mark Edwards, Armonk, NY (US); Colin Mellars, Tucson, AZ (US); Thomas J. Bao, Livingston, NJ (US); Charles V. Cammarata, Ledgewood, NJ (US); Benjamin S. Pollack, Jersey City, NJ (US); Baris Yagci, Montclair, NJ (US); Beri Cohen, Hartsdale, NY (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 133 days.

(21) Appl. No.: 16/319,306

(22) PCT Filed: Jul. 19, 2017

(86) PCT No.: PCT/US2017/042943
§ 371 (c)(1),
(2) Date: Jan. 18, 2019

(87) PCT Pub. No.: WO2018/017771
PCT Pub. Date: Jan. 25, 2018

(65) Prior Publication Data
US 2019/0277869 A1    Sep. 12, 2019

Related U.S. Application Data

(60) Provisional application No. 62/365,314, filed on Jul. 21, 2016.

(51) Int. Cl.
*G01N 35/00* (2006.01)
*G01N 35/04* (2006.01)
(Continued)

(52) U.S. Cl.
CPC ....... *G01N 35/0099* (2013.01); *G01N 35/026* (2013.01); *G01N 35/04* (2013.01);
(Continued)

(58) Field of Classification Search
CPC .. G01N 35/0099; G01N 35/026; G01N 35/04; G01N 35/025; G01N 2035/0415;
(Continued)

(56) References Cited

U.S. PATENT DOCUMENTS 9,346,371 B2   5/2016   King et al.
9,645,159 B2   5/2017   Pollack et al.
(Continued)

FOREIGN PATENT DOCUMENTS

JP   H06-138120 A    5/1995
JP   2004-212377 A   7/2004
(Continued)

OTHER PUBLICATIONS

PCT International Search Report and Written Opinion dated Sep. 29, 2017 (11 Pages).
(Continued)

*Primary Examiner* — Herbert K Roberts
*Assistant Examiner* — Fatemeh Esfandiari Nia

(57) ABSTRACT

An analyzer system for in vitro diagnostics includes a sample handler module having a robot arm that delivers samples from drawers into carriers on a linear synchronous motor automation track. Samples are delivered via the automation track to individual track sections associated with individual analyzer modules. Analyzer modules aspirate sample portions directly from the sample carriers and perform analysis thereon.

22 Claims, 28 Drawing Sheets

(51) Int. Cl.
*G01N 35/02* (2006.01)
*G01N 1/00* (2006.01)
*G01N 35/10* (2006.01)

(52) U.S. Cl.
CPC .............. *G01N 1/00* (2013.01); *G01N 35/025* (2013.01); *G01N 2035/0415* (2013.01); *G01N 2035/0453* (2013.01); *G01N 2035/0465* (2013.01); *G01N 2035/0467* (2013.01); *G01N 2035/0498* (2013.01); *G01N 2035/1032* (2013.01)

(58) Field of Classification Search
CPC ... G01N 2035/0498; G01N 2035/0465; G01N 1/00
See application file for complete search history.

(56) References Cited

U.S. PATENT DOCUMENTS

| | | | |
|---|---|---|---|
| 9,927,450 B2* | 3/2018 | Pollack | G01N 35/00603 |
| 11,009,516 B2* | 5/2021 | Holmes | G01N 33/92 |
| 2006/0148063 A1* | 7/2006 | Fauzzi | G01N 1/31 |
| | | | 422/65 |
| 2007/0166193 A1* | 7/2007 | Veen | G01N 35/00 |
| | | | 422/400 |
| 2012/0270305 A1* | 10/2012 | Reed | G01N 21/05 |
| | | | 422/560 |
| 2013/0125675 A1* | 5/2013 | Muller | G01N 35/0099 |
| | | | 73/864.23 |
| 2013/0129166 A1* | 5/2013 | Muller | G01N 35/00732 |
| | | | 382/128 |
| 2014/0234978 A1 | 8/2014 | Heise et al. | |
| 2014/0273242 A1* | 9/2014 | Ochranek | G01N 35/025 |
| | | | 422/65 |
| 2015/0010437 A1 | 1/2015 | Mellars et al. | |
| 2015/0118756 A1* | 4/2015 | Pollack | G01N 35/0095 |
| | | | 422/67 |
| 2016/0146846 A1* | 5/2016 | Fujita | G01N 35/04 |
| | | | 422/67 |
| 2016/0161518 A1* | 6/2016 | Frank | G01N 35/026 |
| | | | 700/214 |
| 2016/0238625 A1* | 8/2016 | Raicu | G01N 35/1011 |
| 2016/0320422 A1* | 11/2016 | Fritchie | G01N 35/0099 |
| 2017/0124704 A1* | 5/2017 | Wu | G06T 7/80 |
| 2017/0205435 A1* | 7/2017 | Hagiwara | G01N 35/00603 |
| 2018/0188275 A1* | 7/2018 | Noda | G01N 35/025 |

FOREIGN PATENT DOCUMENTS

| | | |
|---|---|---|
| JP | 2007-524842 A | 8/2007 |
| JP | 2011-052982 A | 3/2011 |
| JP | 2011-086733 A | 4/2011 |
| JP | 2014-532879 A | 12/2014 |
| JP | 2014-532880 A | 12/2014 |
| JP | 2015-513073 A | 4/2015 |
| JP | 2015-127641 A | 7/2015 |
| JP | 2015-135282 A | 7/2015 |
| WO | 2014/071214 A1 | 5/2014 |
| WO | 2014/110346 A2 | 7/2014 |
| WO | 2014/138533 A1 | 9/2014 |
| WO | 2014/152329 A1 | 9/2014 |
| WO | 2015/126839 A1 | 8/2015 |
| WO | 2015/191702 A1 | 12/2015 |
| WO | 2016/133900 A1 | 8/2016 |
| WO | 2017/132162 A1 | 8/2017 |
| WO | 2017/132166 A1 | 8/2017 |
| WO | 2017/132167 A1 | 8/2017 |
| WO | 2017/132168 A1 | 8/2017 |
| WO | 2017/132169 A1 | 8/2017 |
| WO | 2017/132171 A1 | 8/2017 |
| WO | 2017/132172 A1 | 8/2017 |

OTHER PUBLICATIONS

Extended EP Search Report dated August 8, 2019 of corresponding European Application No. 17831837.4, 4 Pages.

* cited by examiner

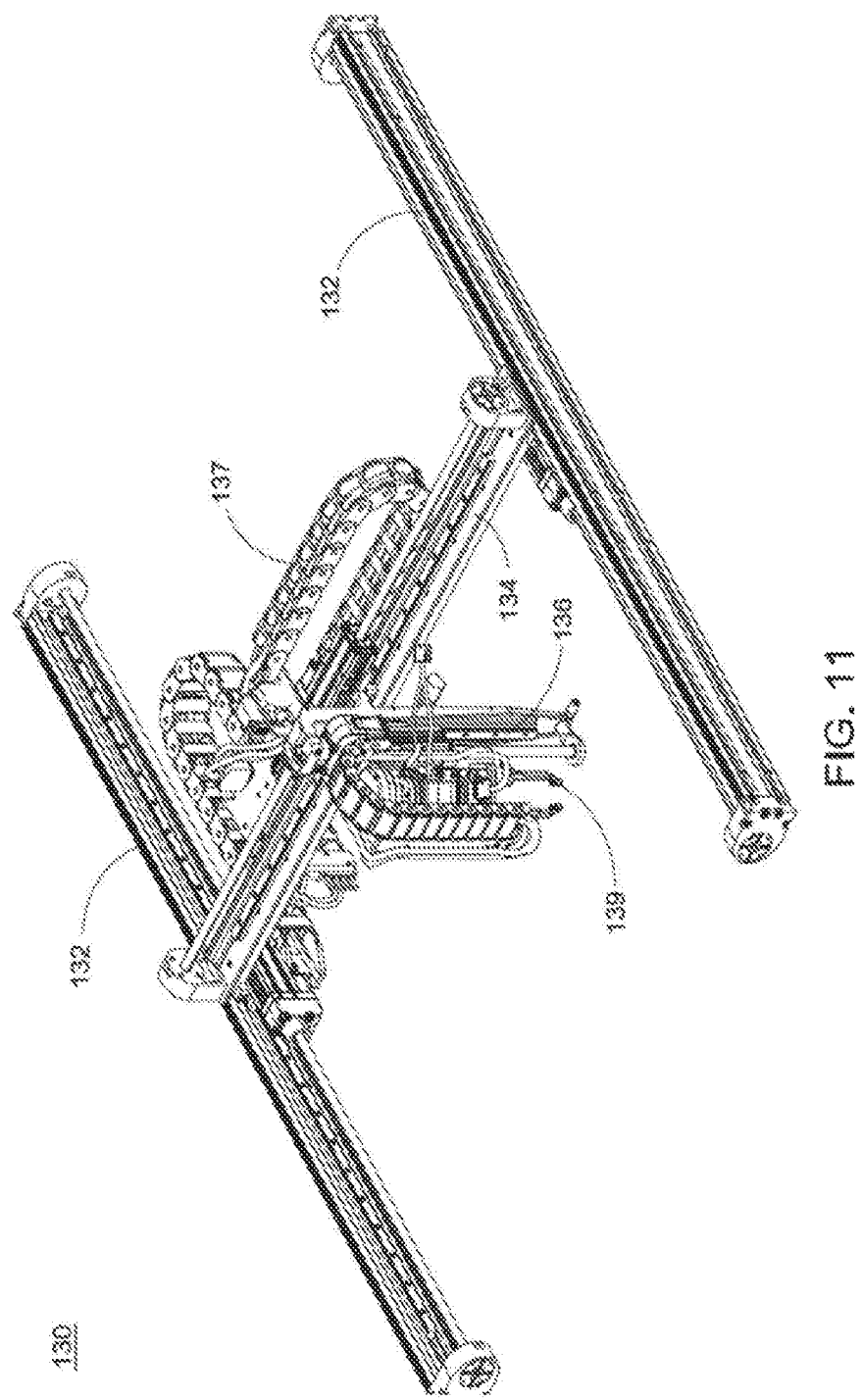

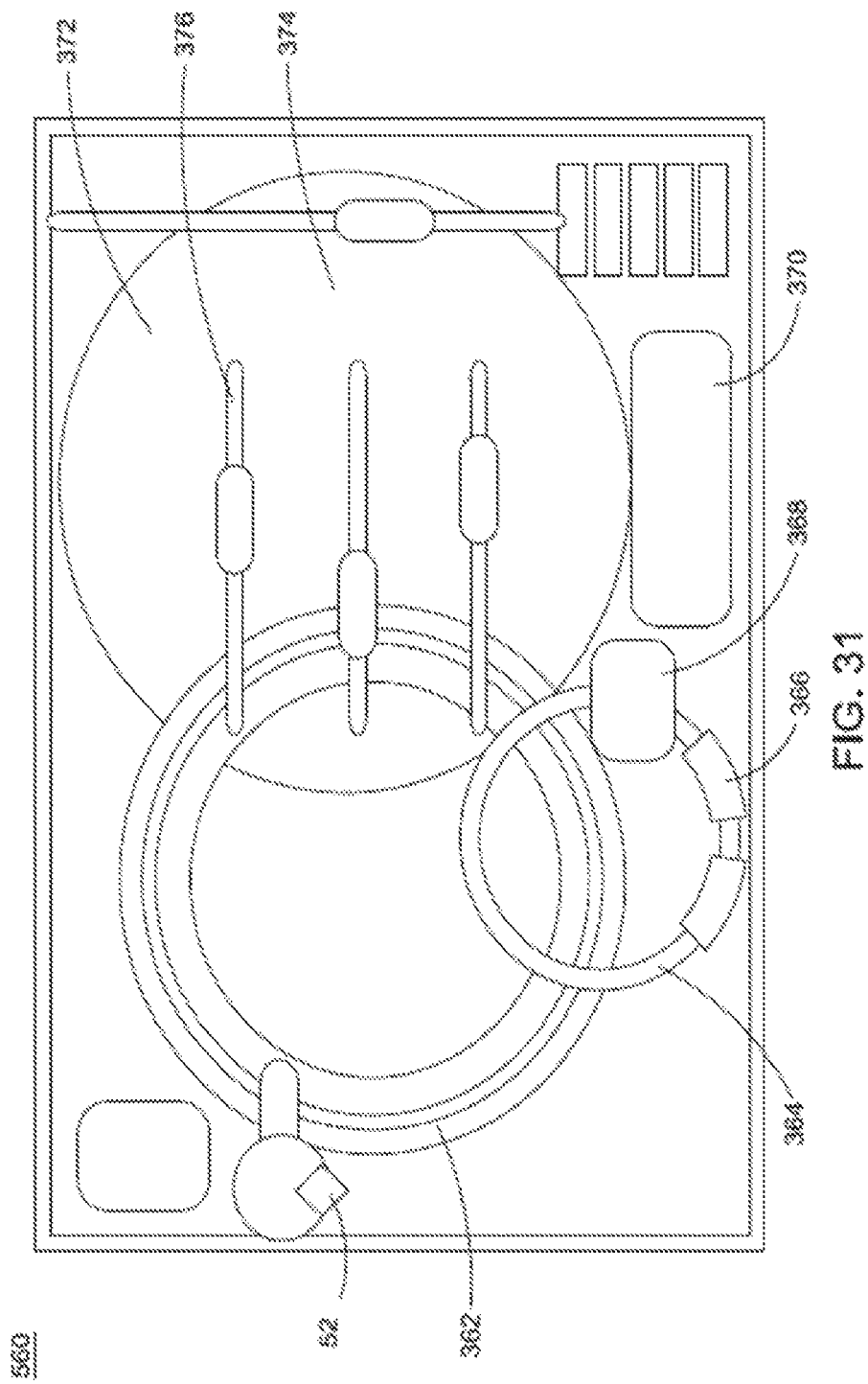

AUTOMATED CLINICAL ANALYZER SYSTEM AND METHOD

CROSS-REFERENCE TO RELATED APPLICATIONS

This application claims the benefit of U.S. Provisional Application Ser. No. 62/365,314 filed Jul. 21, 2016, which is incorporated herein by reference in its entirety.

TECHNOLOGY FIELD

The present invention relates, in general, to a laboratory automation system and clinical chemistry analyzer system for use in a laboratory environment and, more particularly, to systems and methods for handling, storing, transporting, and testing patient samples for in vitro diagnostics in a clinical analyzer.

BACKGROUND

In vitro diagnostics (IVD) allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers (analyzers) onto which fluid containers, such as tubes or vials, containing patient samples have been loaded. The analyzer extracts a liquid sample from the vial and combines the sample with various reagents in special reaction cuvettes or tubes (referred to, generally, as reaction vessels). In some conventional systems, a modular approach is used for analyzers. A lab automation system can shuttle samples between one sample processing module (module) and another module. Modules may include one or more stations, including sample handling stations and analyzer modules/testing stations (e.g., a unit that can specialize in certain types of assays), or can otherwise provide testing services to the larger analyzer, which may include immunoassay (IA) and clinical chemistry (CC) stations. Some traditional IVD automation track systems comprise systems that are designed to transport samples from one fully independent module to another standalone module. This allows different types of tests to be specialized in two different stations/modules, or allows two redundant stations to be linked to increase the volume of sample throughput available. These lab automation systems, however, are often bottlenecks in multi-station analyzers. Relatively speaking, traditional lab automation systems lack large degrees of intelligence or autonomy to allow samples to independently move between stations.

In an exemplary prior art system, a friction-based track, much like a conveyor belt, shuttles individual carrier mechanisms, sometimes called pucks, or racks of containers, between different stations. Samples may be stored in sample containers, such as test tubes that are placed into a puck by an operator or robot arm, for transport between stations in an analyzer along the track. This friction track, however, can only move in one direction at a time, and any samples on the track will move in the same direction at the same speed. When a sample needs to exit the friction track, gating/switching can be used to move individual pucks into offshoot paths. A drawback with this set up is that singulation must be used to control the direction of any given puck at each gate and switch. For example, if two pucks are near one another, and only one puck should be redirected into an offshoot path, it becomes difficult to control a switch so that only one puck is moved into the offshoot path and ensure that the proper puck is pulled from the friction track. This has created the need in many prior art systems to have pucks stop at a gate so that individual pucks can be released and switched, one at a time, at each decision point on a track.

Another way that singulation has been used in friction track-based systems is to stop the puck at a gate and allow a barcode reader to read a barcode on the sample tube. Because barcode readers are slow relative to the amount of time needed to switch a puck between tracks, scanning introduces hard singulations into the flow on a track and causes all nearby pucks to halt while a switching determination is made. After a determination is made, singulation may be further used to ensure that only the scanned puck proceeds by using a physical blockage to prevent the puck behind the scanned puck from proceeding while the scanned puck is switched.

U.S. Pat. No. 6,202,829 shows an exemplary prior art friction track system that includes actuated mechanical diversion gates that can be used to direct pucks off of the main track onto pullout tracks. As explained therein, the diversion process can require multiple mechanical gates to singulate and separate individual pucks, stopping each puck multiple times and allowing each puck to be rotated so that a barcode can be read before a diversion decision is made. Such a system increases latency and virtually ensures that, each time a diversion gate is added to a friction track, the gate adds another traffic bottleneck. Such a system results in natural queuing at each diversion gate, further increasing the amount of time that each sample spends on the friction track.

Friction tracks are also typically slow-moving. Because all samples in pucks move together, these pucks routinely crash into one another and the track moves at the same speed around curves and straightaways. Moreover, stopping, singulating, and switching occur by a puck impacting a stationary object, such as a diversion arm or stopping point. As a result, friction tracks typically move at a relatively low velocity to prevent fluids contained in the open fluid sample containers in the pucks from splashing and spilling onto laboratory equipment or the automation track. For large laboratory systems, it may take several minutes for a friction track to transport one sample puck from one end of the room to another end of the room. This adds to overall latency, and can increase traffic due to increased travel times, which can reduce the turnaround time or average throughput of samples in a batch inserted into an analyzer and the automation system. Thus, there is a need for a system that allows faster movement of samples and sample carriers within the automation system.

Traditional laboratory automation systems in analyzers are operated by having an operator (e.g., a lab technician) place trays of sample tubes into an input area. These tubes typically have a vertical sticker placed on the side of them that includes a barcode and, optionally, human readable identification that allow the system to verify the identity of samples and to handle each sample accordingly. These trays are typically an array that allows several samples (e.g., typically around 50 samples) to be manually carried by the operator. Because all of the samples in a tray are not necessarily processed in the same manner, samples are removed from the tray via manual operation by the operator or via a robot arm in the system. These sample tubes are then placed into carriers (e.g., plastic pucks) that are already present or placed into the automation system track. Because of the nature of traditional plastic pucks and the sample handling robotics used to move patient samples from trays to pucks, there is typically a restriction on the type of patient sample tubes that may be used. For example, a clinical analyzer may require that patient samples arrive in a single type of patient sample tube having uniform dimensions (e.g., uniform height and diameter of the glass or plastic making up the tube). It may be undesirable to use a uniform patient sample tube size, particularly where there is a variation in sources of the patient samples (e.g., a diagnostic lab that receives patient samples from a variety of clinical locations).

Automation processes for handling input sample trays can be relatively slow because the identity of each sample must be ascertained to identify whether or not the sample is a STAT sample. STAT samples require immediate priority and may be handled differently by the automation system, typically by flushing any physical queues of sample pucks ahead of a puck containing a STAT sample, allowing the STAT sample to freely move to its destination. Moreover, if a variety of patient sample tube sizes is being used, the end effectors of robot arms must be careful in engaging tubes without knowing the size of the tube, relying on the observed pressure to determine when it has properly engaged the tube, much like feeling around in the dark. Thus, there exists a deficiency in the prior art with respect to the sample handling input that might allow a variety of patient sample tube sizes to be used.

Traditional friction-based automation tracks may also suffer from lack of redundancy. In a typical configuration, a friction track is a standalone component that is bolted onto several modules, typically including a single power supply, controller, etc. If any of these components fail, the entire automation system will shut down until it is serviced. The track design also typically suffers from lack of compactness and lack of accessible paths to get between points in the automation track without taking the same main route as every other sample the system. Each can create traffic jams, reduce the throughput, and increase overall latency and turnaround time in the system. Furthermore, because samples spend an excessive amount of time sitting on a friction track, samples may begin to degrade between being input and when tests occur on the sample due to the long wait times. Additionally, traditional bolt-on automation tracks require samples be physically removed from the automation track by each station for interaction with that patient sample. This adds to mechanical complexity and overall latency of the system.

SUMMARY

Embodiments may address one or more of the shortcomings of the prior art by using any of the following concepts. In one embodiment, an analyzer system for use in an in vitro diagnostics (IVD) environment includes a sample handler module configured to accept a plurality of trays holding a plurality of patient sample tubes via one or more drawers located at a front of the sample handler module that is accessible to a human operator, and one or more analyzer modules configured to aspirate, using at least one pipette, a portion of a patient sample from each of the plurality of patient samples and perform a clinical analysis of at least one of clinical chemistry characteristics and immunoassay characteristics of that patient sample. The analyzer system further includes a plurality of sample carriers configured to accept at least one of the plurality of patient samples, each carrier having magnets in the base thereof and an automation track comprising a plurality of track sections forming a plurality of branches, each track section having a surface that includes a plurality of synchronously controlled magnetic coils. The automation track is configured to move the plurality of patient sample tubes in the plurality of sample carriers via the synchronously controlled magnetic coils to propel the plurality of sample carriers along the plurality of track sections. The automation track is configured to receive each of the plurality of patient sample tubes from the sample handler module via a robot arm in the sample handler module and to move each patient sample tube to a first location on the automation track accessible to the at least one pipette of the one or more analyzer modules, to facilitate aspiration of the portion of the patient sample.

According to one aspect of some embodiments, the sample handler module comprises a plurality of cameras that record overhead images of sample tubes in the drawers as the drawers are closed by a human operator. According to another aspect of some embodiments, the analyzer includes a station on the automation track having a plurality of cameras that observe each of the plurality of sample carriers to characterize the carrier and at least one of the plurality of patient sample tubes after that patient sample tube has been placed into the carrier. According to another aspect of some embodiments, the plurality of track sections receives primary power from one of the one or more analyzer modules and backup power from an adjacent one of the one or more analyzer modules. According to another aspect of some embodiments, the sample handler module comprises refrigerated storage configured to store control and calibrator fluids for multiple days. According to another aspect of some embodiments, the analyzer further includes a plurality of reagent carriers configured to accept a reagent cartridge and to transport the reagent cartridge, via the automation track, to a second location accessible to the one or more analyzer modules.

According to one aspect of some embodiments, the automation track is configured such that the plurality of track sections form an outer loop on the perimeter of the one or more analyzer modules and a plurality of bypass track sections internal to the one or more analyzer modules that bypass the outer loop. The first location on the automation track accessible to the at least one pipette is on at least one of the bypass track sections. According to another aspect of some embodiments, each of the one or more analyzer modules is serviced by one of the bypass track sections, and that bypass track section is configured to temporarily hold a subset of the plurality of sample carriers for random access by the at least one pipette. According to another aspect of some embodiments, movement and random access of the subset of the plurality of sample carriers on each of the bypass track sections is controlled responsive to a processor of the one or more analyzer modules. According to another aspect of some embodiments, the outer loop is accessible to the sample handler module and the plurality of track sections form a bypass track section configured to allow sample carriers to travel around the perimeter of the one or more analyzer modules without returning to the sample handler module.

According to one aspect of some embodiments, at least one track section is accessible to an external laboratory automation system. According to another aspect of some embodiments, each of the plurality of sample carriers comprises a sample tube holder having two positions, and the sample handler module is configured to place a first one of the plurality of patient samples into the sample tube holder before removing a second one of the plurality of patient samples from the sample tube holder.

In one embodiment, a method for analyzing patient samples includes steps of receiving, at a sample handler module, a plurality of trays holding a plurality of patient sample tubes via one or more drawers located at a front of the sample handler module that is accessible to a human operator and providing an automation track that propels a plurality of sample carriers having magnets in a base of each sample carrier using coils in a surface of the automation track. Steps further include positioning, via the automation track, a first carrier of the plurality of carriers at a first location on the automation track that is accessible to a robot arm of the sample handler module, removing a first sample from the plurality of trays using the robot arm, and placing the first sample in the first carrier. Steps further include positioning, via the automation track, the first carrier at a second location accessible to a pipette controlled by a first analyzer module of a set of one or more analyzer modules and aspirating, using the pipette, a portion of the sample while the sample is stopped, via the automation track, at the second location. Additionally, steps include performing, by the first analyzer module, a clinical analysis of at least one of clinical chemistry characteristics and immunoassay characteristics of that patient sample.

BRIEF DESCRIPTION OF THE DRAWINGS

FIG. 11 is a perspective view of an exemplary robot arm for use with exemplary embodiments of the sample handler;

FIG. 31 is a top down view of electromechanical systems for an exemplary analyzer module for use with some embodiments.

DETAILED SPECIFICATION

Overview and System Architecture of Embodiments

An automation system for use with a clinical analyzer, or an integrated clinical analyzer having an automation system, can include any of the following embodiments. Embodiments can utilize a modular system including an automated clinical chemistry (CC) analyzer module and an automated immunoassay (IA) analyzer module, with sample loading capability to transport patient samples to and from analyzer module(s) where in vitro diagnostic assay analyses are performed. The system can be scalable in multiple configurations of the modules allowing customer yearly throughput needs ranging from low volume to very high volume/mega market segments (500,000 to 5M+ tests per year).

Some laboratories choose to link all of their various analyzers together using a laboratory automation system (LAS). The LAS ideally provides a place to centrally load and unload samples, and can automatically distribute those samples for processing at each of the connected analyzers. Also included in the distribution path may be various types of pre- and post-analytic devices, such as centrifuges, decappers, recappers, and aliquotters. These devices can be accessible to the automation system, or may be standalone devices that require operators to manually remove sample tubes from the automation system for pre- and post-processing. In some embodiments, the automation systems described herein can also interface existing laboratory automation systems, allowing embodiments to expand upon existing laboratory equipment or interface with modules that have not been designed to interface with the automation systems described herein.

The automation system can be described as a process control manager (PCM) that manages the processing of samples. This includes providing input and output for samples into and out of the system, temporary storage of samples while awaiting processing, scheduling of samples for processing at various analyzers attached to the PCM, facilitation of the movement of samples throughout an automation track (including onto and off of the automation track), and, in some embodiments, maintenance of the automation systems. An exemplary PCM for use with embodiments comprises the following main modules and subsystems:

Sample Handler (SH)—comprising subsystems that can include: control storage; robot; gripper; module manager PC; sample input/output (I/O); drawer vision system (DVS). The SH acts as a sample source/sink. The SH is the primary one of three ways the PCM system potentially acquires samples. The other two methods are the Lab Automation System (LAS) and the direct connect (manual) method. The SH provides a means for the user to load and unload regular samples, STAT samples, and control/calibrator vials onto and off of the system. Within the SH, the robot subsystem is responsible for moving these tubes between other subsystems and modules, including the sample I/O (drawer trays), control storage, and the vessel mover.

Figure 3:
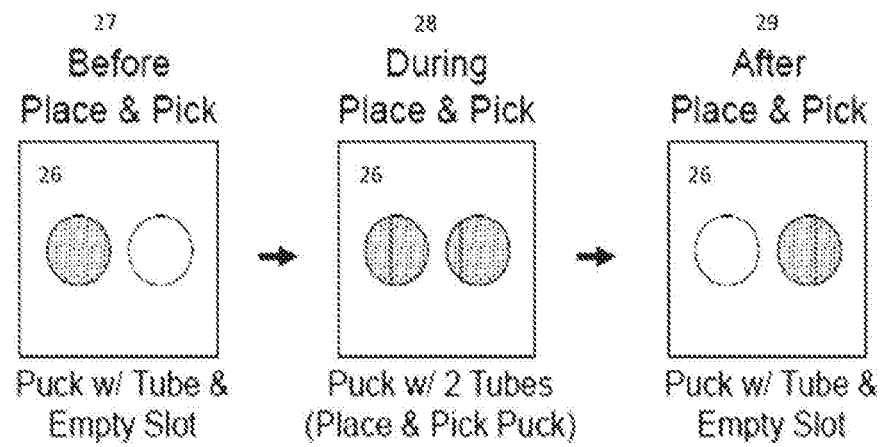
FIG. 3 is a series of diagrammatic top down states of an exemplary carrier for use with some embodiments.

Vessel Mover (VM)—comprising subsystems that can include: sample pucks/carriers; vessel mover manager; track structure; coil boards; track mounting; master boards; and high level node controller(s). Some embodiments utilize an analyzer system having an integrated modular platform, which allows sharing of materials among analytical modules. Materials can include patient samples or reagents for the same kind of analytical modules. An integrated system embodiment may provide a streamlined sample flow from the customer's point of view. This can be accomplished through a single location for sample loading and unloading, which provides reliable and fast sample distribution system. The vessel mover subsystem handles this material distribution. Under normal conditions, a lab technician never operates the vessel mover track directly. The vessel mover manages carriers on an automation track that moves samples or reagents, each carrier having a dedicated type of holders. For example, a tube holder has two locations (sometimes called A and B) and, under normal operation, only one of them has a sample tube (FIG. 3). In some embodiments, a reagent carrier can handle reagents from both an immunoassay (IA) module and clinical chemistry (CC) module.

Utility Center—comprising subsystems that can include: vessel mover fail-over power supply; central computer system; network switch for internal communication; alternate track power supply; sample handler power supply.

Of these modules, the primary physical modules include the sample handler and vessel mover. The utility center includes primarily electronic subsystems in the central computer system. The utility center is responsible for the status of hardware components, maintaining operation of the sample handler and vessel mover (including power failover), and internal communications infrastructure.

In addition to individual analyzer modules, there are three additional subsystems within these main modules that are worth additional noting in a summary of the system.

Control Storage—control and calibrator storage is a refrigerated module designed to cool quality control (QC) material while, at the same time, minimizing evaporation of QC material and light exposure. In some embodiments, the control storage module is located in the sample handler, and may be referred to, generally, as refrigerated storage. When viewed from the front of the sample handler, the module is located behind the sample loading area and in front of the tube characterization station. Control storage can be accessed by the sample handler robot arm. In general, users do not have access to the control storage module directly (except in the event of system failure, where the QC material cannot be removed from module with the sample handler robot). The control storage module is generally designed to store control and calibrator vials. Vials/tubes fit into a thermally conductive tube base subassembly (e.g., a thermally conductive plate having recesses to receive tubes), which is cooled using thermoelectric devices attached to the refrigerated storage subassembly. A control access door assembly allows the sample handler robot to access QC materials. The cover can further insulate the module and provide a light barrier. To further prevent evaporation, the subassembly can have a set of movable evaporation covers that sit over each QC tube.

In some embodiments, the control and calibrator storage is located in the rear center of the sample handler module. Control and calibrator tubes can be loaded in the sample drawers in the same manner as sample tubes. In general, the subsystem cannot be accessed from the front of the instrument. The system track and tube characterization station border the system on the rear side, in proximity to an automation track. In some embodiments, the control and calibrator storage takes up the width of a sample handler and sits on the main component deck. In some embodiments, two pins are located on the component deck that allow the control storage to be secured via screws. Beneath this deck, three thermoelectric devices (TEDs) cool the subsystem. In some embodiments, the area under the control storage is subject to condensation that could build on the outside of the module or from condensation channels that help remove condensation from the inside of the module. Mitigations, such as having no electronic devices and the addition of a drip tray, can be used accordingly. In some embodiments, a drip tray located several inches below the TEDs collects condensate from the inside of the module and allows air exhausting from the TEDs to blow over any condensate and assistant in evaporating it.

DVS—The drawer vision system (DVS) is a modular subsystem that may include, in some embodiments, a fully independent set of electronics for each drawer. The DVS uses a global shutter and extremely short exposure time (e.g., a strobe of approximately 100 µs) to capture images of the tube trays as an operator closes each drawer. A drawer encoder system is used to trigger the cameras at precise locations corresponding to each row in the tray (and in some embodiments, additional images at the front and back of each tray to provide oblique camera angles for each row). Because each row of tubes will appear in multiple images of adjacent rows, the DVS can perform stereoscopic (or triscopic) image analysis of objects in the tray. Each adjacent image provides a different angular viewpoint and perspective of each row of tubes. Additional explanation of some of the concepts of the DVS can be understood with respect to Patent Application No. PCT/US2015/035092 incorporated herein by reference in its entirety.

In some embodiments, DVS cameras for each drawer can be integrated into a custom image capture board, which is responsible for synchronizing the image captured with the drawer motion. A buffer of the resulting images in local memory can be created (and overwritten if the drawer is not smoothly closed) and transferred to an external computer for off-line analysis. This allows analysis to occur at a much slower rate than the rapid rate in which the drawer is closed by a human operator. Due to the brief exposure time, in some embodiments, the DVS utilizes custom illumination boards to reduce short pulses of high intensity light (e.g., an illumination board can be mounted directly to the image capture board and provide a ring of LEDs around each camera lens to minimize shadows). These two boards, along with a clear protective sheet of acrylic or glass that is mounted to the elimination board, form a DVS optical stack.

TCS—a tube characterization station (TCS) is an integrated subsystem that uses a plurality of cameras (preferably three cameras) to provide 360° imaging of objects on the vessel mover track. Namely, the TCS may be used to characterize sample tubes that are placed into carriers (e.g., by the SH robot arm). The optical characterization information generated by the TCS can be used by central planner software (operating at the central computer for the analyzer system) to identify each vessel, establishing chain of custody, and to determine the processing tasks that are required for each sample, and thereby each sample carrier. For example, optical analysis of the sample tube can reveal the barcode information for each sample tube, which uniquely identifies the sample tube contents. Tube characteristics can also be made available to pre-analytic and analyzer modules to improve the efficiency and reliability. For example, any deviations from the nominal orientation location of the tube with respect to a carrier can be conveyed to optimize pipetting from the sample tube. Furthermore, statistical analysis of the behavior of sample tubes and carriers relative to nominal can be used to assist in calibration procedures of both the vessel mover and sample handler modules.

The TCS can also feature classification or pattern matching, in order to ensure that a wide variety of sample vessels can be identified. In some embodiments, the TCS can classify each tube as a certain type of standard tube. In some embodiments, physical measurements can be optically taken to identify the exact physical size of tubes to account for dimensions that are outside of nominal for each tube type. Exemplary characteristics that can be conveyed include height, cap presence, orientation relative to vertical, asymmetry, etc.

Sample Handling System and Vessel Mover Systems

The sample handler module is responsible for the main interface to the operator/lab technician. The sample handler module accepts sample tubes through the sample input/output (I/O) area. The sample I/O area can include a passive drawer system capable of storing between 360 and 440 sample tubes, depending on sample tray configuration. For example, an exemplary system accepts both 15 position and 55 position sample trays, which can be placed in one of four slots. During the insertion of a drawer by the operator, the drawer vision system (DVS) will acquire images of all of the rows in the trays. (An exemplary DVS that may be used with some embodiments is explained in further detail in Patent Applications PCT/US2014/027217 and PCT/US2015/035092, incorporated herein by reference in their entirety.) These images from the DVS are transferred to the sample handler's module management processor, where they are analyzed, in parallel, with the robot's operation to provide information on where tubes are located, determine if they have caps or tube top sample cups, identify the size of each sample tube, and update information on the center of the tube to improve pick/place accuracy and precision.

An exemplary sample handler comprises a three-axis linear gantry robot based upon a linear servo motor technology, which is responsible for the transport of patient samples, quality control material, reagent calibrator material, and, in some embodiments, reagent cartridges. The sample handler robot contains a stepper-motor-based linear actuator, which is used in a servo motor fashion, to apply a constant force to sample tubes in order to extract them from 55 or 15 position sample trays in the drawer space, and to move them to the sample puck/carrier (the terms being interchangeable as used herein, as the term puck is a traditional term of carrier) located on the vessel mover. Human operators directly load and unload samples into the 55 or 15 position trays, and then place them into manual drawers that are accessible to the robot.

Once a sample is loaded into a sample carrier on the vessel mover, it is presented to the tube characterization station (TCS) for a set of images to be acquired, allowing a number of characteristics to be determined. This will allow for the ability to read barcode labels in any orientation and provide for a three dimensional perspective on the sample tube for acquisition of its key characteristics (height, width, cap presence, cup presence, tube lean, tube center). Once the barcode is acquired and all relevant physical characteristics are determined, the sample puck will be routed to the appropriate analyzer, based on a decision from a central planning processor and software, where it will be handed off to the analyzer once it enters the proper in-process queue. Once completed, the sample will return to the control of the vessel mover and be routed either to the next analyzer to be processed or the sample handler if all work is complete. As long as there are unprocessed samples or any orders for repeat processing (either reflex, rerun, or auto-dilution) available on the system, this cycle will repeat.

The TCS is comprised of three barcode readers and one image analysis camera, which acquire a set of images upon external trigger to determine the following information about each sample tube and carrier: sample carrier ID (2D barcode); sample ID (1D barcode); sample tube height (mm); sample tube width (mm); sample cap presence (True/False); sample cup presence (True/False); sample tube centerline relative to theoretical center (mm). In some embodiments, the TCS acquires an image of the tube in the carrier from three cameras.

With this information, the sample tube is then transferred successfully to the vessel mover for distribution to the required analyzers. An exemplary vessel mover is a linear synchronous motor based conveyor system whose primary responsibility is the transportation of samples requiring aspiration (either patient, QC, or calibrator) to the analyzer it is instructed to by a software planning component. Upon completion of all work orders for a sample the carrier is returned to the sample handler where the robot moves the sample tube from the carrier back to either a tray or the refrigerated control storage compartment (depending on the sample type).

The sample handler drawer system contains a module known as the drawer vision system (DVS). This subsystem is active when an operator closes a sample drawer where it acquires images for each row of all of the trays loaded into the sample handler. These images are then transferred from the DVS to the sample handler module manager PC where they are processed to provide the following information: sample tube presence (True/False); sample tube cap presence (True/False); sample cup presence (True/False); sample tube height (mm); and sample tube offset from center (mm).

Based on the information output from the DVS, the sample handler robot sample tube coordinates will be updated to minimize the potential for a jam condition during the pick operation of a sample tube. Once the drawer is fully inserted and the sample handling robot has the information decoded from the DVS acquired images, the robot will begin the processing of the samples from the drawer to the sample pick-place position, where it will place the sample into the open slot on a sample carrier. The robot will then move either to the left or the right, and retrieve a returning sample (in steady state operation) to be put back into a sample tray for output to the operator.

In some embodiments, within the sample handler space there exists a refrigerated space for the prolonged storage of quality control (QC) and calibrator material for use in the system. QC and calibrator material can be used to intermittently calibrate and verify quality control of certain instruments within the clinical analyzer. This material typically must be refrigerated to a uniform temperature to verify effectiveness of calibration. Because calibration is done intermittently in the system, it is helpful to store QC and calibrator material in a refrigerated compartment accessible to a sample handling robot. QC and calibrator material can be stored in individual sample tubes containing material, allowing these tubes to be transported via the same vessel mover mechanisms as patient samples. The control storage module maintains a 4° C. to 8° C. environment with a <4° C. gradient in sample tubes stored within it (gradient applied only to tubes stored long enough to reach steady state). Any tubes identified for long term storage will be placed into this module once the information is received from the tube characterization station (TCS).

The refrigerated control storage module is a subassembly contained within the sample handler space whose primary function is to provide a refrigerated space for up to 60 sample tubes containing either quality control material (QC) or calibrator material. These sample tubes will be stored in this compartment once identified by the TCS for up to 7 days or the length specified by their instructions for use (IFU), whichever is shorter.

Figure 1:
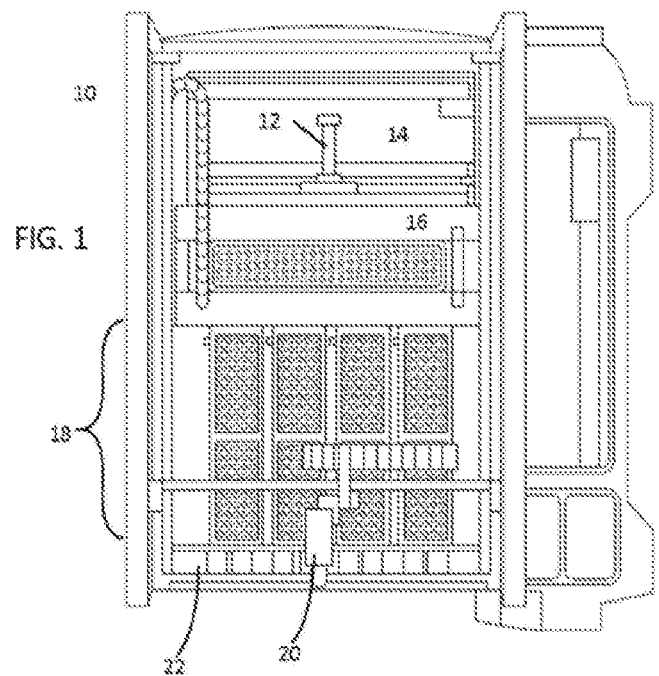
FIG. 1 is a top down view of an exemplary sample handling module for use with some embodiments.

FIG. 1 shows a top down view of an exemplary sample handler 10 that may be used for some embodiments. Within this figure, sample handler 10 is oriented so that the front (i.e., the face that the operator interacts with) is at the bottom of the page, while the back of the automation track is located at the top of the page. Sample handler 10 includes a tube characterization station 12 at the robot/track interface. Tube characterization station 12 characterizes tubes and carriers when tubes are placed on carriers on track 14. This allows information to be ascertained about the identity of the tube placed in each carrier, and the physical condition of each tube (e.g., size of the tube, fluid level, whether there is a tube top cup, etc.) Adjacent to the tube characterization station 12 sits a control/calibrator storage region 14. This allows long-term refrigerated storage of control and calibrator fluids near the track, allowing these fluids to be easily placed into carriers on the track for movement to relevant locations in the analyzer. The location of storage 16 also allows input/output drawers 18 to be placed in the front of sample handler 10. In this example, there are four adjacent drawers 18 that can be individually opened and pulled out.

A robot arm 20 can move in two dimensions to pick up any of the tubes in drawers 18 and move those tubes to and from storage 16 and carriers on track 14. Robot arm 20 can be positioned by moving a gantry from the front to the back of a sample handler 10 while a carriage moves side to side along that gantry. Opposable end effectors can then be moved vertically to reach down to pick up tubes, closing the end effectors when they are properly positioned to engage the tube.

To assist the robot arm 20 in successfully engaging each tube, a drawer vision system 22 is placed above the drawers at the opening to the drawers. This allows a series of images to be taken, looking down at the tubes in the trays, as the trays are moved past the drawer vision system. By strobing a series of cameras, multiple images can be captured in a buffer, where each tube appears in multiple images. These images can then be analyzed to determine the physical characteristics of each tube. For example, diameters and heights of each tube can be determined. Similarly, the capped or uncapped states of each sample can be quickly determined. Furthermore, the presence or absence of a tube top cup (a small plastic well that is placed on top of a tube to allow a tube to transport a much smaller volume with greater depth of the sample, to allow aspiration to more easily take place) can be ascertained. Similarly, the characteristics of any cap can be ascertained by the images. This can include certain color markings on the cap to identify a given sample as a higher priority (STAT) sample.

The module manager PC can utilize this information to schedule samples to be moved from each tray in drawers 18 into carriers on track 14. The module manager PC can also instruct robot arm 20 how to interact with each tube, including identifying the proper height for the end effectors before engagement, and the proper force or distance to use when engaging the end effectors to accommodate multiple diameters of tubes.

In some embodiments, where a sample is determined to be of a fluid type that requires refrigeration, or where a scheduling algorithm determines that refrigeration is needed because of a delay in processing that sample, robot arm 20 can move that sample from drawers 18 (or from a carrier on track 14 if already on the track) into temporary storage in refrigerated storage 16. In some embodiments, refrigerated storage 16 is only used for control and calibrator storage. In some embodiments, a determination of whether or not to store samples in refrigerated storage 16 depends on the available space within storage 16 (i.e., the space not taken by controls and calibrators), allowing space to be dynamically allocated to mixed-use, as appropriate.

In some embodiments, refrigerated storage 16 includes a thermoelectrically controlled plate having an array of recesses configured to receive sample tubes. For example, this plate can be a block of aluminum or steel that has been machined to have a series of cylindrical recesses sized to hold sample tubes. This aluminum or steel block can then be coupled to thermoelectric coolers (TECs), such as Peltier devices, and thermocouples/thermal sensors to control temperature of the aluminum plate and, thereby, control the temperature of fluid stored in sample tubes held in that plate. Meanwhile, an insulated lid that can be opened by a motor is placed on top of the storage area. This allows sample tubes to be placed into the refrigerated plate and removed from the refrigerated plate without restriction, but the volume of refrigerated storage is generally insulated and closed, much the way a refrigerator might be. In some embodiments, the tubes in refrigerated storage 16 can be protected against evaporation by placement of a loose-fitting lid that can be placed and removed by robot arm 20.

Figure 2:
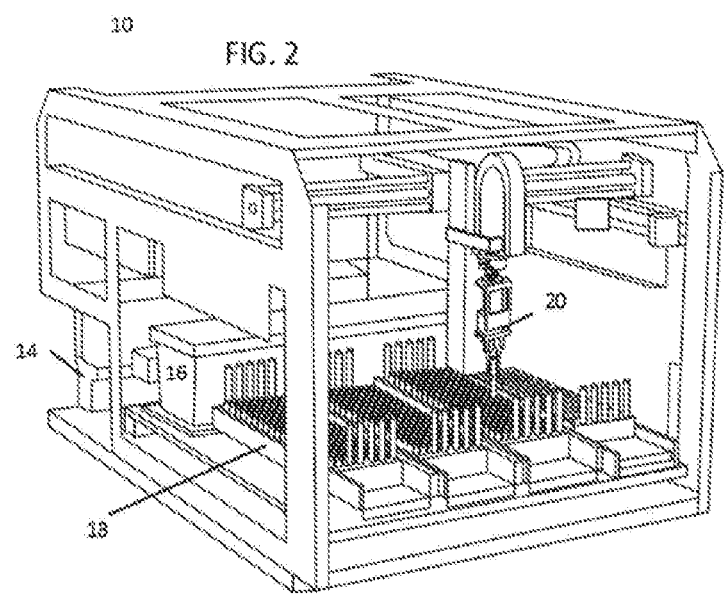
FIG. 2 is a perspective view of an exemplary sample handling module for use with some embodiments.

FIG. 2 is a perspective view of a sample handler 10. In this example, track 14 is roughly parallel with the front face of drawers 18, while refrigerated storage 16 is a large physical object between drawers 18 and track 14. Meanwhile, robot arm 20 is moved on supports, well above the height of drawers 18 and refrigerated storage 16. Tube characterization station 12 and DVS 22 are not shown in FIG. 2, to allow the internals of sample handler 10 to be better understood.

In some embodiments, drawers may be designated for certain tasks in software. For example, the processor controlling sample handler 10 can be configured to identify any of the four drawers as sample input, sample output, or sample input/output. By designating certain drawers as dedicated to input or output, samples may be loaded in one location to start a batch, and removed from another location when the samples are complete. Once an output tray is removed after being full, software can then designate the respective drawer as an input lane, allowing an operator to replace a withdrawn tray with a fresh tray of additional samples to test.

In some embodiments, drawers may also be configured to accept reagents in reagent vessels. Software can identify which drawer, or portions of a drawer, are designated for receiving fresh reagents. This can facilitate the automatic delivery of reagents to analyzer modules accessible to track 14 (and any track sections connected thereto), allowing an operator to deliver sample reagents to one location for automatic delivery to refill reagents in the analyzers, greatly reducing manual overhead in a laboratory.

FIG. 3 illustrates how robot arm 20 interacts with sample tubes in carriers on track 14. In some embodiments, dual position carriers are utilized, allowing a place and pick movement by the robot arm. To illustrate this interaction, FIG. 3 shows three states for carrier 26. Carrier 26 includes two slots: one slot that carries an existing sample tube that has already been processed after being moved by the vessel mover system and is now ready for removal from the track and placement into trays or refrigerated storage by the sample handler; and another slot that is initially empty when the carrier arrives on track 14 at a location suitable for interacting with robot arm 20. This initial state is shown in state 27, where an existing tube resides in the rearmost slot (the slot to the left) and the foremost slot (the slot to the right) is empty, awaiting placement of a sample from the input region to begin processing that sample tube. Robot arm 20 picks up the next scheduled sample from a tray in the input/output region, and moves along the three axis gantry to place the tube into position for insertion in the rightmost slot. At state 28, the robot arm lowers and places the new sample tube into the rightmost slot for processing. In this state, both slots are occupied by an already-processed sample and by a sample yet to be processed. To remove the already-processed sample, the robot arm can stay stationary and the carrier can be moved half its length to the right, or the robot arm may be moved the short distance to the leftmost sample. At state 29, the robot arm removes the leftmost sample and begins transporting it to storage in the sample handler, such as placing that sample into a tray designated for output. The rightmost to-be-processed sample remains, and the carrier can then be transported by the vessel mover system to its destination. Meanwhile, as the already-processed sample fills an output tray, an operator can be alerted that a tray is ready for removal and the operator may remove that tray.

By utilizing a place and pick carrier 26, the overall transit required for removing existing post-processed samples and inserting new preprocessed samples can be greatly reduced (as will be explained with respect to FIG. 7). For example, if only a single slot existed in a carrier, robot arm 20 would need to move into position above track 14 and the carrier to remove that post process sample. Robot arm 20 would then need to move back across the entire sample handler to place that post process sample into a suitable tray. Then, robot arm 20 would need to move into position over one of the input trays to remove the next preprocessed sample for analysis. Robot arm 20 would then lift that sample tube, move back across the entirety of the sample handler to track 14 and the slot of the carrier, lower, and deposit that preprocessed sample into slot of the carrier. Meanwhile, the carrier sits idle on the track. By utilizing a two-position carrier, the throughput of the robot arm can effectively be doubled, and the amount of time that a carrier sits idle on track 14 can be greatly reduced. For example, where the transit time between any waiting position and the position for interacting with the robot arm is on the same order as the time it takes for the robot arm to move to a tray, deposit a post-process sample, pick up a preprocessed sample, and move back to position above track 14, the idle time for a carrier on track 14 can become de minimis. It should be noted that, the next time that carrier returns, the opposite order of occupied slots will occur, with the carrier arriving for place and pick interaction with a tube in the rightmost slot.

Figure 4:
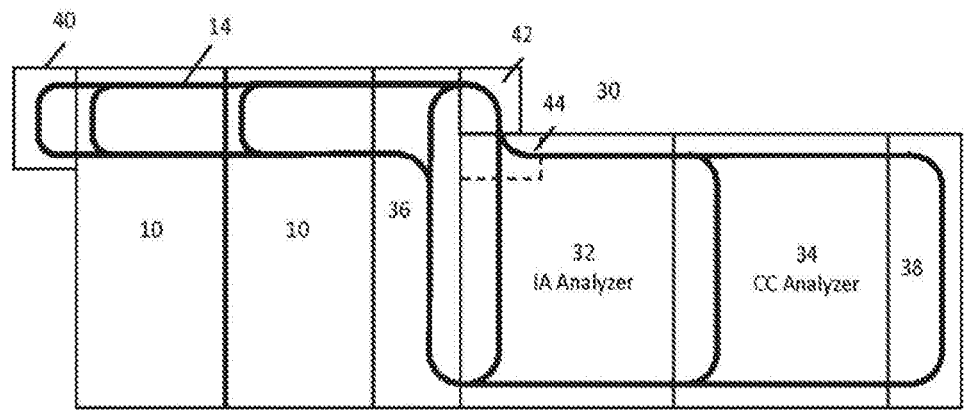
FIG. 4 is a diagrammatic view of an exemplary integral, modular automation track system for use with some embodiments.

FIG. 4 illustrates the vessel mover components of the PCM that moves samples from an input region to analyzer modules, assists in handling those samples within the analyzer, and returns process samples to the output region of the sample handler. Multi module analyzer system 30 includes multiple interconnected modules. In this example, system 30 includes multiple sample handlers 10. By utilizing multiple sample handlers, more sample trays can be placed into the system, allowing a larger batch to be started at the beginning of the shift. Furthermore, this allows twice as many samples to be placed onto, and taken off of, the track. This means that, for larger systems with multiple analyzer modules that can operate in parallel, input/output throughput can match the analysis throughput of the parallel analyzers. For example, if an analyzer module can handle 500 samples per hour, and three analyzer modules are used, the input/output demand for feeding these modules may be up to 1500 samples per hour. In some embodiments, a single sample handler may not be able to handle this demand, necessitating adding multiple sample handlers to keep up with the input/output demand of the analyzer modules.

Furthermore, in some embodiments, one of the sample handlers can be set up to be used as an input, while the other sample handler can be set up as an output. By using a modular approach, a single sample handler 10 can be used but, for larger systems, two or more sample handlers can be used.

In an exemplary system 30, two analyzer modules are utilized. Analyzer module 32 is an immunoassay analyzer. Analyzer module 34 is a clinical chemistry analyzer. These two analyzer modules perform different assays, testing for different characteristics of patient samples.

Track 14 is a multi-branching track that forms the heart of the vessel mover system. As can be seen, track 14 comprises branches and lengths that are provided integral to sample handlers 10 and analyzer modules of 32 and 34. The functions of the individual branches will be explained with respect to FIGS. 5 and 6. In addition to the track segments provided by these modules, additional modules 38, 40, and 42 provide short dedicated track sections that may be bolted to the track portions provided by the other modules. Track modules 36, 38, 40, and 42 provide powered track segments, without additional hardware related to sample handler modules or analyzer modules. Whereas modules 10, 32, and 34 may be full cabinets extending from a laboratory floor to the height of track 14, and above, track segment modules 36, 38, 40, and 42 may be bolt-on segments that extend from the cabinets of the other modules, without requiring floor-length support. Each of the modules in FIG. 4 can be bolted together in modular fashion, utilizing leveling hardware, such that each track segment between adjacent modules forms a virtually seamless track for carriers to traverse the vessel mover system.

In exemplary system 30, it can be seen that section 44 of the track of analyzer module 32 may need to be altered from the corresponding section of analyzer module 34. In some embodiments, the track segments of analyzer modules are in the same configuration as that shown in analyzer module 34 when they are shipped from the factory. This allows multiple analyzers to be placed in series, simply bolting their respective track segments together to form a long chain. In some embodiments, where there is an offset between the back track segment of the sample handler modules and the analyzer modules, as is illustrated in system 30, an S-shaped bend may be needed to allow carriers to move from the back track section of analyzer modules to the back track section of the sample handler modules. In this example, this S-shaped bend is provided by bolting on track section 42 and the altered track segment in area 44. Thus, it should be understood that the track segments within analyzer modules, while integral to those modules, can be extensively modified at the time of installation, allowing multiple configurations of the track segments within an analyzer module. However, it should be understood that these track segments are still very much integral to those analyzer modules. In some embodiments, the back of analyzer modules 32 and 34 are flush with the backs of sample handlers 10, eliminating the need for altering track segment 44 and section 42, entirely.

Track segments 38 and 40 are U-shaped track segments that provide returns between front track segments and back track segments, allowing traffic to move around the track 14 without traversing interior chord segments within sample handler or analyzer modules. This allows the track 14 to form an outer loop, with main traffic moving along the perimeter of the analyzer modules. Meanwhile, the internal track sections bypass the main loop, providing a direct path between two sides of each analyzer module (front to back), which serves as a route for local traffic. These chord segments can also be referred to as internal segments/track sections, bypass segments/track sections, or, in some cases, local track sections. These chord segments bypass the outer loop to provide access to a pipette. This allows small physical queues relevant to each sample handler or analyzer module to utilize those interior chord segments, without blocking the overall flow of track 14.

A specialized track segment module 36 facilitates sample return and branching within track 14 to allow the central computer system of the PCM to direct traffic in flexible ways. The outside track portions provide a way for samples to move from sample handler modules 10 to track segments of analyzer module 32, and vice versa. Meanwhile, the inner chord of track segment module 36 provides a branch whereby samples can move from analyzer 32 to analyzer 34 (in a counterclockwise manner), without moving into sample handler modules 10. This facilitates multiple tests on a single sample tube, allowing sample tubes to freely move between analyzer modules, regardless of how they are arranged on the right-hand side of system 30. This gives the PCM scheduling software flexibility in how samples order the tests within analyzer modules, without increasing traffic on the track segments relating to sample handling. Track segment 36 provides a boundary between sources and sinks (e.g., sample handler modules 10) and processors (e.g., analyzer modules 32 and 34) by providing a branching loop within section 36 (and section 42, in some embodiments). This loop allows sample carriers to move between the sources, sinks, and processors, including allowing samples to loop without returning to the sources and sinks.

Not shown in FIG. 4 is the central computer that includes a system instrument manager software component. The instrument manager software consolidates information from lower-level modules, such as sample handler 10 and analyzer modules 32 and 34, to present this information to an operator. The instrument manager receives information from the other modules via a network within the system (e.g., an internal Ethernet network). Information may be requested and provided asynchronously between the modules and central computer. The central computer can also work between the LIS and vessel mover systems to schedule samples and their movement within the system. The central computer can also work between the vessel mover systems and individual modules to handoff control of the samples and to initiate testing of samples once they arrive at a location.

Figure 5:
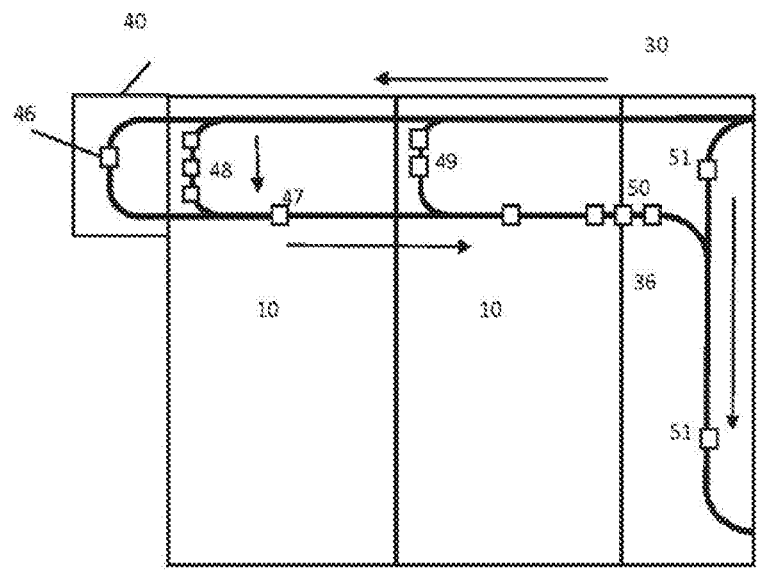
FIG. 5 is a diagrammatic view of an exemplary integral, modular automation track system for use with some embodiments.
Figure 6:
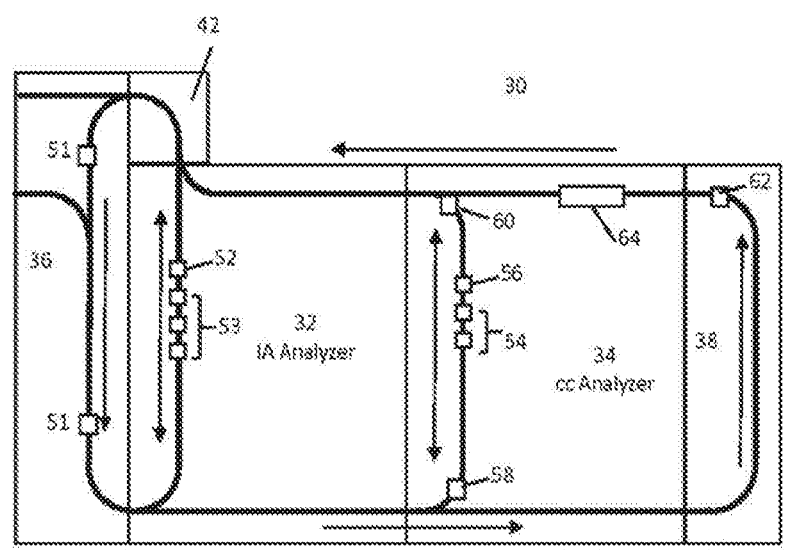
FIG. 6 is a diagrammatic view of an exemplary integral, modular automation track system for use with some embodiments.

FIGS. 5 and 6 show additional detail during normal operation of the system shown in FIG. 4. FIG. 5 shows the sample handler portion of system 30, while FIG. 6 shows the analyzer module portion of system 30. In exemplary system 30, motion within the vessel mover system is generally done in a counterclockwise fashion, as shown by the arrows in FIGS. 5 and 6. Exemplary carriers (shown as squares) traverse the various track segments. It should be appreciated that the track segments in FIGS. 4-6 are shown in symbolic form for clarity. Further detail about the construction of these track segments is explained with respect to FIGS. 14-16. In most embodiments, track segments include a flat surface that supports the carriers, as well as vertical walls, and guide rails that assist carriers in moving in the proper linear direction along the track surface. In some embodiments, carrier 46 in track segment module 40 can use the track segment module 40 to bypass queues for individual sample handling modules (such as when carrying a STAT sample). In some embodiments, track segment module 40 may also be accessible to an operator, allowing carriers with samples requiring manual interaction (e.g., samples that have resulted in an error at some point in the system) to be presented to an operator for removal or inspection. This allows track segment module 40 to act as a maintenance port for an operator. In some embodiments, track section module 40 can also provide access to a laboratory automation system (LAS).

Some laboratories choose to link various analyzer systems together using an LAS system. The LAS provides a place to centrally load and unload samples and, in this example, allows samples handled by sample handlers 10 to have access to external automation systems that allow those samples to be handled by legacy systems. For example, older analyzer modules may not be accessible to the track system of many embodiments. For example, a whole blood analysis module may already exist in a laboratory that is not directly connected to the track segments discussed herein. By connecting a robot arm (which may be provided by the LAS) to track segment module 40, samples can be removed from section 40 and placed into existing automation systems that exist in the laboratory. Those samples can then be moved to the whole blood analyzer module that is connected to the LAS. In such an embodiment, track section 40 is a source or sink for patient sample tubes.

Carrier 47 is stopped at the interaction point for the robot arm in sample handling module 10. Carrier 47 can pause for a place and pick interaction with the sample handler robot arm, and then be characterized with the new sample tube by the TCS for sample handler module 10. In some embodiments, a single TCS can be installed in the rightmost sample handler 10 to reduce the overall cost of installing multiple TCS systems. Meanwhile, small physical queues 48 and 49 contain sample carriers that are waiting to interact with sample handling robots in the sample handler modules. Carriers in queues 48 and 49 may have low priority samples that have completed, waiting for a free cycle of the sample handler robot arm to offload the sample contained in each carrier. This frees the outer loop of track 14 to handle higher priority samples, without requiring the flushing of queues 48 and 49. Furthermore, where the system has completed analysis of most or all pending samples and is awaiting additional sample trays to be inserted, carriers that are not actively transporting samples for testing can be stored in queues 48 and 49, allowing those carriers to sit idle without creating traffic on other segments of track 14. Exemplary embodiments of a TCS are described in the following co-assigned applications, which are incorporated by reference in their entirety: PCT/US2014/021572; PCT/US2016/018062; PCT/US2017/014777; PCT/US2017/014778; PCT/US2017/014767; PCT/US2017/014772; PCT/US2017/014773; PCT/US2017/014774; and PCT/US2017/014775.

In some embodiments, an output queue 50 for sample handler modules 10 can be utilized to temporarily hold sample carriers that are ready for analysis. Such a queue can be used when the system deems there are too many sample carriers already in the analyzer portion of the track. Samples can then be gated in queue 50 until space within analyzers 32 and 34 frees up.

Meanwhile, samples 51 within track segment module 36 can utilize module 36 to bypass the sample handler section of the automation track to return for further testing within the analyzers.

As shown in FIG. 6, sample carriers within the analyzer section can utilize the track geometry to efficiently interact with analyzer modules 32 and 34. Analyzer 32 has a pipetting station in proximity to carrier 52. When a sample is moved into the position of carrier 52, a pipette for IA analyzer module 32 can aspirate a sample portion for testing. Meanwhile, the internal track segment of module 32 can act as a physical queue 53. These internal track sections for analyzers can be bidirectional. Thus, physical queue 53 can be moved towards the front or the back of analyzer module 32. This allows queue 53 to act as an independent random access queue by moving an appropriate carrier to the pipetting location without flushing the entire queue around the track (e.g., samples can be moved to the back of position 52 if a sample in the middle of the queue needs to be accessed). In some embodiments, a local processor within each analyzer module handles the queuing within the physical queue in the inner track segments of each analyzer module. For example, a processor within analyzer module 32 can control the track segment for queue 53 to access any carrier within that queue on demand. Meanwhile, the global processor that manages traffic on track 14 for the entire PCM system can be responsible for adding sample carriers to each local queue and removing carriers therefrom. Thus, from the vessel mover global processor standpoint, each queue within an analyzer is a first in first out (FIFO) queue, while the local track manager within each analyzer module queue can be random access.

Like queue 53, queue 54 in analyzer module 32 allows random access for the CC analyzer module 34 to the local bidirectional track to any sample contained therein. Sample carrier 56 is placed at an interaction point for the local pipette for analyzer module 34. Sample carrier 58 is arriving to join queue 54 from the outer track segment. At this point, control over detailed management of the location of sample carrier 58 can be handed off from the global vessel mover manager processor to the local processor within analyzer module 34 that controls the internal track segment. Similarly, sample carrier 60 has completed its interaction with analyzer module 34 (e.g., analyzer module 34 has completed aspirations from the sample tube being carried), and the local track returns carrier 60 to the main loop of track 14. Sample 62 is on return track segment module 38. This track segment can be used for samples that are bypassing local analyzer track segments. For example, if the track needs to be flushed for some reason, or if local queues are full, this path can be used to place sample carriers in effectively a holding pattern.

In some embodiments, carriers can carry more than just patient sample tubes. Carrier 64 is a carrier configured to traverse the track 14 and carry reagents to analyzers, rather than patient sample tubes. In some embodiments, an interface between analyzer module 34 and carriers holding reagents can exist at the location of carrier 64. At that location, in some modules, a robot arm or other appropriate movements system can capture a reagent vessel (such as a reagent wedge), removing that reagent from the carrier, and placing that reagent wedge into a local reagent storage within the analyzer. For example, immunoassay analyzer module 34 may require certain reagents that are not generally stored within the analyzer, or may need to refill reagents. In some embodiments, an operator can insert appropriate reagents into the sample handling module for automated delivery of reagents to appropriate analyzer modules. Exemplary logic and systems for delivering reagents to local analyzer modules via the automation track can be understood with respect to co-assigned U.S. Pat. No. 9,645,159 and patent application PCT/US2014/011007, incorporated herein by their entirety.

In some embodiments, tubes containing controls and calibrators that are taken from refrigerated storage 16 can be placed into carriers that stop at the location of carrier 64, allowing analyzer modules to sample controls and calibrators in a different location on the track than that of patient samples. In other embodiments, controls and calibrators are placed into queues 53 and 54 for interaction with analyzer modules in a manner similar to that of patient samples.

In some embodiments, the sample handler and the vessel mover are asynchronous devices, which must coordinate their interaction at a single position. The vessel mover, as such, does not have any defined cycle time; it is a purely event driven system that will respond to commands to bring a carrier to the sample handler or move a carrier to the exit queue once a TCS image has been acquired. In some embodiments, the TCS is also an asynchronous device that, when triggered, will release a carrier for movement 1.00 second after it is triggered. Analysis and reporting of the results from the TCS will take place up to 1.00 s after the completion of the image acquisition. This timing can fluctuate based on the exact characteristics of the image acquired and the algorithm processing the images but, preferably, will not take any longer than some predetermined time limit, such as 1.00 s.

In some embodiments, the sample handler is designed to operate on an overall cycle no longer than 7.20 seconds in duration. However, due to the difference in location of tubes within the sample I/O area, the actual cycle time can vary. FIG. 7 shows the exemplary movement that occurs within a single movement.

Figure 7:
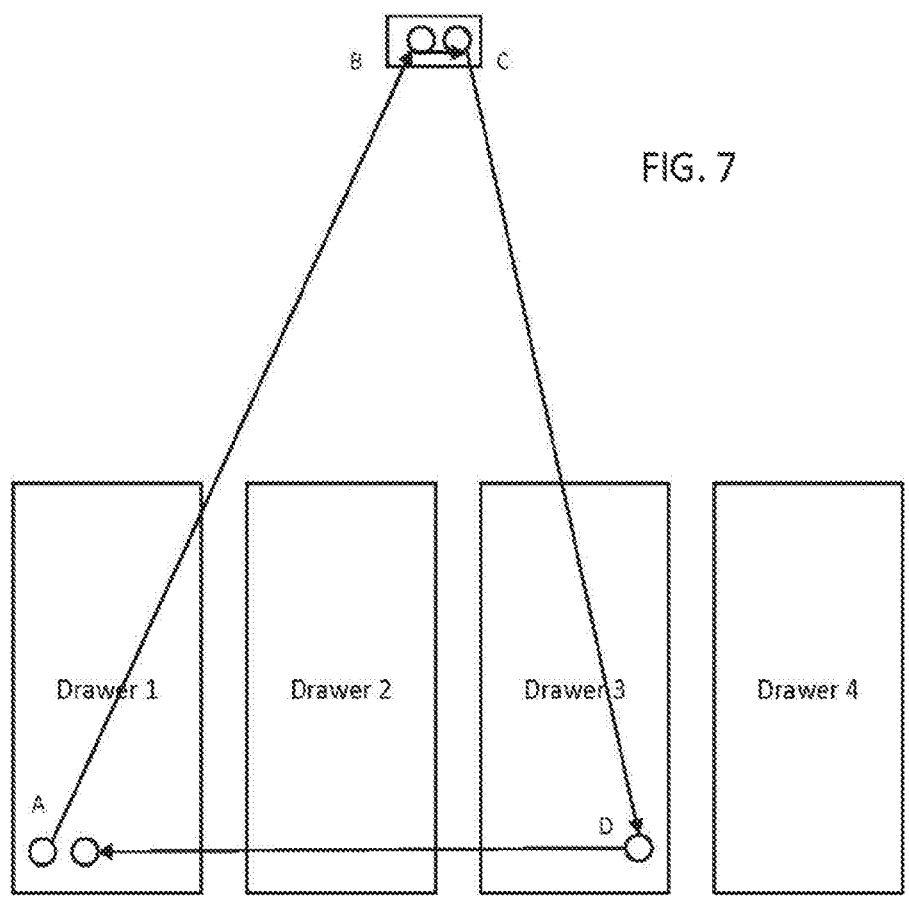
FIG. 7 is a diagrammatic view of an exemplary use of a sample handling module for use with some embodiments.

FIG. 7 shows an exemplary path for the robot arm 20 during a place and pick movement. At position A, the robot arm descends to retrieve a sample to be processed from drawer 1. The robot arm then moves over track 14 to position B to deposit the tube into an awaiting carrier. If the awaiting carrier has a post-processed sample ready for return to drawer 3, robot arm 20 moves to position C. At position C, robot arm 20 descends and picks up the awaiting sample tube that is finished. The robot arm then moves to position D, where an open slot exists in drawer 3. Robot arm 20 then deposits the sample in that awaiting slot, completing the motion. Then, robot arm 20 will move to the next position in drawer 1 for the next sample to be processed. The entire circuit completed by the robot arms should take no longer than the overall cycle time for the sample carrier. For example, in some embodiments, the cycle time may be 7.2 seconds, allowing 500 samples per hour to be processed by each sample handler.

The DVS and control storage compartment operate concurrently within the robot cycle time and are, therefore, not observable to other modules. The DVS transfers images to the sample handler module manager PC when requested, where the images can be decoded at approximately 150 milliseconds per image, in some embodiment. The control storage compartment has 1.00 second allotted for opening and closing the doors. The remainder of the activity required to move a tube in or out of the compartment does not fall into the 7.20 cycle boundary.

Figure 8:
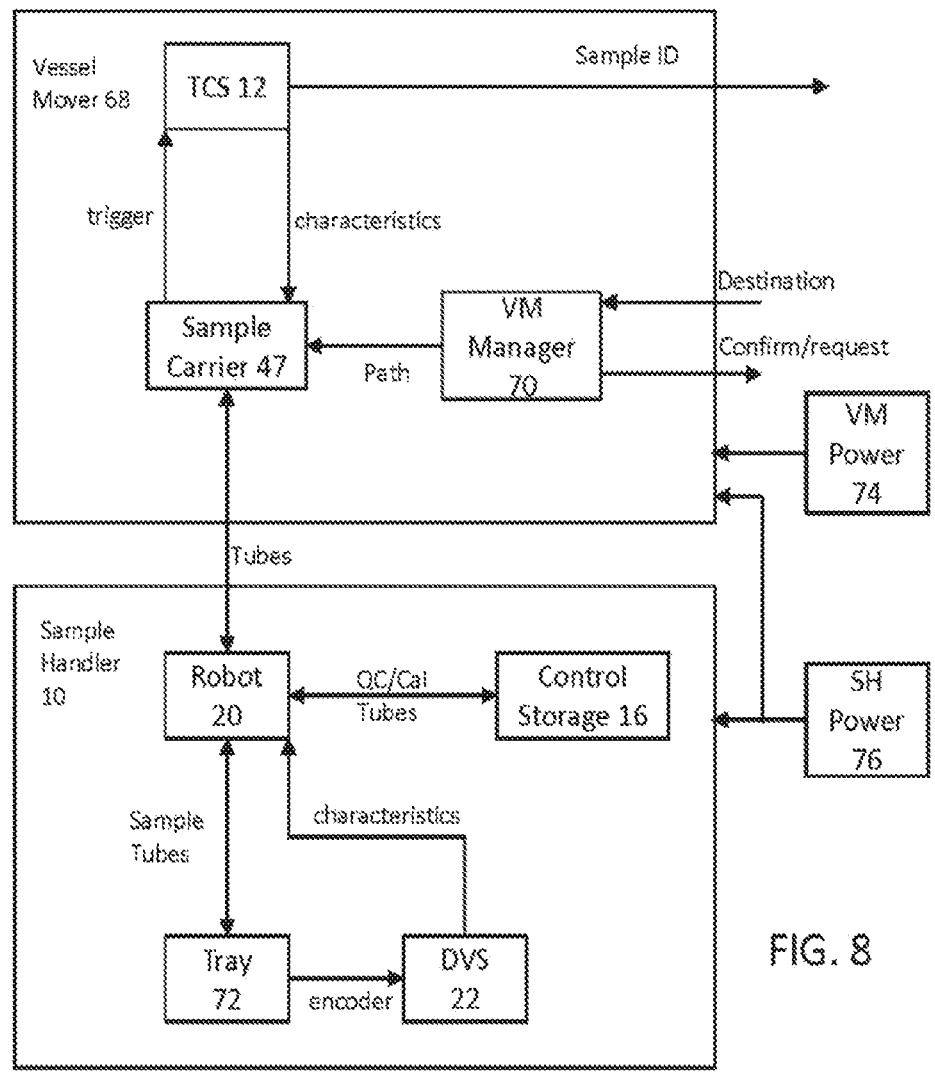
FIG. 8 is a system diagram of an exemplary sample handler and vessel mover for use with some embodiments.

FIG. 8 is a system diagram of the interaction between a sample handler 10 and vessel mover 68. Vessel mover 68 represents the system that manages the movement of hardware within the tracks to move sample carriers between and amongst analyzers and sample handlers. Vessel mover 68 is controlled by vessel mover manager 70. Vessel mover manager 70 is responsible for interacting with the central computing system for the analyzer system to communicate the presence of samples on an automation track and receive information about proper destinations and scheduling for those samples. Sample carriers 47 and TCS 12 are also part of the vessel mover, along with automation track sections. When a sample carrier 47 arrives at the proper location in proximity to a sample handler 10, robot 20 interacts with a sample carrier 47 to remove finished sample tubes and add new sample tubes to sample carrier 47 for processing.

Sample carrier 47 moves into position with TCS 12, setting off a proximity trigger. This trigger can be a wireless communication between carrier 47, a physical switch on TCS 12, an optical switch or electrical sensor on TCS 12, or any other suitable device for detecting the presence of sample carrier 47 at TCS 12. From its interaction with sample carrier 47, TCS 12 identifies the ID of the sample tube in the carrier (e.g., by scanning the barcode with one of the cameras and TCS 12) and determines the physical characteristics of the tube and carrier. These characteristics are then assigned to sample carrier 47 by TCS 12. The sample ID is then communicated to the central computing system for scheduling of that sample. Once the central computing system has a sample 80, it can determine the appropriate test schedule based on information in the laboratory information system (LIS). Once the test schedule has been determined, the routing destination (and, in some embodiments, schedule) for that sample and carrier can be determined and computed by the central computer.

Once TCS 12 has finished characterizing the tube held by separate carrier 47, the vessel mover manager can request destination information from the central computer. Once it receives the destination, vessel mover manager 70 can determine the appropriate path to send the sample carrier 47, along with the immediate schedule for reaching that destination based on the current traffic and routing information for other sample carriers on the track. Vessel mover manager 70 maintains a state model for each carrier on the automation track, including destination information, path information, scheduling information where appropriate, etc. Vessel movement manager 70 then assigns a path to reach the next destination to sample carrier 47. Vessel mover manager 70 then facilitates movement of that carrier to the appropriate destination. Upon arrival at that destination, vessel mover manager 70 sends confirmation to the central computing system that the sample has successfully arrived at the destination. This allows a central computing system to determine the next appropriate step in handling that sample.

In embodiments where analyzers maintain movement and scheduling control over the internal path (e.g., the chords that pass through each analyzer between the outer track), the central computing system may determine the next destination for that sample carrier, but the exact timing on when that sample carrier will be released to vessel mover 68 will be determined by each analyzer module. When a sample arrives in an analyzer module, vessel mover manager 70 can hand off control of that sample carrier to the local analyzer module when the carrier is placed into the internal track section of the analyzer module. The analyzer module then manages its own physical queue, allowing it to determine (based on information received from the central computer system) the appropriate schedule of testing and completion of each sample. Upon completion of testing in an analyzer module, the analyzer module will then move the sample carrier back onto the outer track, via the internal track of the analyzer module, and transfer control back to vessel mover manager 70. Once vessel mover manager 70 receives control of the carrier again, it can then request the next destination for that carrier from the central computer system.

As shown in FIG. 8, sample carrier 47 is assigned characteristics by TCS 12, and path information by vessel mover manager 70. In some embodiments, a sample carrier can include onboard addressable memory that can locally store this information and use information to reach its destination. In such embodiments, the sample carrier 47 can communicate this information to each track section processor and to the local analyzer module. The analyzer module can use the characteristics to properly move the sample carrier into position relative to an aspirating pipette to aspirate sample portions for testing. This information can also guide the pipette in interacting with a sample by understanding the height of the tube, width of the tube, orientation of the tube, presence of tube top cups, etc. Path information can be used by processors controlling each local track section to route sample carrier 47 appropriately.

In other embodiments, the characteristics and path assigned to sample carrier 47 are not directly communicated to sample carrier 47 but, rather, are communicated directly, or via the central computing system, to the appropriate processors of the system. For example, characteristics will be communicated to the destination analyzer module. Path information can be used by the vessel mover manager to instruct each local track section on how to handle sample carrier 47, including appropriate accelerations, speeds, branches, etc. Vessel mover manager 70 can thereby act like a traffic manager, instructing various switches and linear motors within the automation system to route sample carrier 47 appropriately.

Sample handler 10 has four main logical components for purposes of understanding the interaction with vessel mover

68. Trays 70 are inserted into drawers 18 to load and unload patient sample tubes. When a tray 72 is inserted into a drawer and the drawer is closed, an encoder on the tray or drawer communicates the motion of tray 72 to DVS 22. This allows the DVS 22 to snap one or more photos as each row of sample tubes is inserted into the drawer. This allows the DVS 22 to maintain a rewritable buffer of images corresponding to each position in the drawer. This allows multiple angles of images of each tube in each row of tray 72. DVS 22 then utilizes this information to determine the physical characteristics of each tube in tray 72. For example, DVS 22 can determine the presence of tube top cups, diameters of each tube, heights of each tube location of each tube in tray 72, locations of empty slots in tray 72, etc. In some embodiments, DVS 22 does not attempt to find and read barcodes on tubes in tray 72. In general, images taken by DVS 22 are taken from above each row of tray 72, allowing top-down views of each tube, as well as oblique views of each tube as photos of adjacent rows are taken.

The DVS may be a modular subsystem, with a fully independent set of electronics for each drawer, including an image sensor to capture images of tube trays as an operator quickly closes the drawer (e.g., at speeds at below 1.0 m/s). Because the drawer may move in an unpredictable manner, the DVS must activate the flash repeatedly over a short period of time. Triggering the flash at an extremely high rate of speed could account for this difficulty; however, it would require the use of a very expensive high-frame-rate camera (i.e., image capture device), and computationally intensive video processing techniques, in order to detect the flashes of light at very high speeds (e.g., 60 Hz). Lower speeds (e.g., 13 Hz) cannot be used, as they may cause migraine headaches and even trigger epileptic seizures. Additional detail about this exemplary feature can be found in simultaneously filed U.S. Provisional Patent Application No. 62/365,295, which is incorporated herein by reference in its entirety.

Accordingly, an embodiment provides a combination of techniques that may be used to illuminate the target for image capture. For example, one embodiment may shield particular lines of sight from the operator using covers. An embodiment may also utilize one or more reflective surfaces (e.g., mirrors) to shield the operator, while also still allowing an observational ability. A further embodiment may attempt to minimize the absolute brightness of the flashing light (e.g., reflective surfaces are covered or painted with a non-reflective matte style finish). Another embodiment minimizes the perceived contrast of the flashing light to any local ambient/background light. In one embodiment, the flashes may be synchronized to specific events that the operator expects to cause optical disturbances.

These characteristics are then communicated to robot 20, allowing the robot to utilize these characteristics to properly engage sample tubes when selecting the sample tubes for placement into sample carrier 47. For example, height and diameter characteristics can be used to adjust the descent height of robot end effectors, the degree to which the end effectors close to engage the sample, and the location of the center of the sample tube, without misalignment damaging the sample tube. Robot 20 interacts with tray 72 by removing and placing sample tubes. Similarly, robot 20 interacts with refrigerated control storage 16 by removing and placing quality control and calibration tubes. Similarly, those tubes taken from, or placed into, control storage 16 tray 72 are placed into, and taken from, sample carrier 47 by robot 20.

FIG. 8 also shows how redundant power may be used to assist in a modular design of the vessel mover 68. Because the automation track is used to move samples between sample handlers 10 and analyzer modules, it is important that the automation track not fail during normal operation. Because the automation track is made up of track segments, the failure of a single track segment may cause the entire automation track to come to a standstill, crippling the ability of analyzers to receive additional samples. Laboratories deal with large volumes of patient samples, and minimizing downtime of an analyzer system is important. One way that failure of track segments can be overcome is by utilizing redundant power systems. This removes the power system of a track segment as a point of failure. As can be seen in the example in FIG. 8, a vessel mover power module 74 provides power to the systems of the vessel mover 68. There can be a plurality of vessel mover power modules 74 that provide power to portions of track segments, groups of track segments, or subsets thereof. In this example, a single vessel mover power module 74 powers the local track segment where the TCS 12 is located. To prevent vessel mover 68 from failing if vessel mover power system 74 fails, vessel mover 68 has the ability to receive power from adjacent sample handler power module 76 in the event of such failure. Sample handler power module 76 provides power to sample handler 10. Sample handler power module 76 can be sized appropriately to have enough overhead current available to power adjacent track sections, at least on a temporary basis, as needed. A power controller within the vessel mover 68 can detect a power failure of the vessel mover power module 74, and automatically switch over to sample handler power module 76 as a power source.

This power controller can alert the central computer system to identify the error to an operator. Because this does not automatically stop the automation system, the current batch of samples can be handled, and a maintenance time can be scheduled to resolve the failure of vessel mover power module 74. In addition, in some embodiments, power module 74 is hot-swappable. For example, a laboratory may have spare power modules that can be swapped in place of power module 74, should failure occur. In the meantime, sample handler power module 76 can provide power between the failure and the completion of the hot swapping process. This can virtually eliminate downtime due to power system failure in the vessel mover 68. Meanwhile, sample handler power module 76 can be built with more expensive, more robust components, while the vessel mover power module 74 can be constructed of cheaper, less robust components because of the ability to redundantly prevent failure.

Furthermore, because there are generally more track segments, and because the overall vessel mover system 68 is expandable and customizable, it is anticipated that there will be many vessel mover power modules 74 in the system. As a result, it may be feasible to reduce the cost of vessel mover power module 74, while preventing downtime due to soft failover of systems.

Similar to the way that vessel mover power module 74 can fail and a local power controller can receive power from sample handler module 76, vessel mover power modules can also provide redundant failover power to adjacent track sections, should the adjacent vessel mover power modules fail. In this manner, as additional track sections are added to a system, power controllers can daisy chain adjacent power modules for redundant failover to prevent downtime of track sections due to power module failure.

Vessel Mover System

The vessel mover subsystem has the responsibilities of receiving a sample or reagent from a source/sink (e.g., sample handler or LAS interface) and presenting it to an analytical module for processing. This generally includes the magnetic track for moving sample carriers, those sample carriers, any reagent carriers (which, in some embodiments, can be sample carriers), control systems for the track, and any interfaces between the track and sample handling modules or analyzer modules. The vessel mover is not commonly accessed by an operator. The vessel mover also presents the vessel back to the source/sink for removal from the system. As used herein, sample handler 10 can be described as a source/sink for samples, calibrators, and controls. In some embodiments, reagents may also be loaded via a sample handler 10, allowing that sample handler to act as a reagent source/sink. The vessel mover contributes to overall system throughput by providing random access of the samples to the connected analytical modules.

The following is a list of exemplary functionalities and responsibilities for the vessel mover system.

Sample Vessel Movement
  handshake with a sample source/sink to accept a sample tube
  identify sample and tube characteristics
  store and make available current sample inventory of vessel mover
  execute routing instructions from planner
  maintain sample pipetting queues for each analytical module
  handshake with analytical module to allow random access pipetting
  handshake with a sample source/sink to off-load a sample tube
Reagent Vessel Movement
  handshake with a reagent source/sink to accept a reagent pack
  handshake with an analytical module to off-load a reagent pack
  handshake with an analytical module to accept a reagent pack
  handshake with a reagent source/sink to off-load a reagent pack In some embodiments, reagents may be loaded automatically into analyzer modules via the track system of the vessel mover system. Reagent packs may be loaded into drawers in an alternate embodiment of a sample handler 10. For example, certain drawers would be designated as reagent drawers, while other drawers are designated sample drawers.

A sample source/sink is a subsystem that has the responsibility of receiving sample tubes from an outside source (e.g., operator or LAS track), and presenting them to the vessel mover or vice versa. In addition to the sample handler 10, in some embodiments, there can be other implementations of the sample source/sink to meet specific customer needs. Some of the variants can be (but are not limited to) subsystems with smaller or larger capacity, higher or lower throughputs, or extended workflow features. In general, sources/sinks conform to the basic interfaces of a sample source/sink, such as sample handler 10. In general, embodiments contain a minimum of one sample source/sink to be considered complete. In some embodiments, up to three sources/sinks can be attached to the vessel mover system. This allows parallel input and output capabilities, increasing the throughput of the overall system.

The following are exemplary functionalities and responsibilities of a source/sink in the analyzer system.
  allow the operator to load samples onto the analyzer system
  allow the operator to unload samples from the analyzer system
  select a sample to be moved to the vessel mover
  handle requests for pre-identified samples to be moved to the vessel mover
  move a sample to the vessel mover
  remove a sample from the vessel mover when requested
  store and make available the current sample inventory
  load samples from LAS into the analyzer system
  unload samples to LAS from the analyzer system As shown in FIG. 4, the vessel mover system includes a plurality of track sections that can be connected to form a single track to transport samples (and in some embodiments, reagents) from a source/sink to various analyzer modules. In some embodiments, this track is made up of stainless steel channels that include guide rails in the walls and a flat floor. Carriers can include a low friction material, such as ultra-high-molecular-weight (UHMW) polyethylene, Teflon, or other suitable materials on the bottom of each carrier. This bottom material allows the carrier to glide along the flat track, guided by guide rails in the walls. Underneath the metal surface of the track, a series of magnetic coils form linear synchronous motors (LSMs). Meanwhile, a plurality of rare earth magnets in each carrier responds to changes in these coils, by moving the carrier synchronously with changes in those coils. Exemplary embodiments utilize appropriately sized LSM coils on a plurality of boards that are produced by MagneMotion, Inc. The basic operation of these linear synchronous motors can be understood with respect to U.S. Pat. No. 8,967,051, assigned to MagneMotion, Inc.

The vessel mover system includes both software and hardware components. In addition to individual track sections and local controllers for those track sections, hardware for the vessel mover system also includes a computer that includes a processor having memory, peripheral circuits, disk drives, network interfaces etc. The vessel mover computer works with the instrument manager in the central computer for the overall analyzer instrument to schedule and facilitate movement of samples. In some embodiments, communication between the central computer and the vessel mover computer occurs over an internal Ethernet/IP backbone. Each module in system 30 is connected via an Ethernet connection, allowing a central computer to communicate with each module, including the vessel mover system as a whole. In some embodiments, the vessel mover computer can be embedded in one of the track section components, such as track section 36 in FIG. 4.

The vessel mover software can receive input from carriers in sample handling robots to maintain a state model of all interactions in the track system. For example, when a sample handling robot places a new sample in the carrier, that carrier or robot can notify the vessel mover software of the new association between the sample and carrier. The vessel mover software can then notify, via the Ethernet connection, the system instrument manager software in the central computer. This allows the central computer for instrument 30 to maintain a state model of all samples in the system, associating the samples with the current module that has control of the samples, as well as a schedule of tasks to be performed on the samples. Once the barcode of a sample is read by the tube characterization station, additional state information about the sample and carrier relationship can be communicated from the tube characterization station to the vessel mover software, allowing an updated state model. This information can also be communicated to the central computer. The state model maintained by the vessel mover and by the central computer can be updated at each point along the process, as samples are moved from an analyzer module, tested, moved to another analyzer module, tested, returned to a sample handling module, and removed from the system.

Each source/sink also interacts with the system instrument manager software in the central computer of the analyzer system. Communicating over an Ethernet connection, each source/sink (e.g., sample handler) identifies when it has received sample trays and any identity information and status information it may have, as samples are removed from the trays, placed into carriers on local track sections, and returned. Furthermore, statistical information about the number of samples handled, the number of samples remaining, etc., can also be maintained by the source/sink and communicated to the system instrument manager. When a sample arrives at each source/sink, a processor for that module can request a unique identifier for each sample from the system instrument manager. Even before the barcode is read, this unique identifier can be used to track that individual sample tube. Once that sample tube has had its barcode read by the tube characterization station, an association between the identity of the sample and a unique identifier for that tube can be made by software in the system instrument manager in the central computer.

Also residing within the central computer is a planning subsystem running in software. This planner is tasked with the primary role of utilizing information about the system and internal business roles to select individual analytical modules within the system, and identify those that will perform each test on each sample within the work order for that sample. With this information, the planner will instruct the vessel mover to move a sample to the sample queue for that particular analytical module. When that analytical module is finished aspirating from the sample, the vessel mover will then request the next destination for that sample upon being released by that analytical module. That destination, coming from the planner of the central computer, can be another analytical module (if more tests need to be performed), or a sample source/sink, which allows that sample to be removed from the vessel mover. In some embodiments, the vessel mover software and planner reside on different processors, and information is exchanged via the network within the instrument. In some embodiments, the vessel mover software and planner operate on a single processor, allowing communication to take place via inter-processor communication or memory.

The work order for an individual sample is received by the central processor from an LIS. The LIS can maintain a database of all work orders for all samples that are to be processed in a laboratory that day. The planner software component can associate those work orders received from the LIS with individual samples at the beginning of a shift or on-demand. When the vessel mover identifies the specific identity of the patient sample on the automation track, the vessel mover software communicates with the planner to identify a schedule of tasks and destinations for that sample. That sample's identity is compared to the work order, to identify the appropriate work order and order of tasks to be performed on that sample. The planner software module then reviews the status of each analytical module in the system to identify the appropriate analytical module to receive that sample and perform each test of the work order. Where multiple analytical modules can perform the same test, scheduling logic in the planner software can load-balance these analytical modules to ensure maximum throughput, while minimizing latency of individual queues for individual analyzer modules.

Once a schedule of destinations for these tests has been calculated by the planner module, a basic path of the order of destinations can be sent to the vessel mover. The vessel mover then operates under its local control to move each sample to each analyzer module, informing the planner each time the sample reaches its destination. The planning module can then maintain a state model of each sample and for the system. In some embodiments, the vessel mover only maintains a model of the next destination for each sample. Thus, once a sample is delivered to each analyzer module, the planner module is notified. Control of that sample is handed off to the local analyzer module. The local analyzer controls its local track section as a random-access queue. Once that local analyzer module has completed testing on the sample, that analyzer module can communicate the change in status to the vessel mover or to the central computer planner module. Control can be handed off to the vessel mover. The local analyzer then moves the sample out of the local track section onto a portion of the track section accessible to the vessel. The vessel mover then moves the sample carrier onto the outer track section when traffic allows. The vessel mover then communicates with the planner module to identify the next destination for that carrier. Upon receiving that destination from the planner module, the vessel mover then maintains low-level control of that carrier and directs the traffic, accordingly, until that carrier reaches that destination, upon which the central planner module is notified and control is handed off to the appropriate local module.

Once all tests are complete on a sample for the local analytical modules, the planner module notifies the vessel mover to move that carrier to an output queue for the appropriate source/sink. The vessel mover receives the destination command and moves that sample carrier to the physical location of any queue for the source/sink (e.g., sample handler 10), and notifies the planner module to confirm that control is been handed off to the designated source/sink.

The planner module of the central controller also communicates with the sample source/sink modules. This allows the planner module to understand when samples are received, when they are moved onto a local carrier and handed off to the vessel mover, received from the vessel mover, and placed into an output slot or storage slot within the source/sink module. This allows a software association between each slot, and the identity of the sample makes it easier for performing additional subsequent tests on that sample because its storage location is known.

As explained above, the vessel mover and sample source/sink modules interact with each other at a point where a local track section is accessible to the robot arm of the source/sink (e.g., track section 14, where sample carrier 47 is shown). The vessel mover is responsible for moving a carrier at a predetermined location accessible to the robot arm, while the robot arm is responsible for successfully interacting with the carrier placed in the right location. This ensures proper hand off of sample between the source/sink and the vessel mover modules.

In some embodiments, the vessel mover and analytical modules interact with each other at two general groups of points. The first set of points is where the individual sample tubes are presented by the vessel mover to the analytical module for interaction. In some embodiments, this location is synonymous with the location of carriers 52 and 56. In some embodiments, the vessel mover module maintains low-level control of the individual track section chords that serve as the queues for each analytical module. The vessel mover operates these sections at the request of each analytical module to act as a random-access queue. In this manner, each analytical module's processor only needs to have a queue model for samples that it can access, while the individual steps required to move each sample into position at the head of each queue, or at the access point for each queue, are carried out by the controller for the vessel mover. This allows vessel mover software to have expertise in moving samples using the magnetic track, while software in the analytical modules can be specialized for testing, with a basic model of how samples are moved in a physical buffer.

In some embodiments, the second group of points where the vessel mover interacts with each analytical module is at the location of a reagent carrier 64 in FIG. 6. In these embodiments, a carrier can present reagent packs at a given location on the outer track, allowing the vessel mover to bring reagents to each analytical module.

Analytical modules and the vessel mover coordinate their activities for moving and accessing sample tubes in such a way that the system provides random access for each of the samples in a shared queue. By maintaining random access, the analytical modules may utilize their own internal scheduling algorithms to maintain a higher nominal throughput and, thus, improve the overall time efficiency.

In some embodiments, each analytical module can maintain a logical queue in software of all the samples for which that local analyzer module can access after some set time. For example, in the example shown in FIG. 6, IA analyzer module 32 can maintain a logical queue that includes samples other than just samples 53. For example, samples 60, 62, and 51 can be part of the random-access queue maintained in software in analyzer module 32. By requesting each sample one cycle (or more) before it is needed, the vessel mover can supply any sample that it can access in a just-in-time manner, such that samples in a logical queue need not be in the physical queue of the inner chord of analyzer module 32. In some embodiments, the vessel mover can operate track sections quickly enough that the logical queue for the analyzer module 32 can also include samples 54 and 56. That is, so long as there is no scheduling conflict between analyzer module 34 and analyzer module 32, the vessel mover can present the appropriate sample to analyzer module 32 on an as-needed basis, greatly expanding the logical size of the available queue for each analyzer module. Additional examples of how logical queues can be used instead of traditional physical queues in certain embodiments can be understood with respect to U.S. Patent Application Publication No. 2015/0118756.

Figure 9:
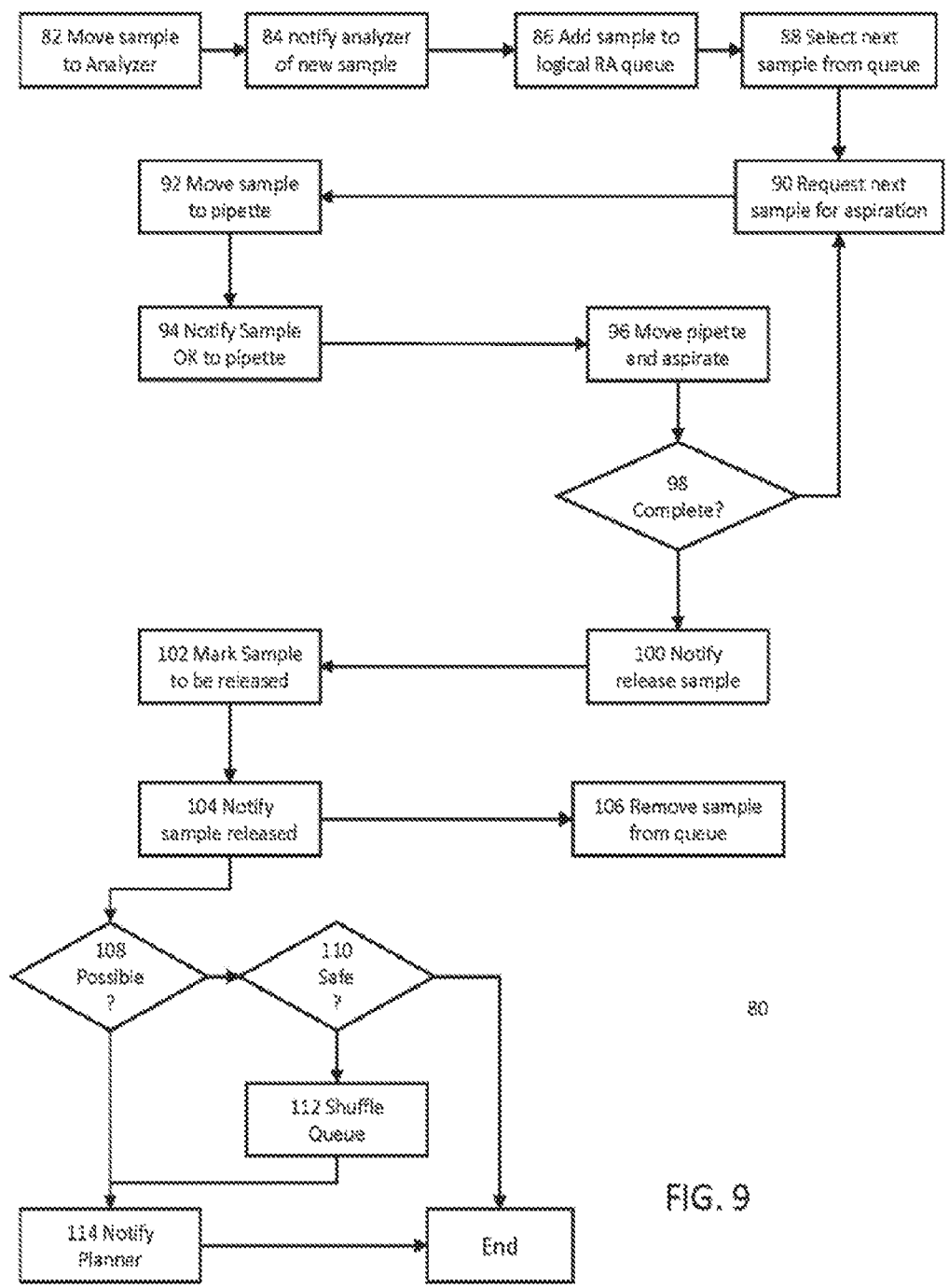
FIG. 9 is a flow chart showing an exemplary interaction between the vessel mover and analyzer module.

FIG. 9 shows the exemplary software flow 80 for handing off samples between the vessel mover system and a local analyzer module in an exemplary embodiment, whereby a local analyzer module maintains a logical queue of samples in software, but relies on the vessel mover system to do the actual positioning of sample tubes in carriers on tracks, including the local internal track to that analyzer module. Thus, the vessel mover system will be responsible for physically moving a patient sample into position for interaction with the pipette used by the local analyzer to perform sample aspiration. At step 82, the vessel mover system moves a sample having a known sample ID into position at the analyzer module. At step 84, the vessel mover controller notifies the local analyzer that there is a new sample available for the queue for that analyzer. At step 86, the local analyzer adds that sample ID to a logical construct for the random-access queue. At step 88, the local analyzer module selects the next sample within its logical queue to perform an aspiration. This next sample may be any sample within the random-access queue, including the sample that just arrived. This step is done using a local scheduling algorithm containing software instructions executed by a processor local to the analyzer module. This allows the local analyzer module to have autonomy in managing its local queue.

At step 90, the local analyzer module processor requests the next sample for aspiration based on the selection and step 88. The local analyzer module then communicates the sample ID being requested to the vessel mover. At step 92, the vessel mover uses the local track segment to move the requested sample into position at the pipette station of the local analyzer module. Once this step is completed, at step 94 the vessel mover notifies the local analyzer module that its request has been filled, and the sample is ready for aspiration. At step 96, the local analyzer module moves the sample aspiration pipette into position to aspirate a sample from the requested sample tube. At step 98, an aspiration is performed by the pipette and it is determined by the processor in the local analyzer module whether sufficient volume has been aspirated from the sample, or whether it must request the sample again (e.g., such as requiring the sample to stay for an additional aspiration cycle). For example, if it is determined that additional volumes of a sample fluid may be needed immediately, or in the near future, that sample can be maintained in the logical queue for that analyzer module, but the sample may not be immediately needed at the location of the pipette, freeing up the pipette to interact with additional samples.

At step 100, if sufficient volume has been aspirated, the local analyzer module controller will notify the vessel mover system that the sample can be released from the queue. Upon receiving notice of the release, the vessel mover system can note that the sample has been released from the logical queue by updating its status and memory at step 102. At step 104, additional modules within the analyzer system can be notified that the sample is ready to be released. For example, at step 106, the vessel mover can notify the analyzer module that it received the request and the sample should be released from the logical queue. Upon receiving this notification, the local analyzer module completes the release of that patient sample from its logical queue, removing it from the memory structure representing a queue of samples. At step 108, the vessel mover determines whether it is physically feasible to remove the sample from the physical queue on the local track segment. For example, in a system operating in a counterclockwise traffic pattern, if the sample being released is not the counterclockwise-most sample on the local track segment, releasing that sample would require flushing any intervening samples onto the main track to cycle back around the vessel mover system to be placed back into the local queue at the tail of the physical queue. In some embodiments, even though the main track loop operates in a counterclockwise manner, the local track segment may be capable of moving the clockwise-most sample onto the main track loop if there is sufficient free space on the main track loop. This is similar to the way one might back a car out of the driveway onto a road before traveling forward on that road.

If it is not physically feasible to immediately remove the sample from the local queue, at step 110, the vessel mover determines whether or not it can safely shuffle the local track segment physical queue, such that any sample carriers between the carrier having the sample to be released and the exit track segment will be flushed onto the main track so that the released sample can exit. This decision can be based on local traffic status, such as whether there is sufficient time to release a sample onto the main track segments, or whether doing so would require flushing nearby samples from the physical queue that will be needed within too short a time to facilitate the flush. If a local queue flush procedure is feasible, at step 112, the vessel mover moves the appropriate intervening samples onto the main track segment, as well as the sample to be released. Those intervening samples will then travel around the main track loop and be returned to the tail of the physical queue in the local analyzer module. The released sample will then be able to move to its next destination. Once the sample is released, at step 114 the planner module within the central computing system of the analyzer system is notified by the vessel mover that it is ready to move to its next destination. The planner module will then interact with the vessel mover to determine the next destination, and physically move that sample to that destination.

Software Interfaces

In addition to the concepts discussed above, software parameters can be used to store data about the status of samples, carriers, and systems within an analyzer system. These parameters may also be used to communicate information about states of these objects. The following are some examples of data can be stored and passed between software modules during operation of an analyzer system in accordance with some embodiments.

The following is an exemplary message, whereby the vessel mover tells an analyzer module that a new sample as being made available to the local random-access sample queue. Such a message includes the following information:

Sample ID: This is an identifier that uniquely identifies the samples within the analyzer system. This parameter is the link to the work order, or test, to be pipetted.

Primary/Secondary Tube Flag: This parameter identifies to the analyzer module whether the sample is a primary tube (e.g., it contains red blood cells (RBCs)) or a secondary tube (e.g., contains no RBCs), used with blood samples.

Tube Type: This parameter identifies to the analyzer module which classification of supported tube is associated with the sample.

Tube Top Sample Cup Flag: This parameter identifies to the analyzer module whether the sample tube is carrying a supported tube top cup on the sample tube.

The analyzer module may communicate a request to the vessel mover for the next sample to be placed at the physical location of the analyzer module's pipette. It can contain the sample ID as an argument.

Another vessel mover-to-analyzer message is a "notify sample okay" message, whereby the vessel mover instructs the analyzer module that the sample is in position to be pipetted. In some embodiments, an analyzer module may access multiple pipetting positions. Accordingly, in those embodiments, the sample ID and an ID of the position at which that sample has been placed are passed as arguments in the "notify sample okay" message.

When an analyzer module has finished processing a sample, the analyzer module may send a "notify release sample from the queue" message to the vessel mover. This message indicates that the sample is no longer needed by that analyzer module. It includes the sample ID as a parameter.

Similarly, when the vessel mover has successfully released the requested sample from the local queue of the analyzer module, the vessel mover may respond with a "notify sample is released" message containing the sample ID. It should be noted that the preceding messages are illustrated with respect to the software flow in FIG. 9.

Refrigerated Storage

Refrigerated storage for controls and calibrators provides long-term storage of multiple days for controls and calibrators in sample tubes. This is accomplished by providing a refrigerated humidity/evaporator controlled environment in the refrigerated storage in the sample handler module. In some embodiments, by providing an enclosed refrigerated environment with evaporation covers for each tube, controls and calibrators can be stored without substantial degradation or evaporative loss for at least 14 days.

Figure 10A:
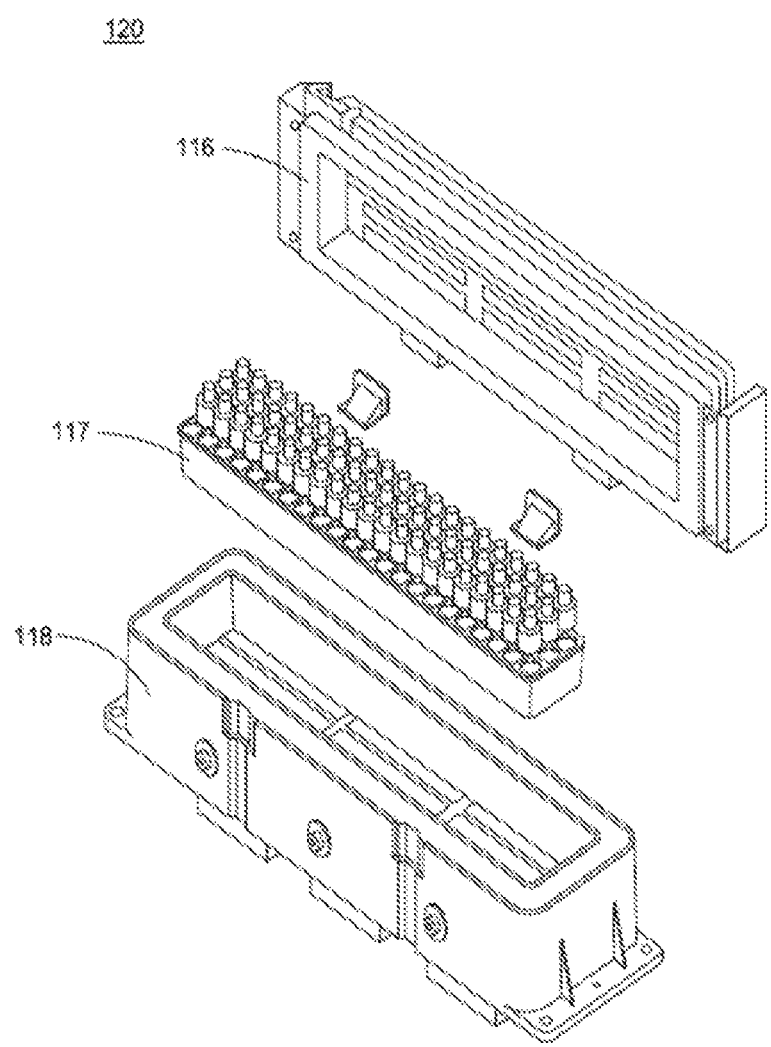
FIG. 10A is a perspective view of an exemplary cooling system for use with some embodiments.

FIG. 10A is an exploded perspective view of an exemplary control storage module 120. The primary components of control storage module 120 are tube access door assembly 116, which covers tube and evaporation cover base assembly 117, which is contained in the base assembly 118, which forms a cold chamber. Tube access door assembly 116 provides a sealed door to contain control and calibrator tubes. Tube and evaporation cover base assembly 117 includes a stainless baseplate having a plurality of recesses to receive control and calibrator tubes and provide a thermal sink to chill these tubes. In addition, individual evaporation covers that are sized to engage the tube base assembly are placed above each tube. These covers are sized so as not to make direct contact with the tubes to avoid cross contamination. Base assembly 118 of the cold chamber includes a housing having insulated walls and mounting positions for thermoelectric coolers (TECs) that are in thermal contact with the stainless base of base assembly 117.

Figure 10B:
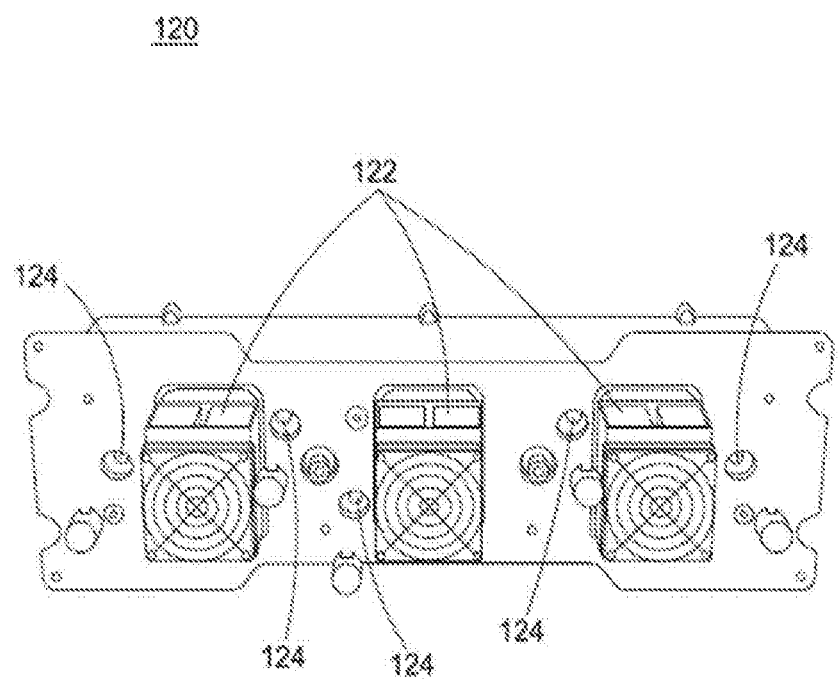
FIG. 10B is a perspective view of an exemplary cooling system for use with some embodiments.
Figure 10C:
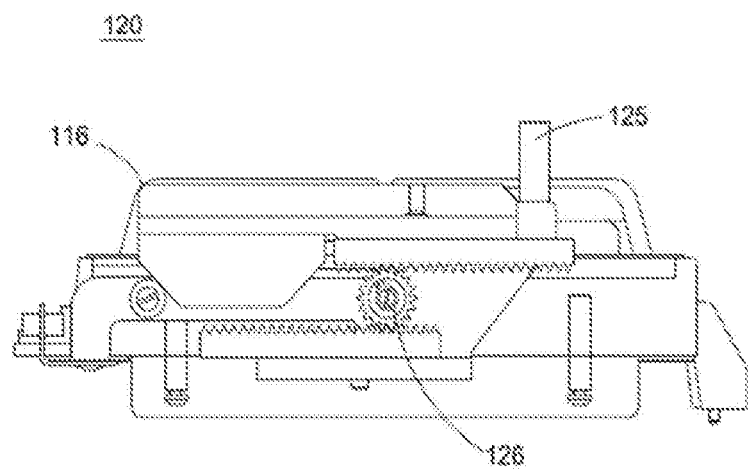
FIG. 10C is a side view of a door assembly of an exemplary cooling system for use with some embodiments.

FIG. 10B shows an exemplary cooling module 120 for use with exemplary control storage modules. In this embodiment, three thermoelectric devices (TEDs) are responsible for cooling refrigerated storage used for storing control and calibrators. Each thermoelectric device is an assembly comprising a thermal pad, one or more Peltier modules, heatsink fins, and a fan to remove heat from the fins. Modules comprising each TED and heatsink hardware are identified as TED module 122 in FIG. 10B. Cooling occurs due to the Peltier effect, which works by passing electric charge through a junction of two different conductors, creating a hot side and a cold side. The cooled surface is thermally connected by pinching a graphite thermal pad between a TED cold surface and a cold plate mounting surface. The hot side is connected to a series of fins, which allow air to be blown and remove heat. The series of thermistors 124 can be placed throughout the bottom of the cold plate. For example, three can be mounted directly to the mounting blocks for the TEDs, and two additional thermistors can be located near the ends of the system for additional measurement capability. A control module can then utilize the thermal input from each thermistor 124 to provide control to activate TEDs 122. Various thermal tuning approaches as known in the art can be applied. In some embodiments, a potential integral differential (PID) controller is used to control each TED 122. In some embodiments, a local averaging of thermistor values can be used to provide individual control to each individual TED. In some embodiments, an average of all thermistors can be used to control all TEDs in unison. Other exemplary control approaches include using a proportional controller, a proportional integral controller, and a simple threshold thermocouple approach.

In an exemplary embodiment, proportional integral (PI) tuning is used. Integral PI controllers are commonly used for temperature control, especially on systems with a large time constraint. The method used to tune the coefficients for the control storage module in this example, the Ultimate Sensitivity Method, developed by John G. Ziegler and Nathaniel B. Nichols. The following explains exemplary steps in the method. The first step is to set kI=0. kI is the integral coefficient of the controller. Start off with a small kP, and wait until the response stabilizes. kP is the proportional coefficient of the controller. The set-point is changed by a small amount, until the response starts to oscillate. If there is no oscillation in the response, increase kP by a factor of two and repeat. This method continues until oscillation is seen in the response signal. During this step of the tuning process in an exemplary refrigerated control storage module, values of kP=300, 400, and 350 were used in that order. 350 was found to be the proper gain Ku, resulting in a period of oscillation in temperature of 93 seconds. This results in the following equations for use with a PI controller: kP=350/2.2=160; kI=1.55/1.2=1.3 (93 seconds=1.55 minutes). The last step of the method is to test and confirm.

Operating the control storage tuning process with kP=160, kI=1.3 and kD=0 in an exemplary embodiment resulted in cooling at 0.427° C./min. starting an ambient temperature of 17° C. With three TEDs turned fully on and direct-current of 8.5 A, the module remains stable after reaching steady-state and under PI control. While starting with the module at an ambient temperature of 17° C., an exemplary control storage module reached steady state in 34.5 minutes. Steady state can be defined as maintaining temperature within 1% of the set-point temperature of 4° C. In an exemplary embodiment, the undershoot was 0.25° C. (6.25%), and the settling time to reach steady state after crossing the set-point was 6.5 minutes. With a cooling rate of 0.427° C./minute and a settling time of 6.5 minutes, the calculated time it would take for the module to reach the set-point of 4° C. would be (30° C.-4° C.)/(0.427° C./minute)+6.5 minutes=67.3 minutes. In an exemplary embodiment, 30° C. is the maximum ambient temperature for the operating range of the system. Using the same formula, the cooling time would be 79 minutes for an ambient temperature of 35° C. In an exemplary embodiment, 35° C. is the estimated maximum temperature underneath the covers of the sample handler module, which contains the refrigerated control storage module.

In some embodiments, the tube access door assembly 116 comprises two doors that open in a sliding fashion. In some embodiments, one or more motors may provide the actuation of the doors. Some embodiments, such as that shown in cross-sectional view 10C, provide passive mechanisms that allow the sample handling robot 20 to provide the actuation of the doors. Tube access door assembly 116 includes two doors. One of these doors includes pin 125. Pin 125 is mechanically coupled in a rigid fashion to one of the doors, and is configured to engage the gantry assembly of robot arm 20. This allows the robot arm 20 to move into position to engage pin 125, and move that pin into an open or closed position. Rack and pinion 126 allows the engagement of pin 125 to cause the two doors to move in opposite directions, providing an opening or closing motion by engagement of pin 125 by robot arm 20.

Figure 10D:
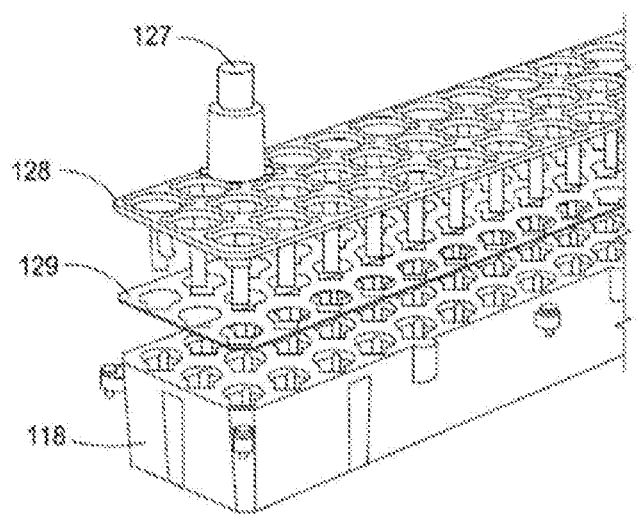
FIG. 10D is a perspective view of a tube and cover assembly of an exemplary cooling system for use with some embodiments.

FIG. 10D is an exploded perspective view of tube and base assembly 118. Evaporation covers 127 are configured to rest in recesses of top plate 128. Top plate 128 can be a plastic array of openings that provides a protective top sheet to base assembly 118. The openings are sized to accept evaporation covers 127. Beneath top plate 128, stainless steel strike plate 129 includes an array of holes that are sized smaller than those of top plate 128. Evaporation covers 127 will rest on the ledge created due to the differences in sizes of these openings. In some embodiments, evaporation covers 127 are made out of a plastic material, but include one or more magnets at the base of the cover to provide a magnetic force between evaporation covers 127 and strike plate 129. This allows covers 127 to be securely mated to strike plate 129. Robot arm 20 can access control calibrators stored in base assembly 118 by using end effectors to remove each evaporation cover 127, placing that cover on a nearby shelf, and then engaging the tube underneath using the end effectors for removal.

Base assembly 118 includes a plurality of recesses sized to accept control and calibrator tubes. In some embodiments, these recesses include two vertical walls forming a "v" and, opposite that "v," a leaf spring that provides a holding force. By using a "v" and the spring, tubes stored in these recesses can be held upright in a repeatable position for more accurate engagement by the robot arm.

Sample Handler Robot Subsystem

An exemplary sample handler robot that may be used with sample handler modules includes the robot gantry having a Cartesian robot, with three axes orthogonal to one another. The gantry is set up with four linear, brushless DC motors. Two motors are used for the gantry Y-axis, one for the X-axis and one for the Z-axis. Linear motors include a magnetic rod, a forcer, and a ball bearing slide, all mounted to a frame. Coils reside in the forcer, which is guided by the slide and moves along the magnetic rod. An exemplary gantry configuration is shown in FIG. 11.

Robot arm 130 includes two parallel Y-axis linear motors 132 having 900 mm of travel. By having parallel Y-axis linear motors, X-axis linear motor 134 has a stable platform that allows the entire X-axis linear motor 134 to travel orthogonally to the Y-axis linear motors. X-axis linear motor 134 has approximately 660 mm of travel in this embodiment. Riding along X-axis motor 134 is an assembly including the Z-axis linear motor 136, which has 150 mm of vertical travel. Signals and power can be provided by cable chain carriers 137, preventing cables from tangling as robot arm 130 moves around. X and Y-axis linear motors 132 and 134 form a gantry to position Z-axis motor 136 directly above a sample tube or carrier. At the lowest point of robot arm 130, end effectors 139 provide jaws that can open and close to grab sample tubes or other objects. Once robot arm 130 is positioned above a sample tube, Z-axis motor 136 descends to the tube, while and effectors 139 open and close to capture the tube.

In some embodiments, the four gantry motors are controlled by three Copley Accelnet controllers/amplifiers. Two Y-axis motors are used in order to distribute the load of the X-axis, Z-axis, and robot end effectors. Since the two Y-axis motors always move together, they are controlled by a single Accelnet controller/amplifier to ensure synchronicity.

The end effectors of the robot gantry subsystem can be referred to as a gripper. The primary purpose of the robot gripper is to grab, hold during transport, and release transportable items. Transportable items include sample tubes, control/calibrator vials, and control storage evaporation covers. The gripper may also be able to handle open tubes, tubes with caps, and tubes with flanges. It also may be able to transport test tubes with tube top sample cups (TTSCs), in some embodiments. The robot gripper can include a crush/crash sensor, a stepper motor with encoder feedback, a mechanism for converting rotary motion to linear motion, and gripper fingers.

In some embodiments, all transportable items can be gripped with the same amount of force. Each tube can also be designated to have the same grip location. In such embodiments, the exact height is determined by the height of the shortest tube that system is required to support. In some embodiments, the gripper is designed to grip at an offset from the top of the tube. An estimate of the top of the tube can be garnered via the DVS, or by mechanical register in the end effectors. A stepper motor drives gripper fingers to open and close through a motion conversion mechanism.

In some embodiments the gripper is attached to the robot gantry through the crush/crash sensor. This sensor provides the ability to sense when the end effector has collided with an object in either the vertical (Z) direction or lateral (X, Y) directions. The two sensors are connected as separate inputs to the motor amplifiers. The amplifiers are configured such that when the inputs are activated, a flag is set and the motors will abort motion with a pre-specified set of motion parameters. The motor can return to operation only after the flag has been cleared. This can aid in preventing spillage of sample contents in the sample handler.

Exemplary crush and crash sensors can include additional features to avoid malfunction of the sample handler. The crush function of the gripper allows for some compliance, as well as tube bottoming confirmation and placing tubes into sample I/O, control and calibrator storage, and carriers in the track system. During this operation, a signal from an interrupter pin traveling through an optical sensor can signal to the system that a tube has reached the desired height. The travel distance of approximately 0.7 mm is required to trip the sensor, in some embodiments. The sensor also works to detect when the object being transported hits a target unexpectedly, as in the case of putting a tube onto another tube. The sensor has additional travel to allow the robot to come to a stop carefully, without damaging or breaking the tube.

The crash functionality deals with the tilt of the robot end effector. Tilt can be caused by side loads applied from hitting an object not intended during travel. Examples include hitting the leading edge of a sample carrier tube slot. This compliance allows the robot to come to a stop and prevent damage/dropping the transported object.

In some embodiments, end effector gripper fingers include a rubber portion, such as an O-ring, that allows some compliance and cushioning as the fingers grab a sample tube. In some embodiments, the bottom geometry performing the holding of a tube is designed to be bound between the top of a tray and the bottom of a cap for the smallest expected tube size, such as a 65 mm tube. In some embodiments, this allows approximately 15 mm of vertical play in which the end effectors are to make contact with the smallest available capped tube.

In some embodiments, four motors are used, but only three controller/amplifiers are used. The Y-axis utilizes two motors to distribute the load of the X-axis, Z-axis, and robot end effector. Both of these motors are controlled by a single controller/amplifier. In order to do this, the amplifier outputs are connected to both motors, and the motor feedback connections are tied together. However, the amplifier and the software can be unaware that there are two motors. This allows for easy control since the Y-axis can be treated the same as any other axis. Since the two motors of the Y-axis are mechanically tied together, controlling them separately can be very difficult. One solution is to use two separate controller/amplifiers, one for each motor. However, because two control algorithms can be running to control the position of a single mechanical load, without near perfect synchronization, the two algorithms would likely be constantly fighting each other.

In some embodiments, the gantry robot subsystem uses controllers in servo position mode and in position mode, the overall control algorithm is composed of three nested control loops. These include a position loop, velocity loop, and current loop. The algorithm utilizes two feedback signals. These are the position feedback from the motor and the electrical current feedback from the amplifier. The velocity feedback used for the velocity loop is the derivative of the position signal.

In some embodiments, robot gripper control is operated in servo mode. In servo mode, the control algorithm runs the stepper as a true closed loop servo motor with encoder feedback. Controlling the gripper in this way provides the ability to control the amount of force the gripper applies to items while they are being grasped. In this mode, the gripper is controlled in the same way, with the same control algorithms as the motors in the robot gantry.

In some embodiments, when grabbing a transportable item, the gripper does not know the diameter of the item. Because of this, the gripper is commanded to move to its "completely closed" position on every grip attempt. In order to be sure the gripper stops its closing motion when it encounters an item, the "peak current" and "continuous current" parameters in the controller/amplifier are used. The motor output current correlates to the force output at the ends of the gripper fingers. When the grippers are closing and they encounter an item, they will grasp that item with a specific amount of force that correlates to the continuous current value set in the controller/amplifier. This means that, while there is an item in the gripper, the motor has not reached its destination position. Because the motor is servoing, it will continue to try to get to its minimum position. Because there is an item in the way and the motor cannot move, it will continue to grasp the object it is holding with a specific force value correlated with the continuous current value in the amplifier. In other embodiments, the gripper may have a model for the diameter of the item it is picking up based on the results of the DVS or TCS. This can mitigate the need for force feedback in the motor control.

Figure 12:
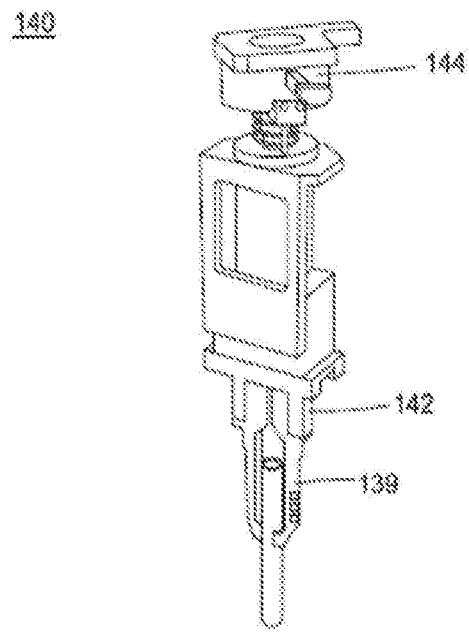
FIG. 12 is a perspective view of an exemplary robot arm end effector assembly for use with exemplary embodiments of the sample handler.

FIG. 12 shows an end effector assembly 140 that includes end effectors 139. End effector assembly 140 travels vertically at the control of the Z-axis motor 136. End effectors 139 are actuated via actuators 142. Actuators 142 can be servomotor actuators that allow the end effectors to open and close, and provide a feedback signal as to the state of these end effectors. This feedback signal can be used to determine if a problem is encountered when engaging a tube. At the top of end effector assembly 140 is a compliance sensor 144. Compliance sensor 144 provides a sensory feedback signal as to the crush and tilt status of the end effector assembly.

Figure 13:
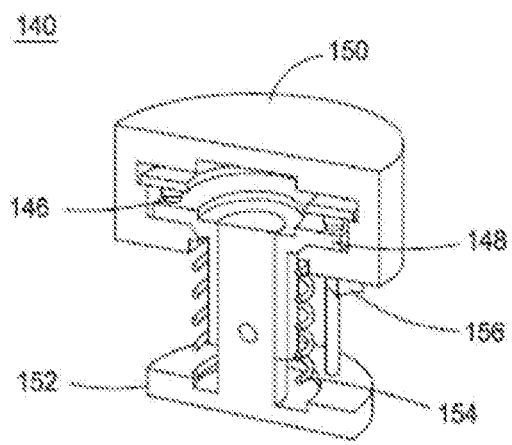
FIG. 13 is a perspective view of an exemplary robot arm sensor assembly for use with exemplary embodiments of the sample handler.

FIG. 13 provides additional details about compliance sensor 144. This cross-sectional view of compliance sensor 144 illustrates an exemplary mechanism for detecting tilt and crush status of end effector assembly 140. The tilt of end effector assembly 140 can be determined using a tilt tactile sensor PCB 146. A plurality of tactile pressure sensors or optical sensors arranged in a ring can detect any asymmetric movement of compliance piston 148 relative to compliance sensor housing 150. Any asymmetric movement relative to the ring of tactile sensors in tactile sensor PCB 146 will indicate that the end effector assembly 140 is being pushed off axis and tilting.

Compliance piston 148 is concentrically engaged with crush plunger 152. This engagement can include an axial sliding relationship, allowing crush plunger 150 to slide in and out of compliance piston 148. Meanwhile, off axis forces applied to crush plunger 152 can affect the tilt of compliance piston 148. Crush sensor 152 receives a downward force from crush spring 154 that pushes crush plunger 152 away from compliance sensor housing 150. As vertical forces are applied to end effectors 139, such as when the end effectors encounter an unexpected object during a vertical motion, crush plunger 152 will compress spring 154 and move relative to compliance sensor housing 150. Hence, any motion of the crush plunger relative to housing 150 will indicate that a crush situation is occurring. The distance that crush plunger 152 moves, relative to housing 150, is proportional to the force of the crush, as governed by Hooke's law with respect to spring 154. An optical sensor 156 coupled to housing 150 can detect the relative distance or motion of crush plunger 152 relative to the housing. Distance can be determined in any conventional way, including time of flight reflections, an optical measurement, or by observing the relative motion of an encoded rod that moves with crush plunger 152 into housing 150. In some embodiments, the mechanical encoder can be used in place of optical sensor 156. An electrical signal can be provided by optical sensor 156 to indicate the amount of crush force being experienced.

Meanwhile, if there is a lateral component to the crush force, the concentric engagement between crush plunger 152 and compliance piston 148 will cause compliance piston 148 to move, relative to the central axis, causing it to tilt. Tactile sensors 146 can then detect this tilting event. The electrical signals from tactile sensor PCB 146 and optical sensor 156 can be provided to a processor that controls the motors in robot arm 130.

Vessel Mover Architecture

In some embodiments, the VM track uses distributed power sources. Each track section is associated with an analyzer module or a sample handler module. Standalone track sections placed between these modules can be associated with either of the modules. Each track section is powered by the module to which it is physically resident, as well as one adjacent module. In some embodiments, determining which adjacent module to draw redundant power from utilizes the following convention. Looking at the boundary between analyzer modules and sample handler modules (e.g., track section 36), the adjacent module that provides redundant power is always the module nearest that boundary. Each track section is powered by the current module and the module prior. Here, "prior" is described as the module closer to the SH/analyzer module boundary. The U-shaped track around an analytical module is powered through the power source of that analyzer. As a backup, the U-shape is connected to the previous analyzer power source. The controller module at each power source can identify a local power failure and automatically switch over to the adjacent redundant power source. For example, if the current analytical module needs to be taken off line for service, or is down due to an internal failure, then the power controller for each track section will switch the power source for the track to the power source provided by the previous/adjacent instrument. This way, the track operations can continue even if one of the power sources is down. In some embodiments, the power system module for each U-shaped track is located proximate to the straight track section at the back of the instrument. The power is distributed to the linear motor in the front of the analyzer from the power controller. A power cable can be routed through the analytical module itself to that front track section. In some embodiments, each track section works with 24 VDC, which provides sufficient power to each carrier to allow it to reach a maximum speed on straight track sections of 6 m/s.

In some embodiments, track sections are divided up into a number of coil boards. A coil board includes a linear array of coils that can be mounted underneath the metallic (non-ferromagnetic) surface of the track. For straight sections of track, each coil board is straight, while, in corners or curves, coil boards include appropriately laid out coils to match the curve. All coil boards are controlled by master boards and node controllers. In some embodiments, each master board can control up to eight different coil boards. Meanwhile, a node controller is centralized. A single node controller can control the entire vessel mover track. In some embodiments, multiple distributed node controllers can be used for expandability. For example, in larger systems, where the track extends for several meters, multiple node controllers may be used, and control of carriers can be handed off as they traverse different regions of the track network.

Vessel mover manager software can reside on the host PC that communicates with the node controller for the physical track through a network switch. In some embodiments, multiple node controllers can be used for redundant failover, with a single node controller handling normal duty, while a second alternate node controller is prepared to take over should the primary node controller fail. In some embodiments, the primary and secondary node controllers can have the exact same software operation and design, but different IP addresses, allowing seamless failover. Each node controller is connected to the master boards through network switches within the analyzer system. In some embodiments, there are two layers of network switches. A top level Ethernet switch is part of the central utility center for the PCM system. This can be connected to a series of gigabit Ethernet switches in daisy chained fashion. Each of these switches can serve double duty as the power controller for each module, providing both network switching and failover power control. In this arrangement, each gigabit switch is connected to each switch in the adjacent modules. While this daisy-chained arrangement may result in broken communications should a network switch fail, these switches can be designed to be hot-swappable for easy resolution. Moreover, the expected failure rate of these network switches is much lower than that of the power systems of each module. The linear motors that make up the track can communicate with each local master board via these gigabit switches.

Figure 14:
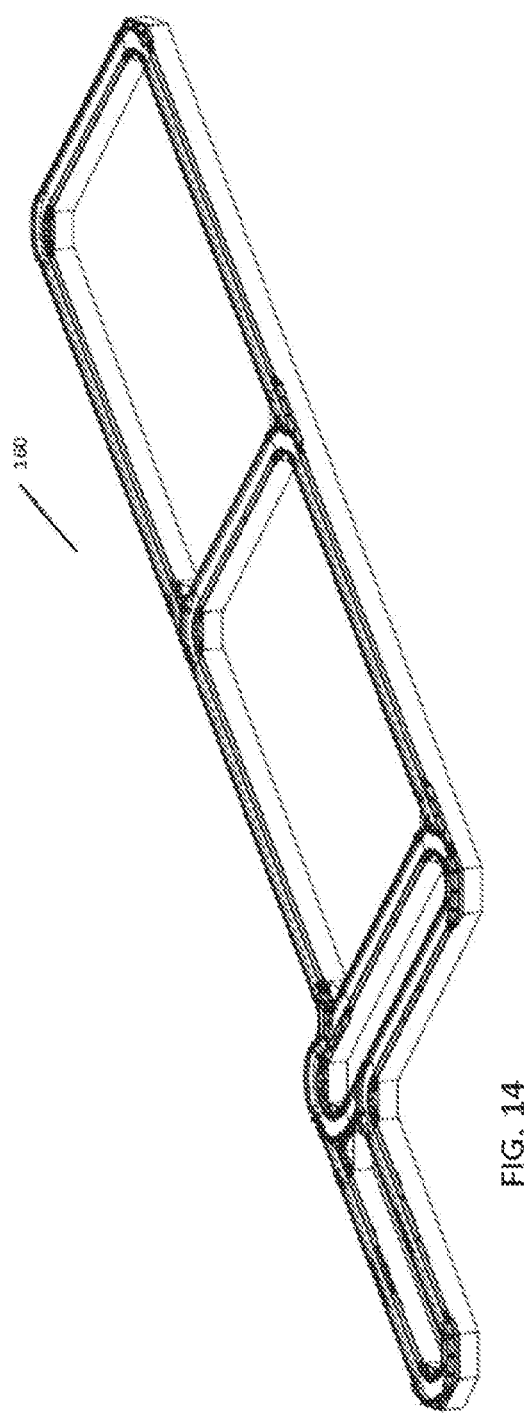
FIG. 14 is a perspective view of an exemplary automation track system for use with some embodiments.
Figure 15:
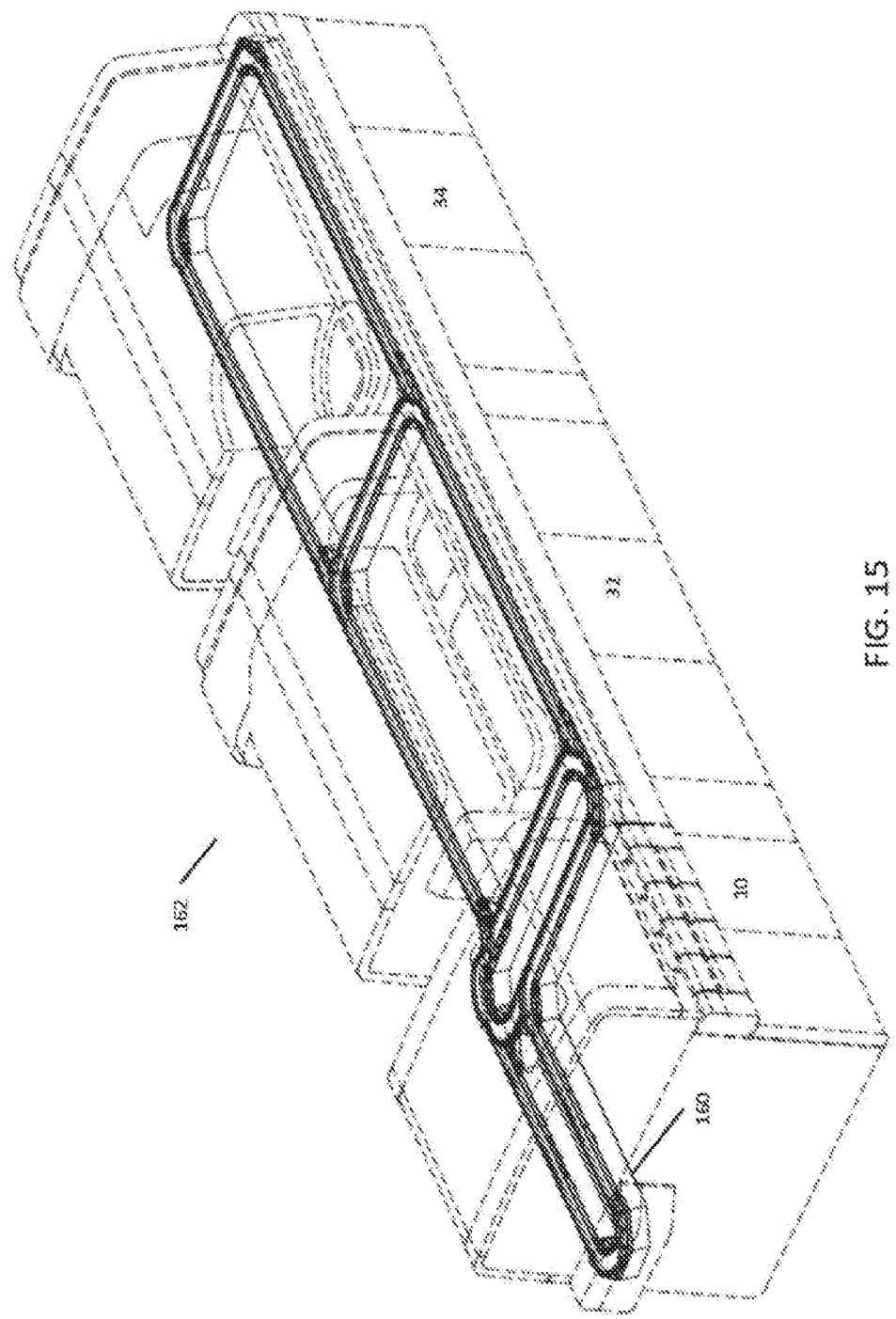
FIG. 15 is a perspective view of an exemplary automation track system for use with some embodiments.

FIG. 14 shows a perspective view of track system 160. Track system 160 is configured to have a single sample handler unit and two analyzer modules. FIG. 15 shows track system 160 situated in a fully operational analyzer system 162 that includes a sample handler module 10 and two analyzer modules of 32 and 34. As can be seen, track system 160 is housed within the modules themselves, such that the track is not easily accessible to an operator. However, track 160 and analyzer system 162 utilize a modular design whereby track components reside within each module and each module can easily be linked together to join the track segments by placing adjacent modules in proximity and linking them. Lids above track 160 can be removed during installation or service to facilitate linking of tracks. In some embodiments, track sections and expanded by placing modules adjacent to one another and bolting the track sections of each module together forming a single multi-branching track system, such as track 160. Signaling cables can be daisy-chained together for ease of expanding control.

Figure 16:
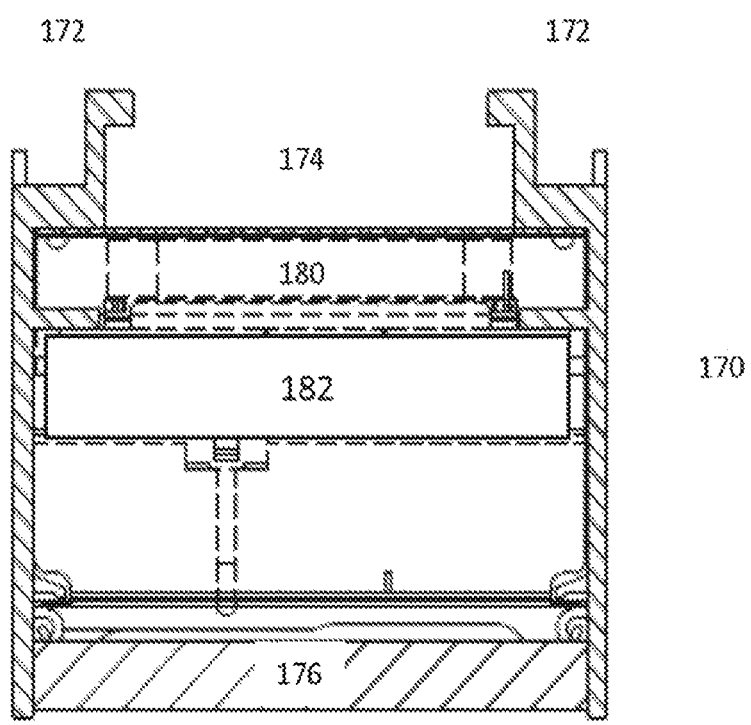
FIG. 16 is a cross sectional view of an exemplary automation track system for use with some embodiments.

FIG. 16 shows a cross-sectional view of the track section 170. Track section 170 may be track section used in track 160. In this embodiment, carriers ride between rails 172 on a track surface 174. In some embodiments, rails 172 are aluminum extrusions that also include vertical sides on the exterior of the track components underneath track surface 174. These aluminum extrusions can include brackets to easily bolt internal components to these side pieces to form a track unit. Track surface 174 is preferably a non-ferromagnetic stainless steel surface, making it durable and easy to clean. It should be appreciated that other materials can be used for rails 172 and track surface 174, such as aluminum, stainless steel, composite materials, etc. At the bottom of the side components of rails 172 resides a baseplate 176. Baseplate 176 can be mounted to the modules containing track section 170 and provide support for the track system.

Beneath track surface 174 reside a series of coils 180. The longitudinal direction of track section 170 is into the page; as you travel along the track section 170, you encounter additional coils 180. Coils 180 are preferably mounted to coil boards 182 and are preferably laterally oblong to allow more coil density in the longitudinal direction of the track. In some embodiments, coil boards 182 are printed circuit boards (PCB) that include several coils 180 in the longitudinal direction. An exemplary coil board is 250 mm in length, accommodating all of the coils 180 needed for 250 mm of track. Thus, a typical track section will have several coil boards 182, including dozens of coil boards 182 to make up an entire track system. In some embodiments, coil boards 182 receive a control signal to indicate the trajectory to apply to a carrier traveling along that coil board and a power source of 24 VDC. Coil boards 182 include coils 180, motor drivers to drive those coils, and one or more sensors to detect the presence of carriers traversing the track surface above the coil board by detecting the magnets of the carrier. These sensors can include Hall Effect sensors to detect the presence and location of the carrier traveling along the coil board. Accordingly, there may be more sensors than coils, allowing fine resolution of the position of a carrier traversing track surface 174. Furthermore, an RFID receiver may be utilized to receive an RFID signal that identifies the carrier traveling along the track surface. In some embodiments, magnetic signatures unique to each carrier can be detected by the Hall Effect sensors to determine the identity of the carrier magnetically. For example, a carrier traversing an array of Hall Effect sensors can be characterized at manufacturing to identify a unique signature of that carrier based on rise times and signal artifacts that are detected by the Hall Effect or sensor array as magnets in the carrier travel over that array. In some embodiments, smaller magnets than the main drive magnets may be placed in the bottom portion of a carrier to intentionally create a unique signature for each carrier at manufacturing. This magnetic signature can be correlated to an identity of each carrier in software for the vessel mover system. An exemplary linear synchronous motor drive system is described in U.S. Pat. No. 9,346,371.

Figure 17:
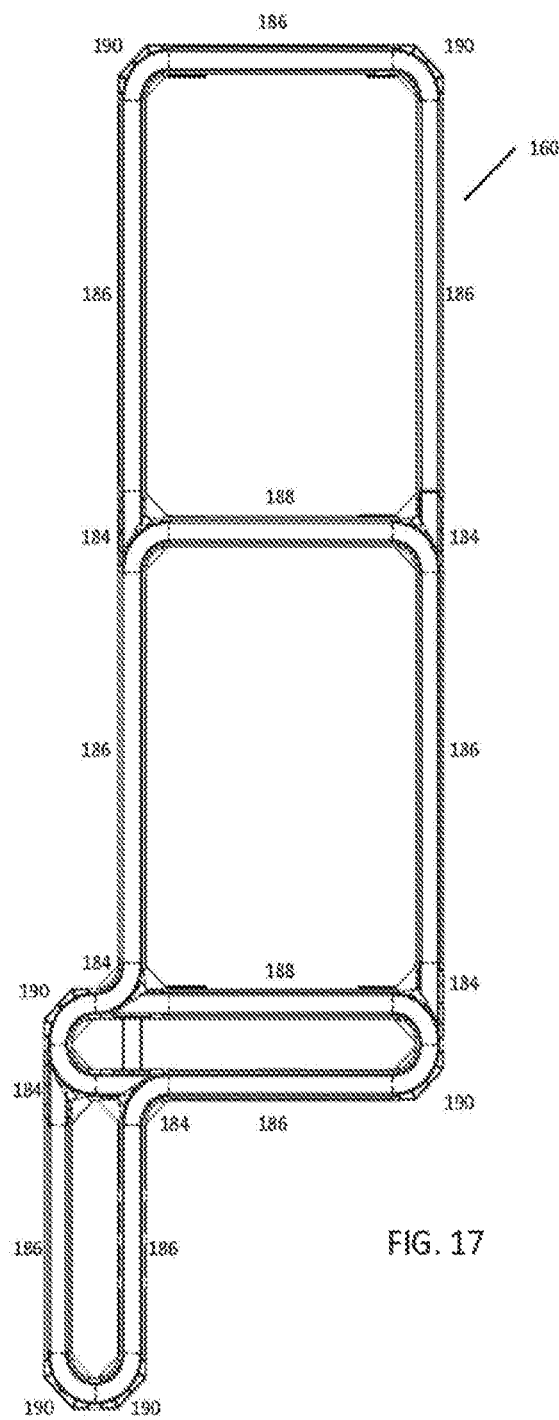
FIG. 17 is a top down view of an exemplary automation track system for use with some embodiments.

FIG. 17 shows a top view of an exemplary track system 160 with the individual track sections identified. There are generally four types of track sections that make up the modular design of track system 160. Switching segments 184 are branches in the track. The track surface for switching segments 184 is generally T-shaped, with rounded inside edges. Meanwhile, the rails of switching segments 184 include one straight rail (top of the T), one radiused rail (one inside corner of the T), and one radiused rail that includes a switching mechanism (other inside corner of the T). This switching mechanism is a movable rail component that can be turned a predetermined number of degrees to act as a switch (e.g., 20-30 degrees, depending on geometry). On one side of the rail component, it acts as a straight rail. On the other side of the rail component, the rail presents itself as a radiused rail forming an outside corner of a turn. By switching a movable rail component, that movable rail component can either provide the outside of a turn, or a simple straightaway rail. Thus, the mobile component provides a binary switch whereby switching segment 184 presents itself as a turn or as a straightaway, depending on the control signal. This can be used to divert individual carriers based on the state of the switching segment. It should be noted that, while the track may be bidirectional, only one end of the T can be connected to the center portion of the T to form a turn. Thus, while switching segments 184 may have three ports, essentially, one port may be switched to either of the other two ports, but those two ports cannot be joined together.

A simpler type of track section is a straightaway, such as outside straightaway 186 or inside straightaway 188. The basic components of straightaways 186 and 188 are a track surface and rails, with a series of coil boards providing linear motive forces along the direction of that straightaway. Straightaways 186 and 188 are identified separately in FIG. 17 because inside straightaways 188 can be operated under the control of the local module, rather than a vessel mover controller that controls the entire track 160, in some embodiments. This allows each local module to independently operate track sections 188 to act as a local random-access queue. The vessel mover controller can hand off control to the local module after moving a carrier from a switching segment 184 to the local inside straightaway 188. Similarly, when a local module has completed aspirations on a sample residing on inside straightaway 188, that module may move the sample carrier into a switching segment 184 and hand off control to the vessel mover controller. In some embodiments, inside track sections 188 still operate under the control of the vessel mover controller that controls the entire track system 160. To control a local queue on inside straightaway 188, the local module can communicate directly with the vessel mover controller to request movement of carriers within track section 188. This allows the local module to manifest control over carriers in its queue by using a request to acknowledge the communication system, allowing the vessel mover controller to have expertise in moving individual carriers and operating track system 160.

A fourth type of track segment is a curved track segment 190. Curved track segment 190 provides a 90° bend with a predetermined radius (or other angular bend). This radius is preferably the same as the radius used in turns when switching track segments 184 are switched into a curve. The radius is chosen to minimize the space impact of curves while, at the same time, allowing carriers to move quickly around curves without encountering drastic lateral forces. Thus, the space requirements and speed requirements of automation track 160 can determine the radius of curved segments 190.

Electrically, curved segments 190 are substantially the same as straightaways 186 and 188. Each of these segments includes a plurality of coils that are activated, in sequence, to provide a linear motor in conjunction with magnets in the bottoms of carriers. Each coil is activated to provide a push or pull force on drive magnets placed in the bottom of each carrier. The speed at which coils are activated in sequence determines the speed of the carrier on that section of track. Furthermore, carriers may be moved into a position and stopped at a predetermined location with high resolution by activating coils at that location.

Figure 18:
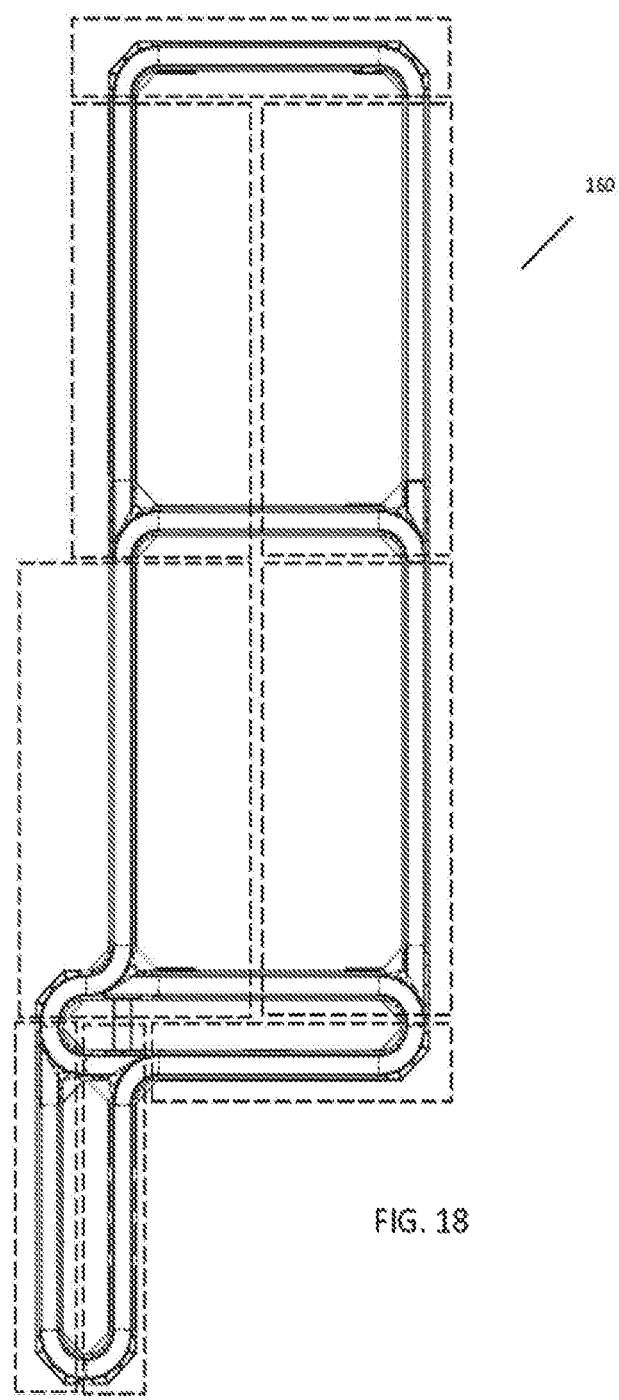
FIG. 18 is a top down view of an exemplary automation track system and logical subparts for use with some embodiments.

FIG. 18 shows the various control zones for a vessel mover controller controlling track 160. Each dashed box represents a different control zone that is controlled by a separate master board. Coil boards within those track segments, or portions of track segments, are operated under the control of a different master board for each control zone. This assists the scalability of track management. A node controller can control several master boards, communicating with them via a network. Meanwhile, each master board can control individual coil boards for the region of the track that each master board controls. Each master board can communicate with the coil boards to receive sensor information identifying the position and location of each carrier, and manage the trajectory of each carrier via control signals sent to each coil board. Each master board receives trajectory information for local carriers from a node controller. This allows each master board to govern a small section of track, carrying out the real-time control of that section of track, based on the information received from the controller, to handle overall management tasks of the entire track system. In the exemplary embodiment shown in FIG. 18, there are eight master board control zones. Each master board is also responsible for managing any switching track segments 184 within its control zone to direct a carrier to the appropriate point of exchange with the next control zone.

To further divide management of the track system, and to provide power failover redundancy, the track system can be divided into different regions, roughly corresponding to each module within the system. Region 192 corresponds to analyzer module 34, while region 194 corresponds to analyzer module 32, and region 196 corresponds to sample handler 10. It should be noted that multiple master boards are encompassed within each of these regions. Redundancy can be accomplished by assigning a power failover gigabit Ethernet (PFGE) switch to be in charge of providing network and power to each of these regions. Each PFGE switch provides local networking between each master board and the node controller. Each PFGE switch also provides power to the local region of track. By utilizing a switch to provide power, power redundancy can be achieved. In this example, the PFGE switch for region 196 accesses a local power source to provide power to each master board in this region. That PFGE switch also provides a power channel that may be accessed in the adjacent PFGE switch for region 194. The PFGE switch for region 194 has normal access to a local power source provided by the local analyzer module. Should that local analyzer module fail, be turned off, or need servicing, that power supply can be interrupted. However, it is desirable to still allow analyzer module 34 to operate while analyzer module 32 is being serviced. To accomplish this, the track sections in region 194 and 192 need to continue to operate. To accomplish this, the PFGE switch for region 194 detects the loss of power from the local module and accesses the power feed supplied by the adjacent PFGE switch from region 196. The PFGE switch for region 194, in turn, provides a power feed to the PFGE switch for region 192, should that section need power when local module power fails. Should module 34 lose power such that the PFGE switch for region 192 cannot access the local power feed, that PFGE switch can detect the loss of local power and access the power feed supplied by the PFGE switch for adjacent region 194. In this manner, should analyzer module 32 or 34 fail, local track sections continue to get power supplied by the power source for the module in the adjacent region.

Additional details about these exemplary power failover redundancy techniques and systems for use with some embodiments can be found in simultaneously filed U.S. Provisional Patent Application No. 62/365,194; which is incorporated herein by reference in its entirety.

Figure 20:
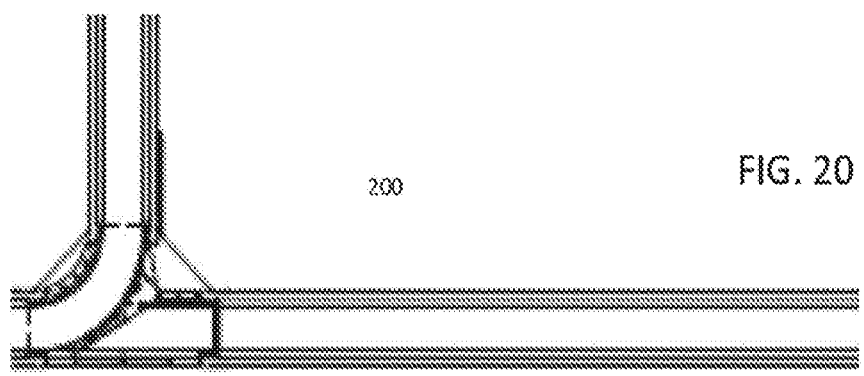
FIG. 20 is a top down view of an exemplary automation track section for use with some embodiments.
Figure 21:
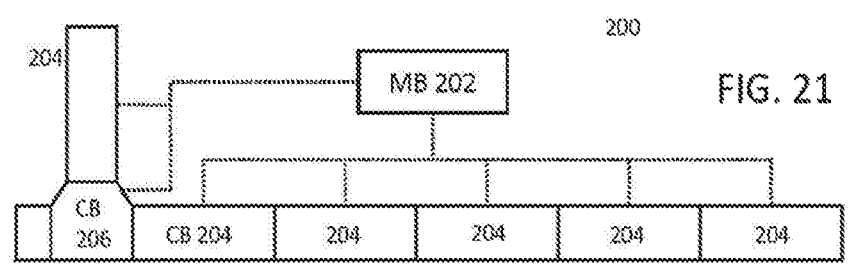
FIG. 21 is an electrical system diagram of an exemplary automation track section for use with some embodiments.

FIG. 20 is a top view of an exemplary portion 200 of track 160. Exemplary track portion 200 includes a plurality of coil boards that are controlled by a single master board. FIG. 21 shows the same exemplary track portion 200 with the coil boards and master board that controls them, with the physical track stripped away. Master board 202 receives control instructions from the vessel mover controller/node controller. Master board 202, in turn, uses those instructions to control coil boards 204 and 206. Master board 202 also receives sensor data from coil boards 204 and 206. In this example, there are five coil boards 204 associated with an outside track straightaway section, and one coil board 204 associated with an interior track straightaway section. Coil board 206 controls the switching track section. Each of coil boards 204 has a series of coils arranged in a line, and an array of Hall Effect sensors. The coils are powered by local drive circuitry (e.g., high current amplifiers) on coil boards 204, and are activated, sequentially, at the control of master board 202 to drive the carrier along a linear track section. Drive magnets in the carrier are attracted or repelled to those coils as the carrier moves along the stainless steel track surface placed above these coils. Hall Effect sensors detect the passing magnets, allowing the coil board to have feedback for controlling the coils. Information collected from the sensors can also be communicated to master board 202. For example, identifying information about a carrier may be communicated, as well as position information about the carrier can be communicated. Coil boards 204 can also have an RFID receiver, in some embodiments.

Coil board 206 includes a series of coils, in the same manner as coil boards 204. However, because coil board 206 controls a switching section, coils are arranged in a branch. Furthermore, coil board 206 is responsible for actuating (e.g., actuating a servo motor coupled thereto) the switching member that alters the guide rail in the switching section to redirect the carrier. In some embodiments, the configuration of coils in coil board 206 limit the need for the guide rail that is physically switched. As a carrier is moved into a turn, coils along that route push and pull the carrier in an arc magnetically. The guide rail switching member can assist in that movement but, in some embodiments, rarely makes contact with the carrier due to the magnetic guide forces. In some embodiments, the coil boards are controlled by master board 202 via a serial peripheral interface (SPI) bus, which facilitates serial communication between the master board and the coil boards.

Figure 22:
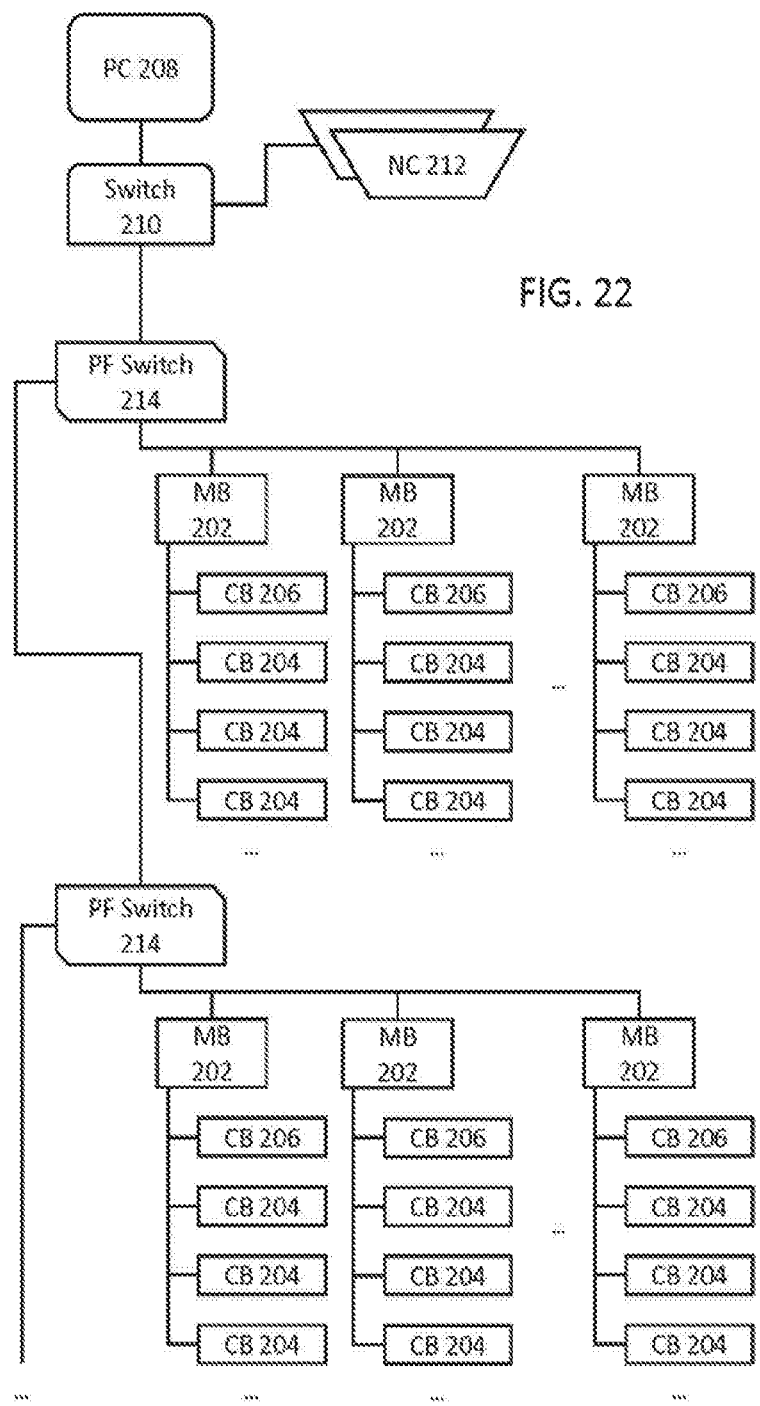
FIG. 22 is an electrical system diagram of an exemplary vessel mover system for use with some embodiments.

FIG. 22 illustrates the network control architecture for the vessel mover system. Vessel mover PC 208 acts as a master controller for the entire vessel mover, and provides an interface for an operator or laboratory information system to interact with the vessel mover system. PC 208 can oversee the scheduling of tests and assignment of destinations for individual samples, maintaining a database of status of each sample and tests to be performed. PC 208 provides overall management of the vessel mover, but lower-level management may be left to other modules. PC 208 interacts with other modules within the vessel mover system via Ethernet switch 210. For example, PC 208 can communicate with one or more node controllers 212.

A node controller 212 is responsible for mid-level management and routing of the samples within the vessel mover system. It operates at the overall control of PC 208. However, routing decisions, trajectory decisions, traffic management, etc., are governed by software in node controller 212. Multiple node controllers 212 are illustrated because control can be shared amongst multiple node controllers in a load-balancing fashion. For example, regions of automation track can be assigned to different node controllers, or management of individual carriers can be assigned to different node controllers. In exemplary embodiments, during normal operation, a single primary node controller 212 is used for all management of the vessel mover system. Meanwhile, a secondary standby node controller 212 is available, should the primary node controller go off-line. That secondary node controller can maintain memory that includes the status of all carriers in the vessel mover system to aid in taking over, should the primary node controller fail. This provides redundancy and/or hot-swapability, allowing the vessel mover to continue in the event of an off-line node controller.

Figure 19:
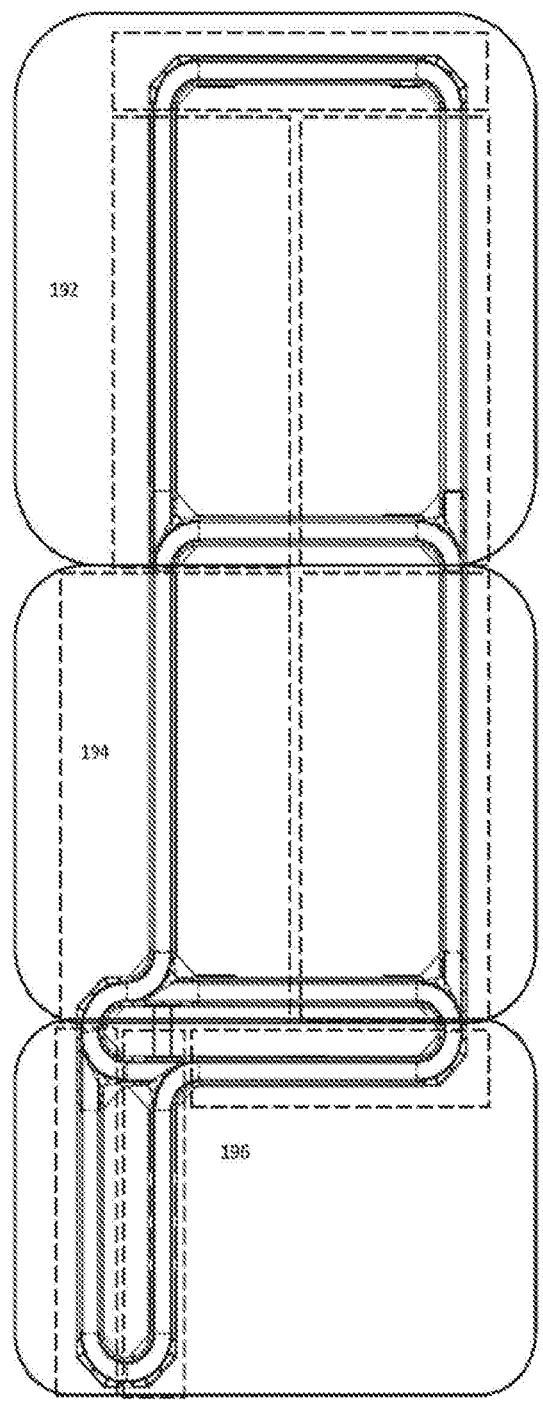
FIG. 19 is a top down view of an exemplary automation track system and logical subparts for use with some embodiments.

Node controller 212 communicates with master boards 202 via Ethernet switch 210. As explained above with respect to FIG. 19, local networking within a region of track can be governed by a PFGE switch assigned to each region. In this example, PFGE switches 214 are daisy chained from switch 210 to provide an Ethernet network between node controller 212 and each master board 202. Node controller 212 can communicate over this Ethernet network to give instructions and receive status information about carriers from each master board 202. Each master board 202 then controls local coil boards 204 and 206 via a serial port on that master board. Thus, node controller 212 can control the coils in the track, without communicating directly with each coil board. This aids in scalability of the track system.

As a practical matter, the track of the vessel mover should be at a well-defined height relative to the pipette of an analyzer module. This can be accomplished by providing a track section integral to the analyzer module, or by providing well-defined bracket locations on the analyzer module to allow track section modules to be bolted on in a modular fashion. This allows the pipette to repeatably move relative to an expected position for the bottom of a sample tube (as identified by a model of a sample tube on a typical carrier, or by the information about the tube and carrier determined by the TCS). With respect to tube top cups, a reliable vertical position is also important. By placing the bottom of the carrier at a well-known position and utilizing the characterization information about the tube top cup determined by the TCS, the pipette can reliably interact with the small target of a tube top cup. Moreover, by mounting the bottom and edges of the track at a known position relative to each pipette, a pipette can reliably enter into a tube or tube top cup without interference from sidewalls, and that pipette can reliably determine the fluid height level based on capacitance. A capacitive fluid level sensor utilizes the known conducting properties of a pipette and measures the capacitance when placed in a fluid. By having a reliable tolerance for the bottom of the vessel in which that fluid sets, this capacitive signal can give a reliable estimate of the sample volume remaining.

Carriers

Figure 23:
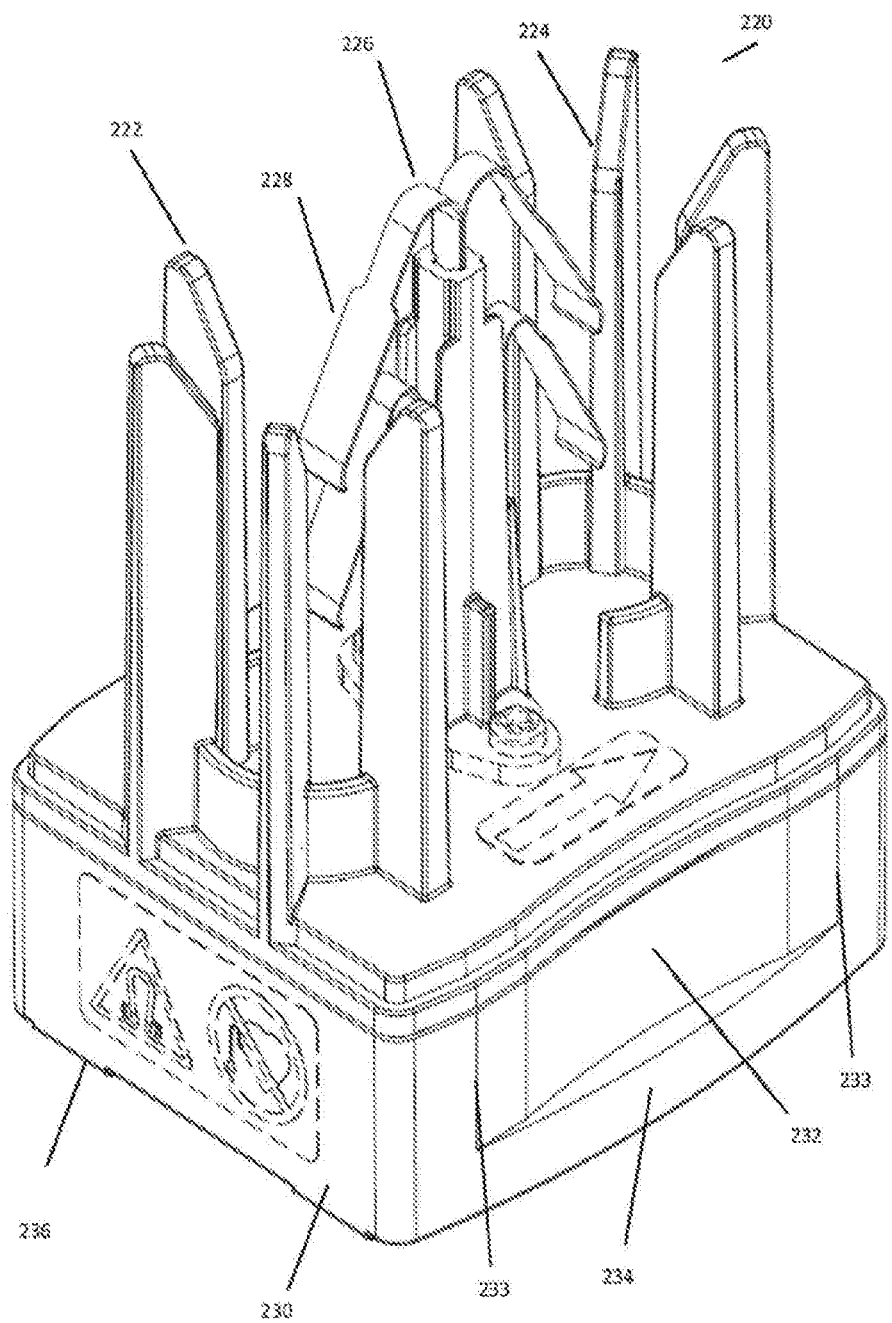
FIG. 23 is a perspective view of an exemplary patient sample tube carrier for use with some embodiments.

The vessel mover system interacts with a plurality of carriers to transport samples, as explained throughout. FIG. 23 shows a perspective view of an exemplary embodiment of a carrier for use with the vessel mover system. Carrier 220 is configured to support place and pick movement of samples into, and out of, the carrier. The left-hand slot is configured to receive a sample that is placed between a set of four tines 222. The right-hand slot is configured to receive a sample that is placed between the set of four tines 224. These sets of tines are symmetric and mirrors of each other. Between the sets of tines, a central member 226 acts as a fixed tine and includes a set of springs 228 to provide a force to push each sample tube into the set of four tines. While this does not result in centering of different size samples within each sample slot (along the longitudinal axis), the force provided by springs 228 and the shape of tines 224 and 222 will center each sample tube laterally, at the longitudinal axis of the carrier/tines. The arrow shows the longitudinal direction of travel of carrier 220. The tines allow the sample tube to be registered at a fixed location in the longitudinal direction such that the center of the sample tube will depend on the radius of the sample tube, but is easily repeatable based on the size of each sample tube.

Supporting a top plate having these tine sets is body 230. Body 230 acts as a housing that includes any onboard circuitry, such as RFID tags, as well as two or more drive magnets that allow the carrier 220 to form a linear motor in conjunction with coils in the track surface. The sidewalls of body 230 can be adapted to interface track rails. For example, to facilitate alignment during movement in straightaways and around fixed radius curves, the sidewalls of the body can have the following exemplary features. An upper portion of a sidewall of body 230 includes a concave section 232. This concave section can interface the inside corner of the curve, as shown in FIG. 26. Meanwhile, at the vertical edges of concave section 232, short, flat sections 233 exist in the sidewall. Moving along a straightaway, a pair of sections 233 on each side of the carrier can help align the carrier along a pair of straight rails. Beneath concave section 232, a convex section 234 provides an interface that can be used to interact with rails on the outside of the curve. It will be appreciated, therefore, that the rails in a curved section can have two heights: the rail on the inside of the curve being placed in a higher location to engage concave section 232, while the rail on the outside of the curve is placed in a lower location to engage convex section 234. In some embodiments, this relationship is switched, providing a concave section lower in the body, while the convex section is located higher in the body to increase lateral stability when going around curves. The exemplary relationship of concave, flat, and convex portions of the sidewalls 232, 233, and 234 may be better understood in the top-down view of FIG. 25.

At the base of body 230, one or more longitudinal sliders 236 can be used to minimize friction between body 230 and the stainless steel track. For example, an ultra-high molecular weight (UHMW) polyethylene or Teflon material may be used.

Figure 24:
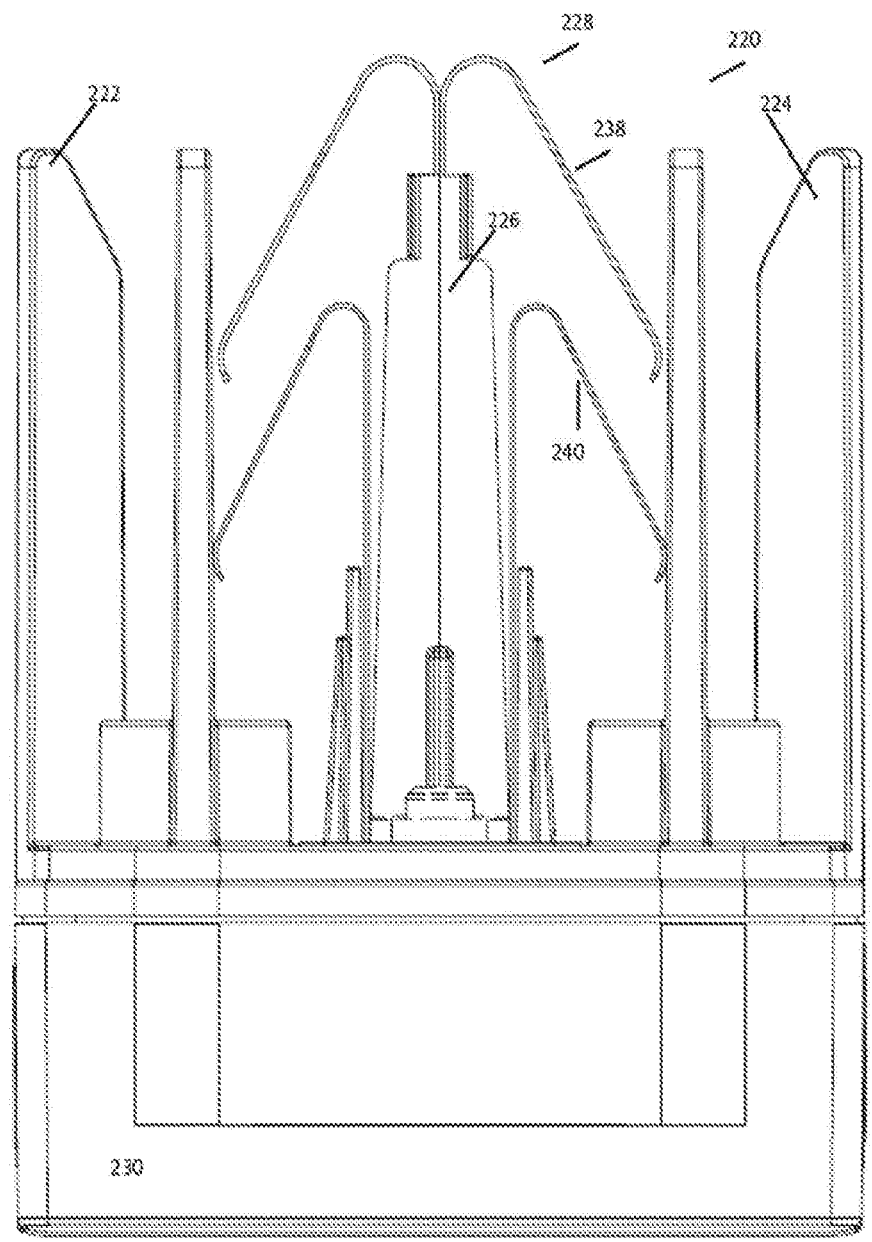
FIG. 24 is a side view of an exemplary patient sample tube carrier for use with some embodiments.

FIG. 24 is a side view of carrier 220. Springs 228 supported by member 226 include two sets of leaf springs, one set for each sample slot. Upper leaf springs 238 provide a longitudinal force to push the top of a tube into tines 222 and 224. Meanwhile, lower springs 240 provide a longitudinal force to push the bottom of the tube into tines 222 and 224. The combination of these two springs ensures vertical alignment of the tube with respect to the vertical alignment of tines 222 and 224.

Figure 25:
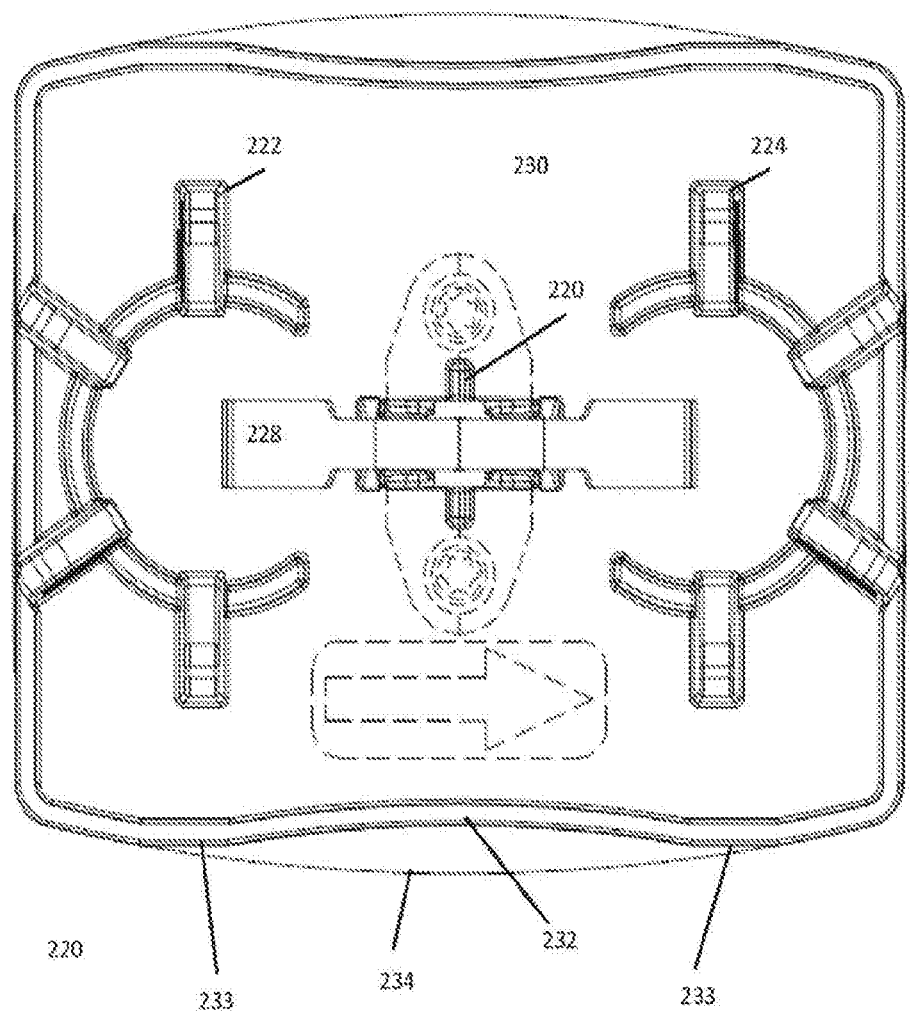
FIG. 25 is a top down view of an exemplary patient sample tube carrier for use with some embodiments.
Figure 26:
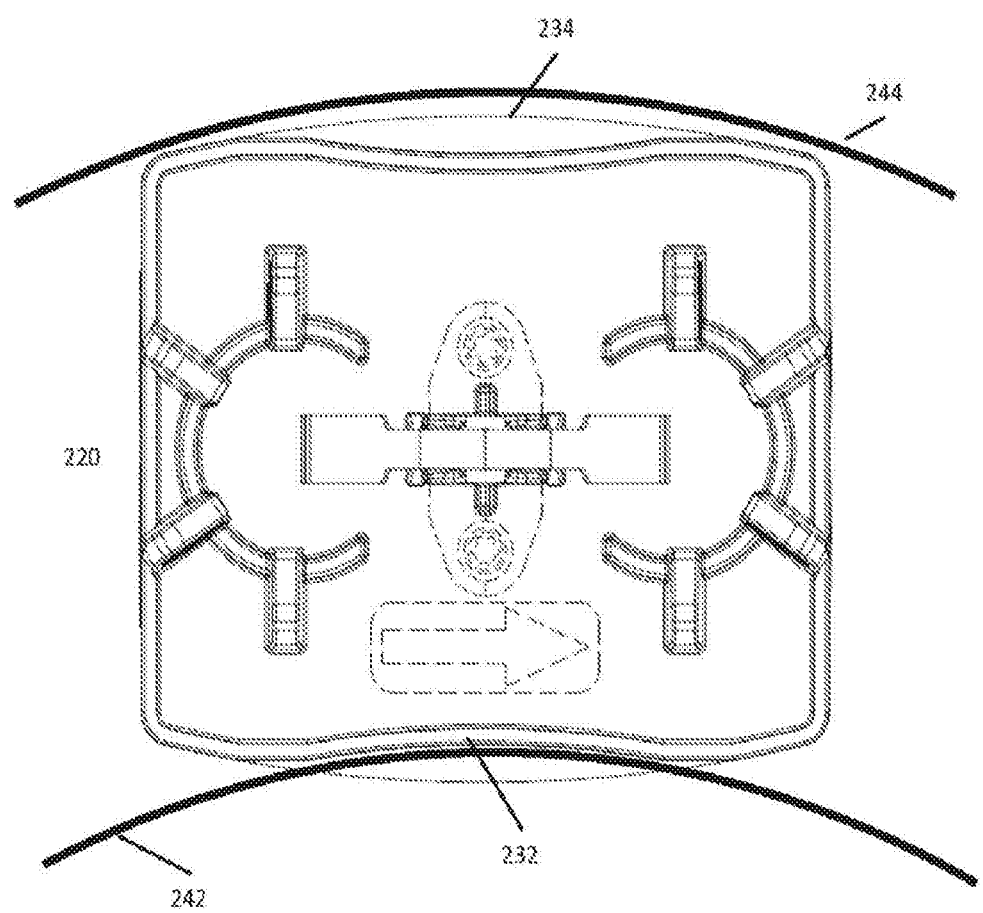
FIG. 26 is a top down view of an exemplary patient sample tube carrier for use with some embodiments.

FIG. 25 is a top down view of exemplary carrier 220, showing the relationship of tines 222, 224, and springs 228. The right-most and left-most pair (in the orientation of the figure) of tines act to register and center a tube forced by springs 228. Meanwhile, the upper-most and lower-most pairs of tines provide additional security to prevent a tube from tipping over in a lateral direction. As can be seen, there are several openings between the tines and springs. This allows various optical views of the tube. When the carrier is placed in the TCS, multiple camera views can be seen through the spaces between the tines to read barcode labels or sense the liquid height in the tube.

In some embodiments, tines 224 and 222 comprise a metal-impregnated or carbon-impregnated plastic. Thus, these tines can be slightly conductive. The conductivity of tines can facilitate location sensing by a pipette, and can affect level sensing of fluids using a capacitive level sense. For example, in an exemplary embodiment, the tines or other structures at the top of the carrier are made out of approximately 30% (25 to 35%) carbon-filled Lexan resin to enhance capacitive level sensing during sample aspiration. In some embodiments, a range between 20% and 50% carbon filled Lexan resin can be used.

FIG. 26 illustrates rail engagement between the sidewalls of carrier 220 and the side rails of a curved track section. In this example, carrier 220 engages a track section having an inner side rail 242 and an outer side rail 244. Inner side rail 242 is configured to interface concave section 232 in the sidewall carrier 220. Side rail 242 does not extend all the way to the track surface, allowing the corresponding convex section below concave section 232 to freely pass underneath side rail 242. Meanwhile, outer track section sidewall 242 engages convex section 234, and extends substantially all the way to the track surface. This allows alignment of the carrier 220 in a curve by providing physical interfaces to guide rails with radiuses substantially the same as those of the guide rails. This minimizes rattling, oscillations, lateral impacts, etc., when going around a curve.

Figure 27:
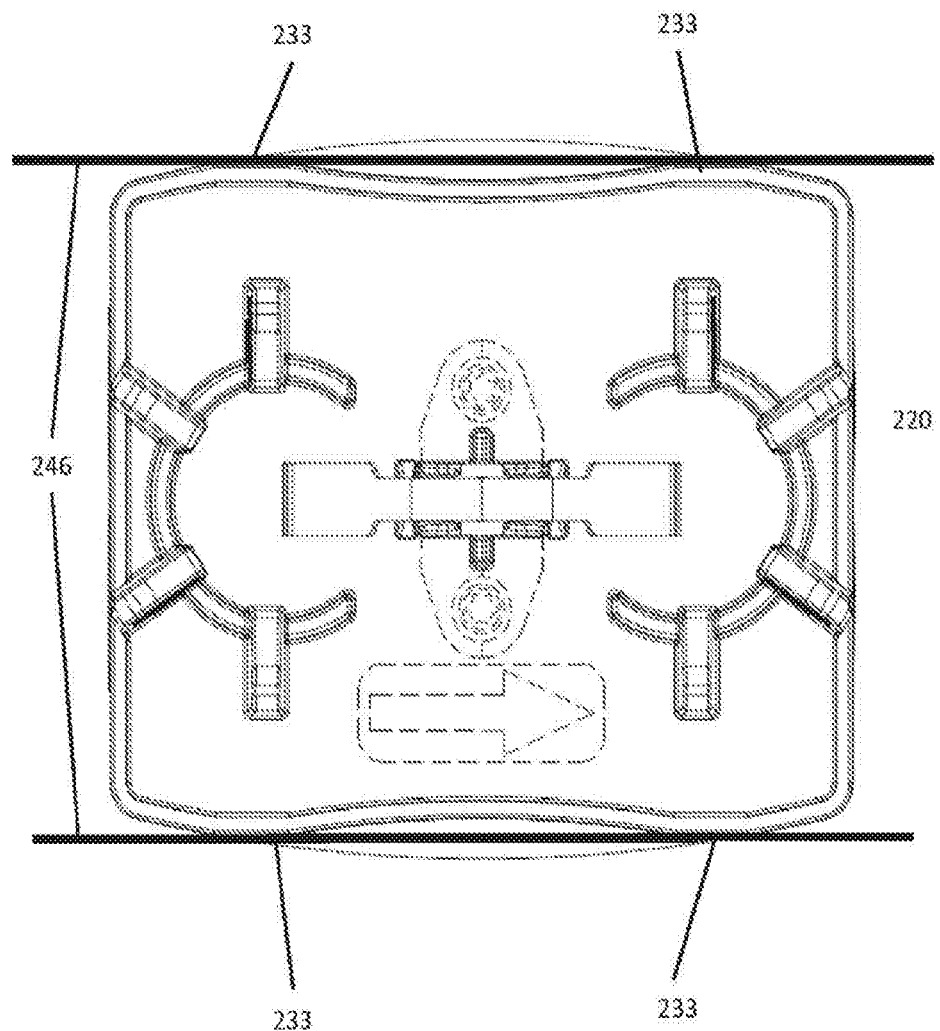
FIG. 27 is a top down view of an exemplary patient sample tube carrier for use with some embodiments.

FIG. 27 illustrates rail engagement between the sidewalls of carrier 220 and the side rails of a straight track section. In this example, flat sidewall sections 233 engage the parallel, flat sidewalls 246 of the track section. This provides four points of interaction between the carrier and sidewalls, assisting in aligning the carrier in the direction of travel.

Clinical Chemistry Analyzer Module

One type of analyzer module is the clinical chemistry module 34. Clinical chemistry module 34 will be explained with respect to a mid-volume clinical chemistry (MVCC) module. An MVCC module is an instrument for performing automated clinical chemistry testing. The MVCC module can be installed as part of a larger analyzer system (e.g., analyzer 30), which might include multiple MVCC and IA modules. The MVCC module can also be connected directly to a laboratory sample distribution track via a direct connect LAS interface module.

The primary function of the MVCC module is to provide clinical chemistry assays using photometric and integrated multisensory technology (IMT) or ion selective electrode (ISE) detectors. An exemplary MVCC module is capable of processing a maximum of 1200 photometric assays per hour, and up to 600 IMT results per hour (200 samples per hour with up to 3 electrolyte results per sample). The MVCC module includes a dilution system, an IMT/ISE system, reagent system, and photometric system, and is supported via common base utilities for the MVCC module.

In some embodiments, the MVCC module has no inherent capability for loading samples, and must be linked to a source/sink, such as the sample handler module or a direct load track section via the vessel mover system. The MVCC module takes one or more sample aliquots from a primary sample vessel that is positioned, via the vessel mover system, at an aliquot position accessible to a pipette of the MVCC module, and stores them onboard for processing.

The MVCC module accesses samples from the PCM track (or directly at a single position on the left side, in some embodiments). The MVCC reagent cartridge design includes features that permit transfer mechanism interface and automatic cap opening; this allows it to be "automation friendly." This allows the MVCC module to receive reagent cartridges via the automation track of the vessel mover system, and automatically move these reagent cartridges from the automation track to reagent storage onboard the MVCC module. This allows the automatic delivery of reagents to the MVCC module. In some embodiments, the MVCC module can load and unload reagents to a single position on the PCM track in the back of the module (e.g., position 64 in FIG. 6), or to the manual load station in the front.

Figure 28:
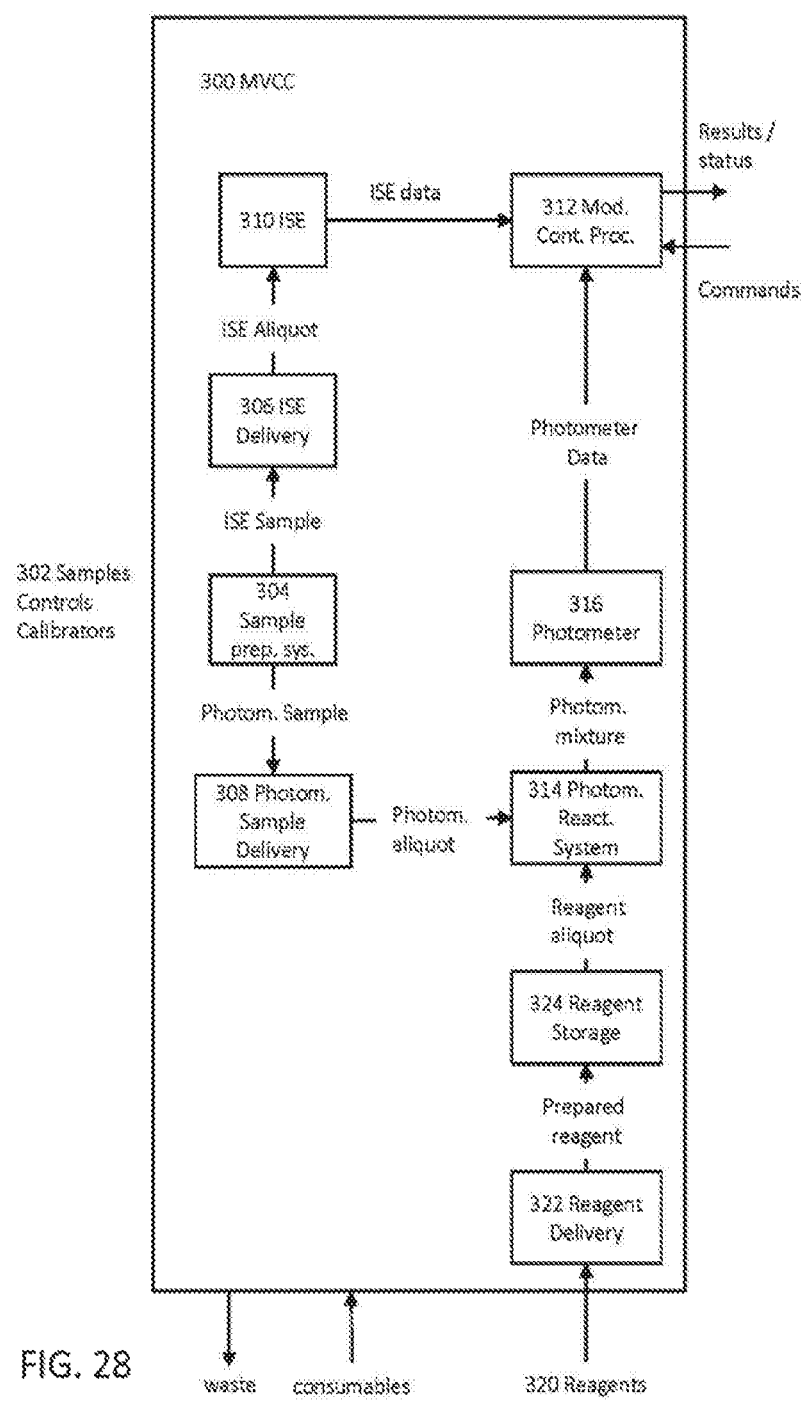
FIG. 28 is a system diagram for an exemplary analyzer module for use with some embodiments.

FIG. 28 is a domain model of MVCC module 300. Patient samples, calibrator samples, or control samples (together, samples) 302 are sample tubes delivered via a carrier and the vessel mover system to position 56, where the sample preparation system 304 can access the sample. Sample preparation system 304 includes a pipette arm that accesses a sample access point 56. Preparation system 304 then aspirates one or more aliquots from the sample on the automation track. Based on the identity of that sample, it is determined by the MVCC module whether ISE testing or photometric testing is appropriate for that sample aliquot. In the case of ISE sample testing, the aliquot is delivered to ISE sample delivery system 306. ISE sample delivery system 306 includes a plurality of aliquot vessels, such as cuvettes, to receive the sample aliquot for ISE testing. Delivery system 306 then delivers the diluted sample aliquot to the ISE testing module that performs a standard ISE test. The resulting data of this test is then presented to module control processor 312. Processor 312 is responsible for scheduling and managing all testing going on in the MVCC module 300. Processor 312 receives commands in test orders from an LIS, or manually from an operator or test menu. Once test results are completed and presented to the processor, processor 312 reports these test results and any other status data, such as completeness of testing for that sample, to the LIS or a user interface or database.

If the sample is determined to need photometric testing, preparation system 304 presents the aliquot to the photometric sample delivery system 308. Photometric sample delivery system 308 can include a dilution ring that dilutes and stores aliquots of samples. Each photometric sample aliquot is then presented to photometric reaction system 314. This reaction system can include a reaction ring that receives samples and reagents according to a set time schedule, and presents those mixed samples to photometer 316. Photometer 316 may take multiple photometric measurements of the mixed sample at a regular time interval or schedule, to observe the reaction between reagents and the diluted sample. Photometer 316 then presents its findings as photometer data to module control processor 312.

Reagents can be delivered via a drawer on the front for manual delivery by an operator, or by placing a reagent vessel at a predetermined location on the automation track, such as position 64. Reagent delivery system 322 receives reagents 320 from the reagent drawer or from the automation track and, using a robot arm or similar mechanical means, reagent delivery system 322 moves that reagent into a reagent storage area 324. In some embodiments, reagent delivery may require some type of preparation of that reagent by the reagent delivery system 322. Reagent storage area 324 can be an environmentally/temperature-controlled storage area, where vessels of reagents are stored to be delivered as reagent aliquots, on demand, to the reaction ring used by the photometric reaction system 314. When a reagent is needed for a photometric test, an aliquot of that reagent can be withdrawn from reagent storage area 324 and placed into a reagent vessel or cuvettes that are part of the reaction ring of photometric reaction system 314.

MVCC module 300 also receives electricity and water from the laboratory. Water is used for cleaning and rinsing testing components to prevent cross contamination of samples or reagents. The result of testing and cleaning of equipment results is liquid waste that must be evacuated by the laboratory and treated or flushed. Consumables, such as diluent, cuvettes, or disposable tips or reagent packaging, are also presented to MVCC module 300. Once these consumables are used, they may be disposed of by the MVCC module into a solid waste storage area (e.g., an internal trash bin), along with any empty reagent cartridges. Once full, an operator can be alerted to empty the solid waste bin and dispose of the contents appropriately (such as by placing them in the laboratory trash or bio hazardous waste bin).

The MVCC module uses two measurement techniques: photometric and Ion Selective Electrode (IMT/ISE). Photometric tests are performed by mixing a sample aliquot with one or two liquid reagents, and measuring light transmitted through the reaction mixture at one or more wavelengths over a period of time, up to 10 minutes. IMT tests are performed by mixing a sample aliquot with IMT diluent, and passing the mixture past electrodes specific to the target ions (e.g., Na, K, and CO).

In an exemplary embodiment, the MVCC module is capable of processing a maximum of 1200 photometric assays per hour, and up to 600 IMT results per hour (200 samples per hour with up to 3 electrolyte results per sample). All photometric and IMT assays are processed from diluted aliquots of the original sample. For photometric assays, the MVCC module prepares one or more dilutions, depending on the dilution ratios of the specific tests for a sample and the amount of sample fluid needed.

For IMT assays, an aliquot of the original sample is delivered to the IMT module, which prepares the dilution internally. For IMT assays, the aliquot of original sample is added to a measured quantity of IMT diluent. The mixture is drawn through the module past the IMT chip, and the voltage of each of the sensors is read. A measurement of IMT Standard A is taken immediately before or after each sample to provide reference readings.

Dilutions for photometric assays are stored on a dilution ring until needed by the MVCC test scheduling software. At the appropriate time(s), an aliquot of diluted sample is delivered into a reaction cuvette by the sample arm. In general, all photometric assays follow the same standard template: the first reagent is delivered into an empty reaction cuvette, followed by sample addition and mixing. For most photometric assays, a second reagent is added to the reaction mixture (and mixed) 4.3 minutes after sample addition. Photometric readings are taken at set times until the assay is complete (a maximum of 9.75 minutes). After all the photometric data has been collected, the assay result is calculated using one of several available calculations.

Photometric dilution ring scheduling operates in two basic modes: synchronous and asynchronous. Synchronous scheduling mode is in operation when the IMT is busy or no IMT work is available. During synchronous operation, photometric dilutions are being created from samples presented to the module. The dilution ring advances every six seconds, processing dilution cuvettes in sequence. While the dilution ring is stationary, various operations are performed around the ring, such as creating a new diluted aliquot, washing a dilution cuvette, mixing, etc. In some embodiments, each sample is transferred to up to two cuvettes on the reaction ring from a single dilution cuvette. To maintain synchronization with the reaction ring, two photometric tests are scheduled for the dilution at the mix station so that, when that dilution reaches the reaction sampling position, the appropriate cuvettes are ready on the reaction ring. Any remaining tests required for the sample being scheduled (beyond two) are added to the list of pending work. If the particular dilution at the mix station has only one test requested, the second scheduled test is a generic CLEAN test.

Asynchronous scheduling mode is in operation when the IMT is idle and has work available, or when the photometric pending work list gets too long, or when high priority (STAT) photometric tests are available. During asynchronous operation, no new dilutions are created, and no washing or mixing is performed. In asynchronous mode, the dilution ring is able to move freely, as needed, in order to make the highest priority photometric test available for processing.

Figure 29:
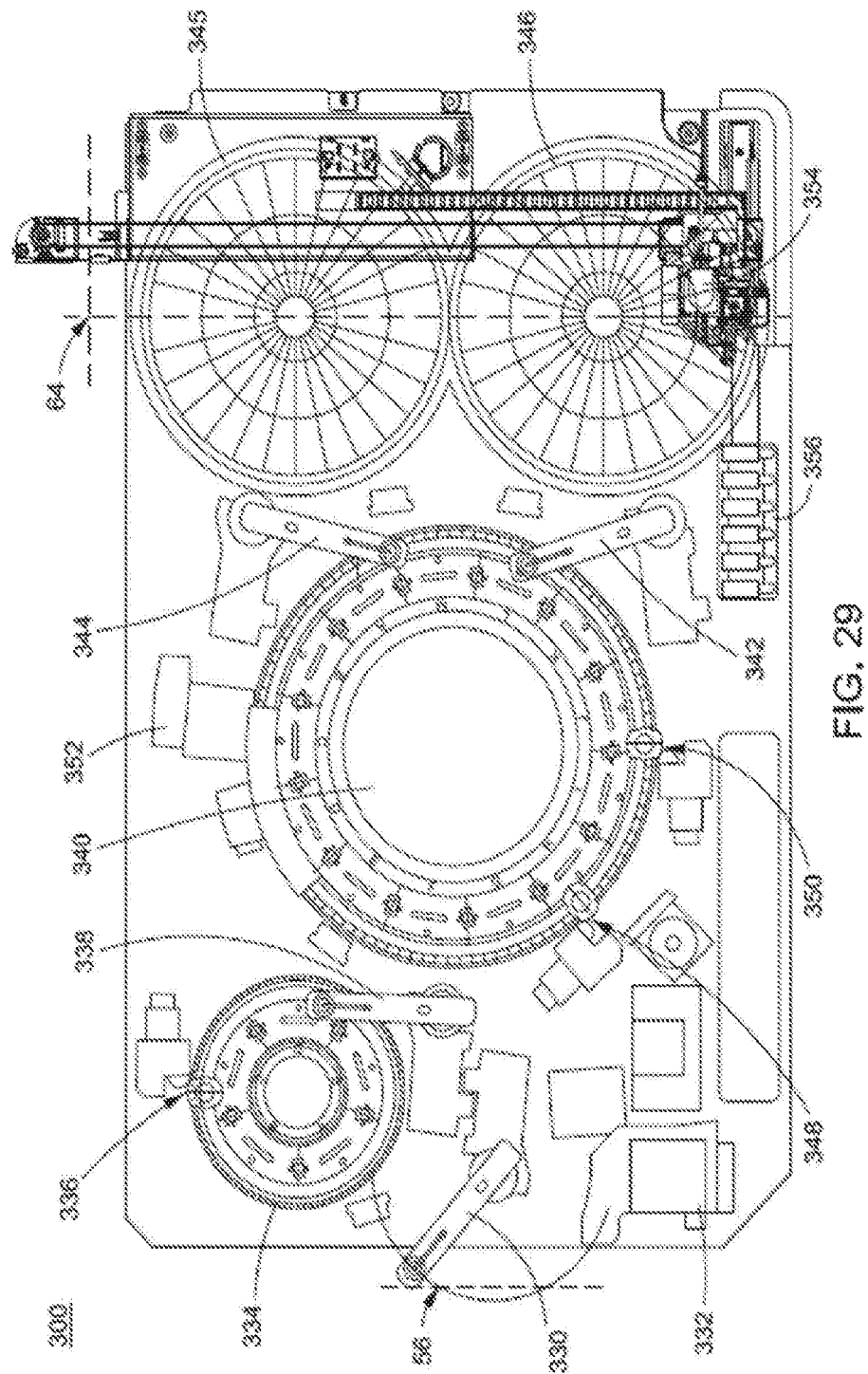
FIG. 29 is a top down view of electromechanical systems for an exemplary analyzer module for use with some embodiments.

FIG. 29 shows the hardware systems in an exemplary MVCC module 300. Samples are moved to sample access point 56 via the vessel mover system. Once presented, a sample may be aspirated via dilution arm 330. Dilution arm 330 is a robotic arm with a pipette configured to aspirate an aliquot of a sample. If that sample aliquot is designated by the control processor of module 300 for an ISE test, dilution arm 330 swings counterclockwise to position the pipette above an access port for IMT system 332. If the sample aliquot aspirated by dilution arm 330 is designated for photometric testing, dilution arm 330 rotates clockwise to position the pipette above dilution ring 334.

A diluter system includes dilution arm and probe 330, dilution ring 334, dilution mixer 336, and a dilution aliquot washer, along with support pumps and bulk fluid feed systems. The diluter system services the photometric system and the IMT System. The dilution arm 330 transfers the sample from the sample access point 56 on the PCM track to either the IMT System 332, or the dilution ring 334.

For photometric assays, the dilution arm creates the necessary sample dilution(s) using saline solution. The normal dilution is 1:5, but other dilutions are available, depending upon assay requirements. An exemplary system also has the capability to perform serial dilutions (impacting throughput) at ratios up to 1:2500. The diluted sample is held for retest or reflexive testing on dilution ring 334, until that aliquot reaches the aliquot wash station. Under normal (number of tests/sample) circumstances, the sample is available for greater than 10 minutes.

For the IMT assays, dilution arm 330 performs serum and/or urine dilutions directly into the IMT port, where the dilution is mixed. In this case, the IMT specific diluent is delivered by a separate metering system.

IMT system 332 is responsible for testing a diluted sample using an appropriate electrode for the ISE test. Once the sample aliquot has been tested, IMT system 332 can then flush and clean the internal vessel used to test that sample portion. The results of the IMT testing are then sent to module control processor 312. IMT system 332 includes ISE module 310 from FIG. 28.

IMT system 332 processes sample (serum or urine) delivered to the IMT port by dilution arm 330. IMT diluent is metered into the entry port where it is mixed with the sample. The diluted sample is drawn into the detection electrode "stack," where the concentration of the target ions (Na, K, CO is measured. Reference fluid(s) can be automatically pumped into the "stack" to perform periodic calibrations. This system operates on an 18 second cycle to process 200 samples per hour for a nominal throughput of 600 assays per hour.

Dilution ring 334 includes a series of disposable or cleanable vessels/cuvettes. Once dilution ring 334 has received a sample aliquot, that ring rotates the cuvettes until each cuvette having a sample reaches the dilution mixer 336 to perform a final mix of the diluted sample, making the sample suitable for photometric testing. Dilution ring 334 continues rotating clockwise until that sample is in a position that can be accessed by sample arm 338. It should be appreciated that dilution ring 334 can act as a random-access sample ring, allowing STAT samples to be moved directly from the interaction point with dilution arm 330 dilution mixer 336, and then to a position accessible to sample arm 338.

Sample arm 338 is responsible for aspirating the diluted sample portion prepared by dilution mixer 336, moving above a reaction ring 340, and dispensing that sample portion into a reaction cuvette in that reaction ring. In some embodiments, reaction ring 340 can include a plurality of concentric rings having cuvettes with samples and reagents. These rings can be moved relative to one another to allow reagents to be aspirated and dispensed into reaction vessels containing samples. In some embodiments, a single ring is used. Reagents can be added before the sample arrives, or after the sample arrives via reagent arm 342 or reagent arm 344.

The primary function of reagent arms 342 and 344 is to move aliquots of reagents from reagent server 346 or reagent server 345, respectively. These aliquots are then dispensed into reaction vessels in reaction ring 340. In some embodiments, the vessel receiving aliquot contains a patient sample; in some embodiments, the vessel is empty and the patient sample will be added later. Reagent servers 345 and 346 include a variety of different reagents, allowing a variety of tests to be performed by MVCC module 300. Reaction ring 340 moves vessels in a predetermined sequence such that each reaction vessel reaches reagent mixer 348 or sample mixer 350 for mixing. Reagent mixer 348 can be used to premix reagents from reagent servers 345 and 346, or combination reagents. Sample mixer 350 is used to mix reaction vessels containing both reagent and sample. Once mixed, the reaction between the sample and reagent proceeds in the reaction vessel. Reaction ring 340 rotates to allow photometer 352 to take photometric measurements of the reaction at predetermined times. In some tests, additional reagents need to be added by reagent arms 342 and 344 at a predetermined time, the new solution mixed, and additional photometric measurements taken.

In some embodiments, the photometric system processes the photometric assays in 221 optical cuvettes on reaction ring 340. The system supports the traditional fixed assay templates used in other MVCC modules in the art. Reaction ring 340 indexes 75 cuvette positions every three seconds. Using this indexing pattern, a given cuvette advances four cuvette positions every third index. The system can initiate a new photometric test every three seconds, yielding a nominal throughput of 1200 assays per hour.

Assay resources include reagent-1 delivery, sample delivery, reagent mix-1, reagent-2 delivery, and reagent mix-2, all at fixed points in time. The reactions are conducted in semi-permanent cuvettes that are washed and re-used after each assay by a cuvette washer. Assays are processed in reaction cuvettes held at constant temperature (37° C.) on reaction ring 340 through the use of a heated fluid bath. The system processes assays on a three-second cycle.

The assay is initiated with an addition of the first reagent (R1) by reagent arm 344. Shortly thereafter, a precision sampler (e.g., sample arm 338) transfers sample from an aliquot on the dilution ring 334 to the reaction cuvette. The contents are then mixed thoroughly with reagent mixer 348 or sample mixer 350, and a reaction ensues. The reaction cuvette is read by photometer 352 approximately once every nine seconds while reaction ring 340 is indexing. The photometer 352 employs a standard set of 11 wavelengths currently used by similar photometers in the art. Photometer 352 supports absorbance and turbidimetric assays using the 11 available wavelengths.

Some assays only require a single reagent, while others require a second reagent addition. The second reagent is added by reagent arm 342 at a fixed point in time (e.g., approximately 260 seconds after sample addition), and the reaction is mixed by reagent mixer 348 or sample mixer 350. The reaction is read by the photometer, as before.

Reagent servers 346 and 345 contain a series of radially oriented reagent vessels placed in two concentric rings. These reagent vessels can be loaded via reagent loader 354. Reagent loader 354 includes a robot arm that moves on a gantry that allows it to be positioned above the vessel mover access point 64 on the automation track. The mechanical components of the reagent loader 354 can be substantially the same as those discussed with respect to robot arm 20, configured to interact with reagent cartridges. When a reagent within reagent server 345 or 346 needs to be refilled, the servers will automatically eject the empty cartridge, and the vessel mover system will retrieve a replacement reagent cartridge and position that cartridge via a carrier at the vessel mover access point 64. Reagent loader 354 will then move to that position, and pick up the reagent cartridge using end effectors. Reagent loader 354 will then move that reagent cartridge to the appropriate empty slot in reagent server 345 or 346, and insert the cartridge into that location in the reagent server.

Alternatively, an operator can manually load reagents at the request of the machine or at a predetermined schedule. The operator can load a series of reagent cartridges into a tray at reagent manual load station 356. Reagent manual load station 356 includes a linear slide that receives the tray and moves the tray into position underneath reagent loader 354. End effectors of the robot arm of the reagent loader can then remove reagent cartridges from the tray placed at the reagent manual load station 356 and move those cartridges into the appropriate slot in the reagent servers. This allows automatic or manual loading of reagents.

Reagents are stored and provided by the reagent system. The reagent system includes two refrigerated rotary reagent servers. One server 345 is dedicated solely to the first reagent addition and one 346 to the second reagent addition. Each server operates on a three-second cycle with about one second allocated for motion and two seconds allocated for access by the respective reagent arms. Each reagent server holds reagent cartridges arranged in two concentric rings. There are 24 cartridges on the inner ring, and 46 cartridges on the outer, for a total cartridge capacity of 70. In some embodiments, up to four positions on each server can be dedicated to cartridges holding special cleaning fluids, and one position can be held open for loading and unloading logistics. This means, an exemplary system can simultaneously support 65 different onboard assays.

Reagent cartridges are loaded into the servers by reagent loader 354. Reagent loader 354 presents the reagent cartridge to a barcode reader to confirm the identity of the cartridge (PCM track load at position 64), or to identify the cartridge (reagent manual load station 356). Reagent loader 354 then places the cartridge in the appropriate server position (in server 345 or 346).

Figure 30:
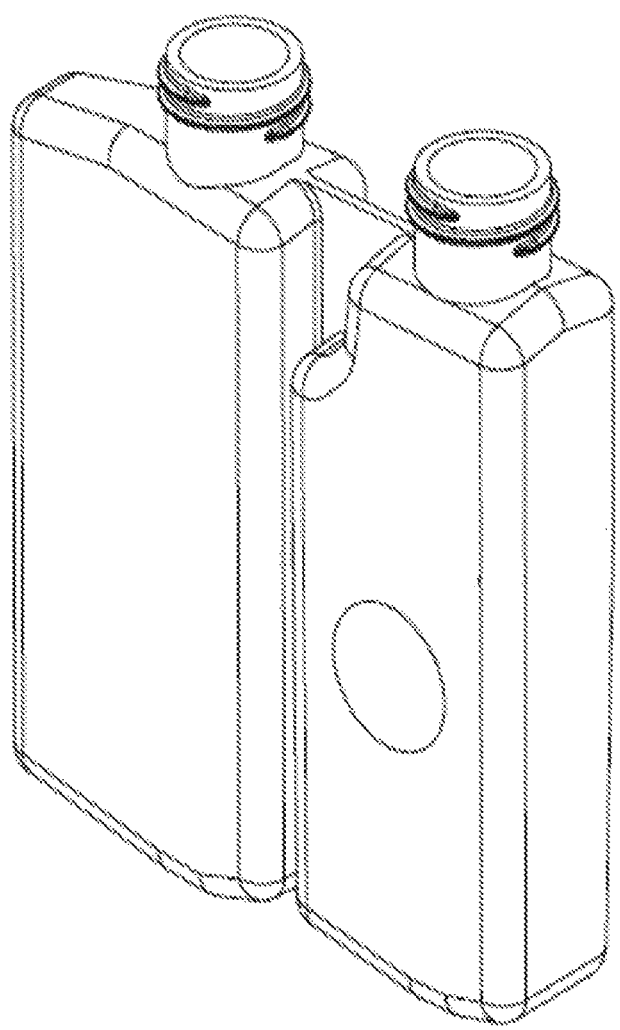
FIG. 30 is a perspective view of an exemplary reagent carrier for use with some embodiments.

The reagent cartridge is sized for ease of handling by the PCM, and has gripping features to allow pickup using reagent loader 354 and a PCM reagent handler (e.g., robot arm 20). The cartridge is closed with a screw-on cap with auto-open features. One or more barcoded labels are provided for identification by the customer and the system. The cartridge has dual wells, with 25 ml capacity in each well. The dual well configuration can allow for longer onboard stability by only opening each well, as needed. FIG. 30 shows a perspective view of an exemplary dual-well reagent cartridge.

The reagent cartridge is closed with a screw-on cap that can be opened either by the customer (in the case of the need for pre-hydrating the reagent), or automatically by the system. This cap should maintain a hermetic seal for long-term storage, but be easily opened in use. This closure system is auto-open only, with no provision to re-seal the opened cap. A foil seal is designed for piercing by reagent loader 354.

Immunoassay Analyzer Module

IA analyzer module 32 is a clinical analyzer that automates heterogeneous immunoassays using magnetic separation and chemiluminescence readout. Immunoassays take advantage of the existence of either specific antibodies for the analytes being tested, or specific antigens for the antibodies being tested. Such antibodies will bond with the analyte in the patient's sample to form an "immune complex." In order to use antibodies in immunoassays, they are modified in specific ways to suit the needs of the assay. In heterogeneous immunoassays, one antibody (capture antibody) is bound to a solid phase, a fine suspension of magnetic particles for the IA module, to allow separation using a magnetic field followed by a wash process. This is exemplified in sandwich assays and competitive assays. An exemplary IA module menu can include additional variations on these formats.

In the sandwich assay format, two antibodies are used, each one selected to bind to a different binding site on the analyte's molecule, which is usually a protein. One antibody is conjugated to the magnetic particles. The other antibody is conjugated to an acridinium ester (AE) molecule. During the assay, sample and the two modified antibody reagents are added to a cuvette. If the analyte is present in the patient's sample, the two modified antibodies will bind and "sandwich" the analyte molecule. Then, a magnetic field is applied, which will attract the magnetic particles to the wall of the cuvette, and excess reagents are washed off. The only AE-tagged antibody left in the cuvette is one that formed an immune complex through the sandwich formation with the magnetic particles. Acid solution is then added to free up the AE into solution, which also includes hydrogen peroxide needed for the chemiluminescence reaction. A base is then added to cause it to decompose, emitting light (see reaction formulas below—a variety of AEs are used in various assays, but the fundamental chemistry is substantially identical). Light is emitted as a flash lasting a few seconds, and is collected and measured in a luminometer. The integrated light output is expressed as relative light units (RLUs). This is compared to a standard curve, which is generated by fitting a dose-response curve to RLU values generated by known standards of the same analyte over its clinical range. Sandwich assays produce a direct dose-response curve, where higher analyte doses correspond to increased RLUs.

The competitive assay format applies to molecules for which only one antibody is used. This antibody is conjugated to the magnetic particles. A second assay reagent contains the analyte molecule conjugated to the AE. During the assay, the quantities of the reagents are chosen such that the analyte from the patient's sample and the AE-tagged analyte compete for a limited amount of the antibody. The more patient analyte there is, the less AE-tagged analyte will bind to the antibody. After magnetic separation and wash, the only source of AE in the cuvette is from AE-tagged analyte that has been bound to the magnetic particles through the antibody. Acid and base are added, as before, and the dose analysis is as described for the sandwich assay. Competitive assays produce an inverse dose-response curve, where a higher signal corresponds to a lower amount of analyte in the patient sample.

The IA analyzer module magnetic particle reagent is also referred to as the "solid phase," and the AE-tagged reagent is referred to as the "lite reagent." The IA analyzer module provides the hardware and software to enable running multiple assays of various formats, concurrently, in random-access and with high throughput.

FIG. 31 is a top-down view of the exemplary electromechanical components of an exemplary IA analyzer module 360, which includes the following subsystems.

Analytical Engine—Incubation rings 362 include inner and outer incubation rings, drive mechanisms, cuvette elevators to and from the wash ring, and thermal control. These rings facilitate a reaction of sample and reagents under controlled temperature for a predetermined time. A wash ring 364 includes a ring, a cuvette engaging mechanism, and a cuvette elevator to a luminometer. Wash ring 364 is responsible for moving samples to a washing station for washing incubated reacted samples, and moving the resulting sample to the luminometer for measurements of the result. A wash station 366 accessible to wash ring 364 includes four aspiration probes and Z motion mechanisms, aspiration valves, exterior aspiration probe cleaning ports and valves, wash dispense pumps, an acid dispense pump, and valves and ports. Luminometer 368 includes an enclosure/turntable and drive mechanism, a photomultiplier tube (PMT), a base dispense pump, a valve and probe, waste aspiration hydraulics, and a cuvette ejection mechanism to dispose of cuvettes after a reaction is measured. Luminometer 368 is responsible for initiating a base reaction for the treated sample, and measuring the resulting luminance. Cuvette loader 370 includes a hopper, an escalator, an orientation chute, a drop chute, a pusher, a queue, and a ring feeding mechanism. The cuvette loader is responsible for loading sterile cuvettes into the incubation rings 362.

Reagent/Ancillary Handling—Reagent compartment 372 includes a rotary tray, drive and thermal control, fans, a barcode reader for identifying reagents, a manual access door for accepting manually loaded reagent cartridges, and an autoloader access door for accepting auto loaded reagents. The reagent compartment is responsible for storing reagents in a refrigerated or thermally-controlled state for access by reagent probes. Reagent autoloader 374 includes an X-Z mechanism, a pack gripper mechanism, and pack sensors. The reagent autoloader works substantially similarly to the reagent loader 354 of the MVCC module. Reagent probes include three probes, each having an X-Z mechanism, three diluter pumps, fluid volume checking components, a probe wash station, and related hydraulics. Three reagent probes 376 are responsible for aspirating reagents and dispensing them into cuvettes in the incubation ring.

Sample Handling—Sample probe 378 includes a theta-Z mechanism, a diluter pump and syringe, a sample integrity sensor, and liquid level sensing components. Sample probe 378 is responsible for aspirating sample portions from tubes containing patient samples at position 52 on the automation track, as explained in FIG. 6. In some embodiments, sample probe 378 can also access an internal queue of manually loaded samples that allow an operator to manually load samples in a six tube tray. An internal barcode reader reads the identity of each of the samples in that tray, and that allows sample probe 378 to treat each of the samples in the same manner as it would a sample on the automation track. In some embodiments, it is desirable to use disposable tips for a sample probe 378. This greatly reduces the risk of carryover between samples. Disposable tip loader 380 includes a tip triple pack loader, a tip tray singulator, a presentation mechanism, and chute to solid waste. Disposable tip loader 380 is responsible for taking a pack of sterile disposable tips, for presenting the tips at a location accessible to sample probe 378, for removing any existing dirty tips from that sample probe, and for placing that tip with a fresh sterile tip, to allow the sample probe to make the next aspiration.

Chassis, Covers, Utilities—These systems are supported by a chassis and other auxiliary hardware. This hardware includes a chassis frame that includes internal walls, baffles, fans, etc. On top of the electromechanical systems shown in FIG. 31, a cover of fixed panels and user accessible doors and drawers, etc. protects these mechanisms. External controls and indicators, such as power switches and status lights, provide a low-level interface for an operator. Hydraulics, such as vacuum subsystems, condensation drains, water and waste plumbing, etc. can be provided. Bulk reagents, such as acids, bases, wash bottles, and supply lines, can be provided in the chassis beneath the above-discussed mechanisms. Power, data distribution, etc., as well as electrical control electronics and processors, can also be provided as part of the chassis.

A typical test starts in a cuvette in the outer incubation ring. A sample is added first by the sample probe aspirating from the sample delivered via the system by way of the PCM, or direct load by an operator. One, two, or three reagents are added by the reagent probes at specific time intervals after the sample addition, as specified by the test definition (TDef). The sample and reagents are incubated in the incubation ring. At a specific time, as prescribed by the TDef, the cuvette is elevated to the wash ring and a wash process is performed, which consists of attracting the magnetic particles to the cuvette wall and repeatedly aspirating the contents and washing the particles. Up to four aspirations and seven washes can be carried out in any one trip through the wash ring. The last aspiration is not followed by a wash. If this is a single-pass assay, acid is added and the cuvette is lifted into the luminometer, where the base is added and the light flash is read. If this is a two-pass assay, at the end of the wash step the particles are resuspended by a jet of wash, and the cuvette is brought down into the inner incubation ring, where one or two additional reagents are dispensed by the reagent probes. After an appropriate incubation, the cuvette is elevated again into the wash ring for a second and final wash, followed by acid addition, base addition, and light is read at the luminometer. In the luminometer, after a cuvette has finished the read operation, its contents are aspirated into the liquid waste, and the cuvette is discarded into the solid waste. A cuvette loading mechanism replenishes the incubation ring with fresh cuvettes for continuous operation. These are taken from a hopper filled by the user periodically.

In some embodiments, samples can be a patient's specimen, calibrators used to adjust the standard curve to a particular lot of reagents, or controls that are known concentrations of the analyte used to monitor the system performance at various intervals over time. In some embodiments, a sample is added to a cuvette in the outer incubation ring, and a diluent is then added from a diluent container in the reagent tray using the reagent probes to achieve a desired dilution ratio. The sample probe then aspirates some of the diluted sample into a fresh cuvette. In some embodiments, a few empty cuvettes can be maintained in the outer ring for use by STAT samples.

In some embodiments, the machine cycle of an IA analyzer module is 8 seconds, which translates to a maximum throughput of 450 tests/hr. As mentioned above, each cycle allows for one sample addition, three reagent additions, two wash actions per wash station, and two luminometer reads. All activities in the system are synchronized so that, for example, a reagent tray is stopped when a reagent probe is aspirating from a pack, or the incubation ring is stopped during a sample dispense. At the heart of the analytical process are the incubation rings and the wash ring. The incubation rings have five stops each, with three of them dedicated to reagent delivery and the other two for sample addition and cuvette exchange between the incubation and wash rings. The incubation rings move randomly to bring cuvettes to the various services while the wash ring increments steadily. In some embodiments, the wash ring and luminometer operate on a four-second cycle, so that a single wash station and luminometer can service first-pass and second-pass wash/read operations, concurrently.

Exemplary embodiments of an IA analyzer module can include the following electrical hardware or software modules that can operate on a processor that manages the operation of an IA analyzer module. The module manager is a subsystem of the instruments workstation that supports Ethernet (10/100/1000 Mbs), RS232, USB (2.0), and video port interfaces as the communication buses with the instrument workstation and module device manager. An exemplary module manager operates on an Intel-based PC, and is responsible for diagnostics, software management, user interface, and configuring any device managers in the instrument.

The device manager is the real-time control module that supports Ethernet (10/100 Base-T), CANOpen, RS232, and USB (2.0) interfaces as the communication buses with the module manager and other device control managers (DCM). The device manager provides distributed vs. centralized control of the instrument subsystems. Workflow scheduling and coordination is handled by this embedded processor, while individual control of subsystem mechanism is handled locally by nodes that are part of each subsystem. An exemplary device manager hosts workflow management, scheduler, and sequencers software modules. The device manager also provides appropriate interfaces for external peripherals, command and control, and facilitates gathering status information for all nodes in the IA analyzer module.

Exemplary device control managers (DCM) control local electromagnetic assemblies within a subsystem. The device manager communicates with DCMs to manage these nodes via a CAN bus. Exemplary nodes that can be controlled by a DCM include stepper motors and thermal control hardware. These nodes can also be responsible for sensors, switch inputs, digital or analog I/O, etc. Luminometer data and control can also be handled by an exemplary node.

The analytical engine of the IA analyzer module is where all assay processing occurs. This includes the incubation rings, wash ring, wash station luminometer, and cuvette supply. The analytical engine includes the inner and outer incubation rings (first pass ring and second pass ring), thermal control for incubation rings, wash ring, elevators between incubation rings and wash ring, wash station (including magnets, aspiration probes, ports, pumps, and valves), luminometer, cuvettes loader, and control electronics. This provides assay flexibility in terms of length of incubations, number of reagent additions, and number of washes and passes. The reaction area is divided between an incubation area, served by two independently movable incubation rings, one for each assay pass, and a separate wash ring that includes the wash station. Each of the incubation rings has intersection points with the wash ring where elevators allow a cuvette to be exchanged between the two. The first-pass ring (outer ring) has one such elevator that only moves cuvettes up. The second-pass ring has two elevators, one going up and one going down, which allow a cuvette to be brought down from the wash ring into the second-pass ring at the end of the first wash in a two-pass assay, receive additional reagents, incubate there as long as necessary, and then be brought up to the wash ring again for the final wash and read.

In an exemplary embodiment, the incubation rings are temperature-controlled at 37° C.; the wash ring is at ambient temperature. In some embodiments, cuvettes are asymmetric. Cuvettes need to be placed in the wash ring with the wide side facing its circumference due to its reduced radius. Incubation and wash rings intersect roughly at right angles and cuvettes are positioned in the incubation rings with their narrow side facing the circumference of the ring. Elevators for exchanging cuvettes between these rings, therefore, should account for the orientation of cuvettes.

The incubation rings make variable circumferential moves, while the wash ring increments steadily during the run. In an exemplary embodiment, the wash ring operates on a cycle time of four seconds, while the incubation rings operate on the regular machine cycle time of eight seconds. The relative positioning of the rings enables cuvettes from the first pass ring to be elevated into odd positions of the wash ring, while cuvettes from the second-pass rings are elevated into even positions of the wash ring. This allows for interleaving cuvettes coming from the two rings at the same time and for processing them without negatively affecting the throughput. This is equivalent to having a dedicated wash station for each assay pass. A cuvette that has gone through the wash will either be pushed into the luminometer for a read, or be pushed down into the second-pass incubation ring.

An exemplary embodiment of a wash station servicing the wash ring includes a set of fixed magnets that draw the particles to the side of the cuvette. While magnetic particles are fixed to the side of cuvettes via magnetic forces, aspiration probes descend into the bottom of the cuvettes and aspirate their contents. The probes move inside cleaning collars that inject and aspirate water around the exterior of the probe, to minimize carryover between cuvettes. Wash or re-suspension solutions are injected from ports mounted at an angle and aimed at the particle pellet. To facilitate multiple washes of the magnetic particles, a series of four individual aspiration probes can be used, such that each cuvette interacts with each aspiration probe as a wash ring moves. The last probe leaves the cuvette dry. The ring then moves the cuvette away from the magnet's influence.

If this is a single-pass assay, or the second pass of a two-pass assay, acid is injected from the acid port. The cuvette will then be lifted from the wash ring into the luminometer. If this is the first pass of a two-pass assay, a jet of wash will be applied to re-suspend the particles, and the cuvette will move down to the second pass ring at the appropriate elevator position.

An exemplary luminometer has a single pickup position performing a luminosity measurement. A luminometer includes a light-tight turntable that brings the cuvette in front of the photo multiplier tube (PMT). Then, a base is injected to cause the solution to luminesce in a short flash due to the ensuing chemical reaction. The light is read by the PMT. The cuvette is then moved to a location where a probe aspirates its contents to the liquid waste. The cuvette is then ejected into the solid waste.

The cuvette loader serves the first-pass ring only. It includes a hopper, escalator, cuvette orientation chute, and an insertion mechanism into the ring.

In an exemplary embodiment, the incubation rings rotate and make a fixed number of stops per cycle. For example, five stops per cycle may be made, including three stops to facilitate reagent delivery. In the first incubation ring, one stop is used at the sample probe to dispense a sample into one or more cuvettes. The fifth stop is used to bring the cuvettes to the wash station. In the second incubation ring, the first stop is used to receive a cuvette from the wash ring elevator, while the fifth stop is used to bring the cuvettes back to the wash ring via the wash ring elevator. The wash ring typically moves in a fixed rate, stopping for each wash cycle in each cuvette, and each elevator interaction and luminometer interaction for each cuvette.

The reagent handling subsystem of the IA analyzer module includes a thermal enclosure with an access door, reagent trays and drive mechanisms, Peltier-based cooling systems, barcode readers to identify reagents, an autoloader an autoloader door, three reagent probes, probe hydraulics, probe wash stations, and control electronics.

In an exemplary embodiment, reagent and ancillary packs are intermixed and placed into a rotary tray that allows reagent packs to be moved to each position accessible to one of the three reagent probes. This rotary action can act to continuously mix reagents so they are ready to be aspirated. This can illuminate pre-mixing steps by an operator. This rotary action can be accelerated relative to the expected rotational speed due to the use of three parallel reagent probes. To service all reagent probes, the reagent tray in the reagent storage should be capable of up to three rotations per eight-second cycle to deliver three reagents to the three positions of three reagent probes. Reagent probes may be dedicated to different types of reagents to minimize cross contamination.

In some embodiments, the sample probe utilizes disposable tips to minimize cross contamination of samples having different analyte concentrations. Samples can arrive at the sample probe in a sample tube or a tube top cup. Calibrators may also be handled by the sample probe in the same manner. In some embodiments, a direct channel can be used to manually load six-position trays of barcode samples. Barcode reader, as part of the analyzer module, can identify patient samples and handle the samples in the same manner as if that sample arrived via a carrier on the automation track. Probe hydraulics can use any conventional means suitable for an aspirating probe in an IVD environment. Pneumatic pumps can utilize air to clear out the sample probe and to regulate pressure to perform an aspiration or dispensing operation.

In some embodiments, an environmental control system in a clinical analyzer module is used to precisely control the internal temperature of air and onboard fluids in a clinical analyzer module. Systems and control methods provide for temperature control of a clinical analyzer module, thus resulting in improved test results.

According to some embodiments, in-line fluid heaters are used in conjunction with control of the air temperature in compartments of a clinical analyzer module through which the fluidics tubing is routed. This allows the fluid heaters to be mounted at some distance away from the point at which the fluid is dispensed, which is otherwise a considerable technical challenge. It further eliminates the need to flush the fluid lines to eliminate cooled liquid that has traveled past the fluid heaters in the common situation when fluid is not dispensed continuously. Controlling the air temperature within the analyzer to a temperature above the ambient operating range of the analyzer, according to embodiments herein, allows temperature to be maintained by heating alone, without the need for expensive cooling mechanisms.

According to some embodiments, an environmental control system for use in a clinical analyzer module comprises: in-line fluid heat exchangers or heaters to bring fluids used in the immunoassay reaction to a constant temperature; control of the air temperature within the compartment(s) through which fluid lines are routed; and control of the air temperature within the compartments in which bulk fluids are stored (and which house the analyzer electronics). Additional details about this exemplary feature can be found in simultaneously filed U.S. Provisional Patent Application No. 62/365,307, which is incorporated herein by reference in its entirety.

Cuvette and Photometric Improvements of Some Embodiments

In some embodiments, alignment of reaction cuvette segments on clinical chemistry instruments is accomplished via visual marking on the cuvette window to verify the position of a light beam used in performing photometric measurements of samples in the cuvettes. A lamp mounting bracket that indicates the location of the light beam is utilized to hold the light beam gauge in position to provide a marking on the cuvette window.

For example, a system for providing a visual marking on a cuvette window to verify a light beam position for performing photometric measurements can include an analyzer reaction ring that includes one or more reaction cuvette segments and a gauge vertical reaction ring. The reaction cuvette segments each hold one or more cuvettes, and the gauge vertical includes openings at positions corresponding to window positions associated with the cuvettes. The system can also include a gauge light beam that is configured to be inserted into the openings and rotated against the cuvettes to hold a light beam area for performing photometric measurements on contents of the cuvettes. In some embodiments, the aforementioned system further includes a bracket light source photo configured to hold the gauge light beam at a height corresponding to the window positions associated with the cuvettes. The gauge light beam may be held in the bracket light source photo using an aperture photometer, and a ring lock aperture may be used to secure the aperture photometer within the bracket light source photo. In some embodiments, the aperture photometer is an aperture 1.5 mm photometer. Additional details about this exemplary feature can be found in simultaneously filed U.S. Provisional Patent Application No. 62/365,298, which is incorporated herein by reference in its entirety.

In some embodiments, the reduction or elimination of drift in a photometer's source lamp can be accomplished using reference measurement acquired based on a map of cuvette locations. Cuvette mapping can be performed as an automatic alignment routine for each cuvette in the system. The mapping is used to identify locations for acquiring reference measurements which, in turn, may be used to calibrate the photometer and eliminate the effect of source lamp intensity drift.

For example, a computer-implemented method for correcting photometer source lamp intensity drift includes generating a cuvette map of a reaction ring that identifies a plurality of cuvette locations, and using the cuvette map to identifying a plurality of regions between the plurality of cuvette locations. A plurality of reference measurements are acquired using a photometer, with each reference measurement being acquired in one of the plurality of regions. The source drift of the source lamp's photometer may then be corrected based on the plurality of reference measurements.

In some embodiments, the plurality of reference measurements are acquired while acquiring a plurality of signal measurements corresponding to the plurality of cuvette locations. The reference measurements and the signal measurements may be oversampled to eliminate noise and increase precision. Additionally, in some embodiments, the variance of the signal measurements may be used to filter the reference measurements prior to correcting the intensity drift of the source lamp. Additional details about this exemplary feature can be found in simultaneously filed U.S. Provisional Patent Application No. 62/365,294, which is incorporated herein by reference in its entirety.

In some embodiments, cuvette mapping is performed as an automatic alignment routine for each cuvette in the system. This mapping routine finds the optimal triggering point to generate precise photometric measurement. The routine may be performed as a part of the cuvette ring's initialization routine without any performance impact. Any new segments added can be automatically mapped during reset of the ring mechanism. As an added benefit of the techniques described herein, a reference measurement may be calculated between the cuvettes for dynamic source lamp referencing, thereby increasing the accuracy of the results.

According to some embodiments, a computer-implemented method for performing photometric cuvette mapping includes, during a complete rotation of a reaction ring, detecting edges associated with a plurality of gaps between a plurality of vessels in a reaction ring. Each gap is determined according to an edge detection process comprising the steps of identifying a vessel interior based on detection of a first predetermined number of photometer measurements below a threshold value; identifying a rising edge based on detection of a second predetermined number of photometer measurements above the threshold value; and identifying a falling edge based on detection of a third predetermined number of photometer measurements below the threshold value. Once these values are identified, the rising edge and the falling edge are recorded as being indicative of one of the plurality of gaps. This edge detection process may be repeated until a predetermined number of gaps are determined.

In some embodiments, following identification of the vessel interior, if the rising edge is not identified within a predetermined number of photometer measurements, a report is generated indicating a missing edge. In other embodiments, following identification of the rising edge, if the falling edge is not identified within a predetermined number of photometer measurements, a report is generated indicating a missing vessel.

In some embodiments, following the edge detection process, a plurality of trigger points are computed for the plurality of vessels based on the recorded gaps. In other embodiments, following the edge detection process, a vessel flagging process is performed that includes flagging one or more vessels as unusable for testing based on the stored gaps. A vessel may be designated as unusable for testing if at least one of the rising edge and the falling edge of a gap adjacent to the vessel is out of tolerance.

According to another aspect of the present invention, a computer-implemented method for performing photometric cuvette mapping includes aligning a reaction ring to a mechanical home position where a light associated with a photometer is between two vessels and resetting a photometer encoder to zero. Edge data is then captured with a photometer device control manager. The reaction ring is rotated past one rotation, and the edge data is read from the photometer device control manager. The reaction ring is re-aligned to the mechanical home position, and trigger points are computed from the edge data using the photometer device control manager. Indexing may then be initialized to collect photometric measurements from the vessels. Additional details about this exemplary feature can be found in simultaneously filed U.S. Provisional Patent Application No. 62/365,287, which is incorporated herein by reference in its entirety.

Additional Features of a Vessel Mover System of Some Embodiments

In some embodiments, techniques used by the VM system provide, among other things, the ability to measure and control the time during which a decapped sample is exposed to air. According to some embodiments, sample exposure to air is managed according to a method that begins by receiving a sample in a capped container and parking the capped container on a sample handler. Test requests corresponding to the sample are then received, with each test request associated with one or more analytical modules included in automated clinical chemistry analyzers. The first analytical module associated with the first test request is identified. Once the first analytical module is available for testing, the capped container is reloaded from the sample handler and the container is decapped. Then, a prioritized delivery of the decapped container to the first analytical module is performed. Following sample aspiration at the first analytical module, the decapped container may be transported to one or more additional analytical modules, or the test requests may be designated as being complete. In some embodiments, transportation of the decapped container to the first analytical module and the one or more additional analytical modules is performed using a linear motor system that applies motive force to a carrier holding the decapped container.

In some embodiments of the aforementioned method, if the decapped container is time-critical for exposure to air, the decapped container is entered in a processing queue of the first analytical module ahead of one or more other samples awaiting testing. Conversely, if the decapped container is not time-critical for exposure to air, the decapped container may be entered at the end of the processing queue of the first analytical module. In other embodiments, a timer is initialized upon decapping the capped container. A minimum time threshold associated with the first test request may be used in conjunction with this time to prioritize delivery of the decapped container in the first analytical module's processing queue. Additionally, prioritization of the decapped container in the first analytical module's processing queue may be further based on a relative stability value associated with the sample (e.g., as determined using a table of reference data). During the method, if it is determined that the relative stability value of the sample exceeds a predetermined stability threshold, further testing of the sample may be prevented, or a stability flag may be associated with the sample that persists throughout all further testing of the sample. If the timer reaches a predetermined limit, an alert may be sent to an operator, instructing the operator to seal the decapped container as soon as possible. Additional details about this exemplary feature can be found in simultaneously filed U.S. Provisional Patent Application No. 62/365,206, which is incorporated herein by reference in its entirety.

In some embodiments, a transportation system used by the VM system utilizes a linear motor housing that is constructed with smaller dimensions and a reduced materials cost compared to conventional housings. According to some embodiments, a system for transporting a carrier vehicle using linear motors includes a linear motor housing shaped to hold one or more linear motors. The linear motor housing has a rectangular (or approximately rectangular) stainless steel top plate and extruded aluminum left and right side plates. The left side plate is connected adjacent to one longitudinal edge of the top plate, while the right side plate is connected adjacent to the other longitudinal edge of the top plate. The top plate is designed to support propulsion of the carrier vehicle over its surface. Thus, for example, in one embodiment, the top-facing side of the top plate has a surface roughness between 0.2 μM and 0.4 μM.

In some embodiments, the aforementioned linear motor housing includes one or more features that are used to ensure efficient operation of the linear motor system. For example, in one embodiment, the linear motor housing further includes electromagnetic shielding material applied to the rectangular stainless steel top plate and the two side plates. In another embodiment, eddy current shielding material is applied to the rectangular stainless steel top plate. This eddy current shielding material may additionally be applied to the side plates. The thickness of the aluminum side plates can vary in different embodiments. In some embodiments, the thickness is minimized to permit flexibility of the linear motor housing. For example, in one embodiment, the thickness of the left side plate and the right side plate are selected to provide the linear motor housing with a torsional flex of +/−0.25 degrees.

In some embodiments, the linear motor housing system includes additional components that supplement the linear motor housing in creating a robust propulsion system for carrier vehicles. For example, in one embodiment, the system further includes guide rails connected adjacent to each of the longitudinal edges of the linear motor housing. In other embodiments, the system includes a plurality of coupling components operable to couple the linear motor housing to one or more additional linear motor housings in a manner that facilitates continuous propulsion of the carrier vehicle across the rectangular stainless steel top plate of the linear motor housing and rectangular stainless steel top plates corresponding to the other linear motor housings. Additional details about this exemplary feature can be found in simultaneously filed U.S. Provisional Patent Application No. 62/365,216, which is incorporated herein by reference in its entirety.

Some methods and systems for operating a VM system take advantage of existing sensors in the automation system, and may employ additional sensors, as needed, for the purpose of diagnosing problems and maintaining the health of the VM system. Automation systems employ measurement circuitry to check the health of the coils that make up the electromagnets in the track, use Hall Effect sensors (HES) to monitor magnetic field deflection created by activated coils, and/or a thermometer/thermocouple to monitor the temperature of the coil boards to check if the operating temperatures are as expected. Existing sensors provide important information such as current measurement, deflected magnetic field, temperature, etc.

In some embodiments, data collected from these sensors can be communicated to a local or remote central operations monitoring or maintenance monitoring center. The data can be reviewed for immediate action and/or compiled for statistical and/or trend analysis.

Thus, the VM system and the carriers may be used to assess, and even predict, the health of the vessel mover system or its parts. Via communication from one or more of the various components, such as the coil boards, master boards, node controllers, controller modules, host PCT, vessel mover manager software, linear motors, Ethernet switches, sensors, Hall Effect sensors, switching mechanisms, power failover gigabit Ethernet switches, thermometers/thermocouples, humidity sensors, etc., with a local or remote monitoring stations (e.g., computer), the current status of the VM system may be assessed in near real-time, and data can be collected, stored, and analyzed for identifying current or future trends in an effort to predict maintenance events, before they occur. The monitoring, in addition to reading an output, such as temperature, can also involve running a test protocol, which can be can be done automatically by the master boards on a regular basis, or upon request by an operator or central software.

In some embodiments, the central monitoring station may monitor multiple systems at different locations and potentially different customers simultaneously. In this manner, the IVD manufacturer can implement a service plan for its customers. Additional details about this exemplary feature can be found in simultaneously filed U.S. Provisional Patent Application No. 62/365,310, which is incorporated herein by reference in its entirety.

In some embodiments, a carrier may have a temperature control system (e.g., active or passive temperature control). For example, the temperature control system may be a passive temperature control, wherein the carrier has a payload within an insulation material. Thus, an embodiment could utilize the insulation container to minimize the heat flow to the vessel and keep it at, or near, its original temperature on its path to a testing station. This allows for a light, cost effective, and easy to maintain solution.

A further embodiment may utilize active temperature control. In case of an active temperature control, the carrier, or intelligent carrier, may have a device capable of manipulating its temperature. For example, the carrier may have a mini thermoelectric device attached to it. Thermoelectric cooling uses the Peltier effect to create a heat flux between the junctions of two different types of materials. In a further embodiment, the thermoelectric cooler (TEC) device may be combined with the passive temperature control discussed herein (e.g., 240) to help keep the payload at the desired temperature.

Additionally, an embodiment may utilize a mini electrocaloric cooling device (ECC). An electrocaloric device comprises a material that has a reversible temperature change under an applied electric field. The effect comes from the voltage raising or lowering the entropy of the system, analogous to the magnetocaloric effect. Similar to the TEC device, the ECC device may be combined with the passive temperature control discussed herein (e.g., 240) to help keep the payload at the desired temperature. Additional details about this exemplary feature can be found in simultaneously filed U.S. Provisional Patent Application No. 62/365,276, which is incorporated herein by reference in its entirety.

Some embodiments utilize techniques to align a diagnostic instrument of robotic pipetting probes to sample tubes on carriers, cuvettes, or reagent packs in indexing rings. Accordingly, an embodiment provides an ultra-accurate alignment system to ensure proper interaction between a probe and a target. The automated alignment system may utilize a probe switch and/or a probe runout sensor. Using one or more of these (i.e., the probe switch and runout sensor), an embodiment can simplify the process, while still achieving a highly accurate and repeatable alignment.

Specifically, an embodiment of the system may insert, using a robotic arm, a hunting tool into an aperture. It may then detect, using a plurality of sensing beams, a first location of the hunting tool within the aperture. An embodiment may then rotate, using the robotic arm, the hunting tool 180 degrees and again detect, using the plurality of sensing beams, a second location of the hunting tool within the aperture. Based on these two calculations, a runout magnitude and a runout direction may be determined. The hunting tool may then be inserted into a target via the robotic arm. The hunting tool may detect, using a pressure sensitive tip, a location of the hunting tool with respect to the target and, thereafter, an embodiment may adjust the location of the hunting tool with respect to the aperture and target based on the above factors. Additional details about this exemplary feature can be found in simultaneously filed U.S. Provisional Patent Application No. 62/365,225, which is incorporated herein by reference in its entirety.

In some embodiments, the VM system continuously tracks the identity and positions of all of its carriers with a single sample identification station, and covers/interlocks in order to provide sample chain of custody without the need to re-identify the sample at points of interaction (aspiration/de-capping/etc.). This eliminates the need to have sample identification stations at each interaction point. This reduction of hardware allows the system to be cheaper, smaller, and more reliable. It also allows not only the automation system, but also existing pre-analytical/analytical equipment connected to the automation system, to run more efficiently.

According to some embodiments, there are four features that facilitate addressing the issue of providing a more consistent, realizable capacity solution:

1. A single point for the acquisition of the sample identification (e.g., barcode reader), which pairs a tube's unique ID to the unique ID of a puck on the automation track;

2. An automation track that is able to continuously keep track of the identity and position of all of its pucks;

3. A continuous cover set over all of the areas of travel and destinations for the samples; and 4. The ability to detect if any cover has been breached.

Additional details about this exemplary feature can be found in simultaneously filed U.S. Provisional Patent Application No. 62/365,268, which is incorporated herein by reference in its entirety.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. An analyzer system for use in an in vitro diagnostics (IVD) environment comprising:

a sample handler module comprising
one or more drawers located at a front of the sample handler module accessible to an operator that are configured to accept a plurality of trays holding a plurality of patient sample tubes,
a plurality of cameras that record overhead images of sample tubes in the drawers, as the drawers are closed by the operator,
a covered refrigerated storage, separate from the one or more drawers, configured to store a plurality of tubes of control and calibrator fluids for multiple days,
a robot arm configured to move patient sample tubes to and from the drawers and tubes of control and calibrator fluids to and from the covered refrigerated storage;
one or more analyzer modules configured to aspirate, using at least one pipette, a portion of a patient sample from each of the plurality of patient samples and perform a clinical analysis of at least one of clinical chemistry characteristics and immunoassay characteristics of that patient sample;
a plurality of sample carriers configured to accept at least one of the plurality of patient samples and the plurality of tubes of control and calibrator fluids, each carrier having magnets in the base thereof; and
an automation track comprising a plurality of track sections forming a plurality of branches, each track section having a surface that includes a plurality of synchronously controlled magnetic coils, wherein the automation track is configured to move the plurality of patient sample tubes in the plurality of sample carriers via the synchronously controlled magnetic coils to propel the plurality of sample carriers along the plurality of track sections, and wherein the automation track is configured to receive each of the plurality of patient sample tubes and tubes of control and calibrator fluids from the robot arm and to move each tube to a first location on the automation track accessible to the at least one pipette of the one or more analyzer modules, to facilitate aspiration of the portion of the patient sample,
wherein the covered refrigerated storage comprises a refrigerated assembly, a lid, and a plurality of movable evaporation covers that are configured to limit evaporation from the plurality of tubes of control and calibrator fluids without directly contacting each tube.

2. The analyzer system of claim 1, further comprising a station on the automation track having a plurality of cameras that observe each of the plurality of sample carriers to characterize the carrier and at least one of the plurality of patient sample tubes after that patient sample tube has been placed into the carrier.

3. The analyzer system of claim 1, wherein each of the plurality of track sections receives primary power from one of the one or more analyzer modules and backup power from an adjacent one of the one or more analyzer modules.

4. The analyzer system of claim 1, wherein the-covered refrigerated storage further comprises individual evaporation covers placed on each control and calibrator fluid.

5. The analyzer system of claim 1, further comprising a plurality of reagent carriers configured to accept a reagent cartridge and to transport the reagent cartridge, via the automation track, to a second location accessible to the one or more analyzer modules.

6. The analyzer system of claim 1, wherein the automation track is configured such that the plurality of track sections form an outer loop on the perimeter of the one or more analyzer modules and a plurality of bypass track sections internal to the one or more analyzer modules that bypass the outer loop, and wherein the first location on the automation track accessible to the at least one pipette is on at least one of the bypass track sections.

7. The analyzer system of claim 6, wherein each of the one or more analyzer modules is serviced by one of the bypass track sections and that bypass track section is configured to temporarily hold a subset of the plurality of sample carriers for random access by the at least one pipette.

8. The analyzer system of claim 7, wherein movement and random access of the subset of the plurality of sample carriers on each of the bypass track sections is controlled responsive to a processor of the one or more analyzer modules.

9. The analyzer system of claim 6, wherein the outer loop is accessible to the sample handler module and wherein the plurality of track sections form a bypass track section configured to allow sample carriers to travel around the perimeter of the one or more analyzer modules without returning to the sample handler module.

10. The analyzer system of claim 1, wherein at least one track section is accessible to an external laboratory automation system.

11. The analyzer system of claim 1, wherein each of the plurality of sample carriers comprises a sample tube holder having two positions, and wherein the sample handler module is configured to place a first one of the plurality of patient samples into the sample tube holder before removing a second one of the plurality of patient samples from the sample tube holder.

12. A method for analyzing patient samples comprising steps of:
receiving, at a sample handler module, a plurality of trays holding a plurality of patient sample tubes via one or more drawers located at a front of the sample handler module that is accessible to an operator and comprises covered refrigerated storage, separated from the rest of the sample handler module, configured to store a plurality of tubes of control and calibrator fluids for multiple days in a location separate from patient samples;
capturing a plurality of images of the plurality of sample tubes, using a plurality of overhead cameras, as each of the one or more drawers is closed; and
analyzing the plurality of images to determine physical characteristics of each of plurality of sample tubes;
providing an automation track that propels a plurality of sample carriers having magnets in a base of each sample carrier using coils in a surface of the automation track;
positioning, via the automation track, a first carrier of the plurality of carriers at a first location on the automation track that is accessible to a robot arm of the sample handler module;
removing a first sample from the plurality of trays using the robot arm;
placing the first sample in the first carrier;
positioning, via the automation track, the first carrier at a second location accessible to a pipette controlled by a first analyzer module of a set of one or more analyzer modules;
aspirating, using the pipette, a portion of the sample while the sample is stopped, via the automation track, at the second location;

performing, by the first analyzer module, a clinical analysis of at least one of clinical chemistry characteristics and immunoassay characteristics of that patient sample;

opening a lid of the covered refrigerated storage and removing, using the robot arm, an evaporation cover that covers a first tube of the plurality of tubes of control and calibrator fluids that limits evaporation of the fluid contained therein without the cover touching the first tube; and repeating the steps of positioning using the robot arm, placing in the first carrier, and aspirating, using the first tube of the plurality of tubes of control and calibrator fluids.

13. The method of claim 12, further comprising the steps of:

capturing a plurality of images of the first carrier, using a plurality of cameras after the first carrier has received the first sample; and analyzing the plurality of images to determine an identity and physical characteristics of the first sample.

14. The method of claim 12, wherein the step of providing an automation track comprises providing a plurality of track sections and further comprising a step of providing primary power to each track section from one of the one or more analyzer modules and providing backup power from an adjacent one of the one or more analyzer modules in the event of an interruption of the primary power.

15. The method of claim 12, further comprising the steps of:

placing a plurality of control and calibrator fluids in the refrigerated storage in the sample handler module;

placing evaporation covers on each of the plurality of control and calibrator fluids; and storing the plurality of control and calibrator fluids in the refrigerated storage for multiple days.

16. The method of claim 12, further comprising the steps of:

providing at least one reagent carrier configured to move along the automation track;

transporting a reagent cartridge using the reagent carrier along the automation track to a third location accessible to the first analyzer;

receiving the reagent cartridge by the first analyzer using a robot arm of the first analyzer; and storing the reagent cartridge by the first analyzer for use in the clinical analysis.

17. The method of claim 12, wherein the step of providing an automation track comprises providing a plurality of track sections to form an outer loop on the perimeter of the one or more analyzer modules and providing a plurality of bypass track sections internal to the one or more analyzer modules that bypass the outer loop, wherein the second location on the automation track accessible to the at least one pipette is on at least one of the bypass track sections.

18. The method of claim 17, wherein the step of providing an automation track further comprises wherein each of the one or more analyzer modules is serviced by one of the bypass track sections and that bypass track section is configured to temporarily hold a subset of the plurality of sample carriers for random access by the at least one pipette.

19. The method of claim 18, further comprising a step of controlling the movement and random access of the subset of the plurality of sample carriers on each of the bypass track sections responsive to a processor of the one or more analyzer modules.

20. The method of claim 17, wherein the step of providing an automation track further comprises wherein the outer loop is accessible to the sample handler module and wherein the plurality of track sections form a bypass track section configured to allow sample carriers to travel around the perimeter of the one or more analyzer modules without returning to the sample handler module.

21. The method of claim 17, wherein the step of providing an automation track further comprises providing at least one track section accessible to an external laboratory automation system.

22. The method of claim 12, further comprising a step of removing a second sample from the first carrier after the first sample is placed in the carrier, wherein the first carrier comprises a sample tube holder having two positions.

* * * * *